United States Patent
Vorley

(10) Patent No.: US 11,890,709 B2
(45) Date of Patent: Feb. 6, 2024

(54) CONNECTION

(71) Applicant: Marine Direct Consultants Limited, Westill (GB)

(72) Inventor: Stephen William Vorley, Banchory (GB)

(73) Assignee: Marine Direct Consultants Limited

( * ) Notice: Subject to any disclaimer, the term of this patent is extended or adjusted under 35 U.S.C. 154(b) by 301 days.

(21) Appl. No.: 17/282,383

(22) PCT Filed: Sep. 30, 2019

(86) PCT No.: PCT/GB2019/052752
§ 371 (c)(1),
(2) Date: Apr. 2, 2021

(87) PCT Pub. No.: WO2020/070476
PCT Pub. Date: Apr. 9, 2020

(65) Prior Publication Data
US 2021/0348703 A1    Nov. 11, 2021

(30) Foreign Application Priority Data

Oct. 2, 2018  (GB) ...................................... 1816064

(51) Int. Cl.
*B23P 19/06* (2006.01)
*E21B 19/16* (2006.01)
(Continued)

(52) U.S. Cl.
CPC .......... *B23P 19/061* (2013.01); *E21B 19/161* (2013.01); *F16L 1/09* (2013.01);
(Continued)

(58) Field of Classification Search
CPC ........ B23P 19/061; E21B 19/161; F16L 1/09; F16L 19/0231; F16L 19/025
See application file for complete search history.

(56) References Cited

U.S. PATENT DOCUMENTS 3,484,123 A  12/1969  Velden
3,563,576 A   2/1971  Lee
(Continued)

FOREIGN PATENT DOCUMENTS

CN  201180876 A1  1/2009
CN  107830276 A1  3/2018
(Continued)

*Primary Examiner* — Zachary T Dragicevich
(74) *Attorney, Agent, or Firm* — Jacob W. Neu; Bradley Arant Boult Cummings

(57) ABSTRACT

A system for making a connection between a first tubular member and a second tubular member having coincident bores for conveying a fluid, the connection having an axis in the general direction of flow of said fluid therethrough, the system comprising a connection (1) and a tensioning tool (100), the connection having a first tubular end (6) comprising a first end flange (16) having an end face (17) and a collar (20) comprising a sleeve (21) and an end stop (30) fixed to the sleeve (21), said sleeve (21) arranged about said flange (18) and said end stop (30) arranged about said tubular end (6), said collar (20) slideable along said tubular end (6), the connection further having a second tubular end (7) comprising a second end flange (43) having an end face (45) and a locking nut (50) about and slideable along said first tubular end (7), the tensioning tool (100) for applying axial tension to said collar (30) relative to said second tubular end (7) characterised in that at least one of said sleeve (20) and said second tubular end (7) has a set of parallel circumferential grooves (23,47) therein and said tensioning tool (100) has a set of ridges (142), the system comprising the steps of moving said set of ridges (142) into said set of grooves (23,47) and applying an axial tension to said collar (20) relative to said second tubular end (7).

15 Claims, 25 Drawing Sheets

(51) Int. Cl.
*F16L 1/09* (2006.01)
*F16L 19/02* (2006.01)
*E21B 17/042* (2006.01)
*E21B 17/043* (2006.01)
*E21B 17/08* (2006.01)

(52) U.S. Cl.
CPC ......... *F16L 19/0231* (2013.01); *E21B 17/043* (2013.01); *E21B 17/0423* (2013.01); *E21B 17/085* (2013.01)

(56) References Cited

U.S. PATENT DOCUMENTS

| | | | |
|---|---|---|---|
| 4,019,334 A | | 4/1977 | Sinclair |
| 5,461,905 A | | 10/1995 | Penisson |
| 7,686,342 B2 | * | 3/2010 | Jennings ............. F16L 19/0206 285/912 |
| 2014/0374122 A1 | * | 12/2014 | Fanguy ................ E21B 17/043 166/380 |
| 2016/0273283 A1 | * | 9/2016 | Tveter ................... E21B 19/161 |
| 2016/0339563 A1 | * | 11/2016 | Wilson ................. B25B 21/002 |
| 2021/0190242 A1 | * | 6/2021 | Westgarth ........... E21B 17/0423 |

FOREIGN PATENT DOCUMENTS

| | | |
|---|---|---|
| SU | 734471 A1 | 5/1980 |
| WO | 3004016977 A1 | 2/2004 |
| WO | 2019051309 A1 | 3/2019 |

* cited by examiner

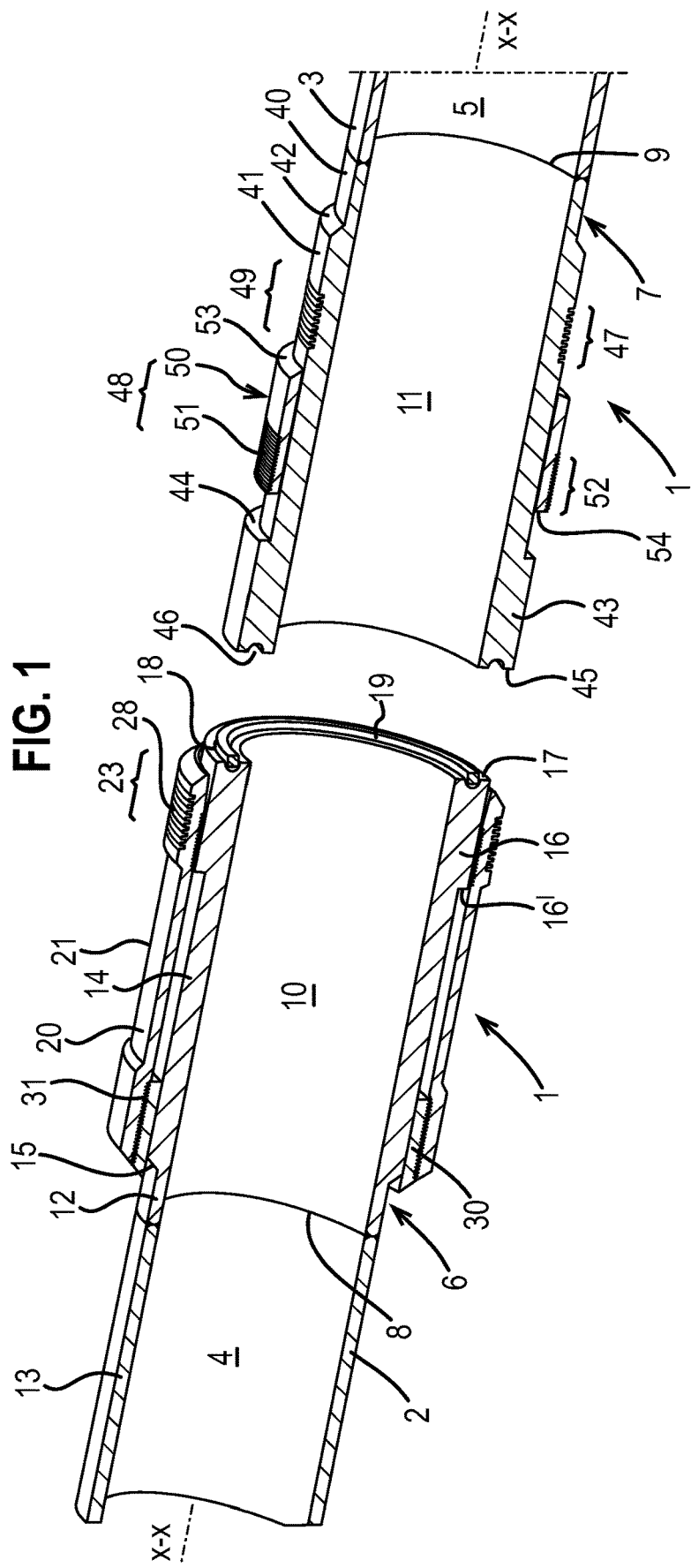

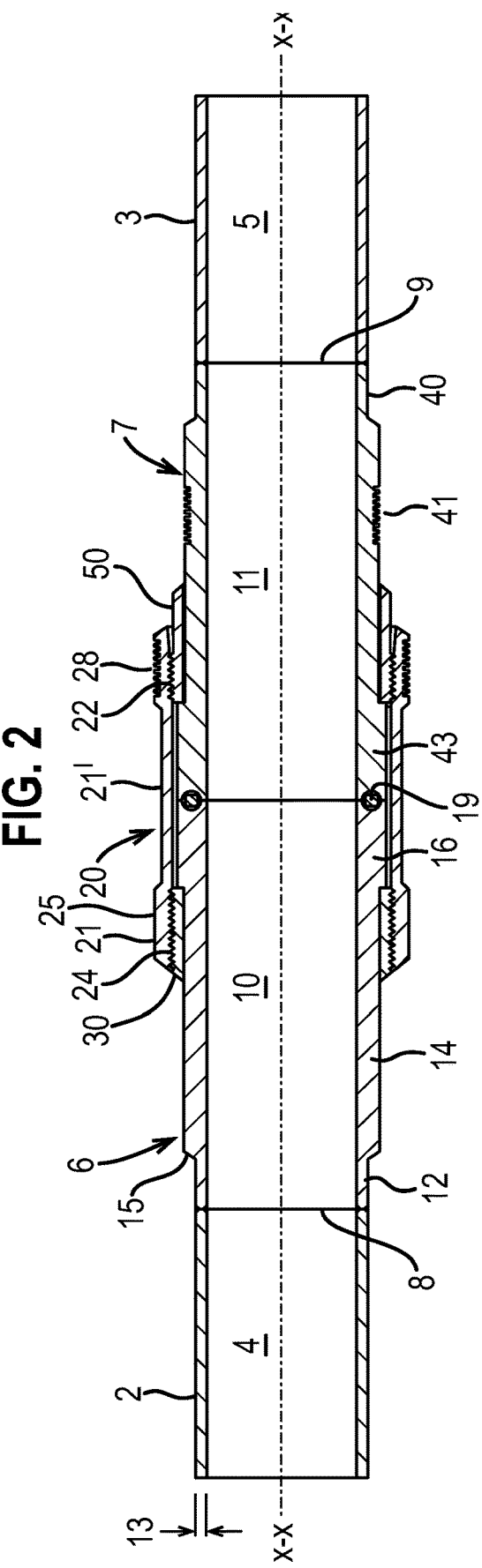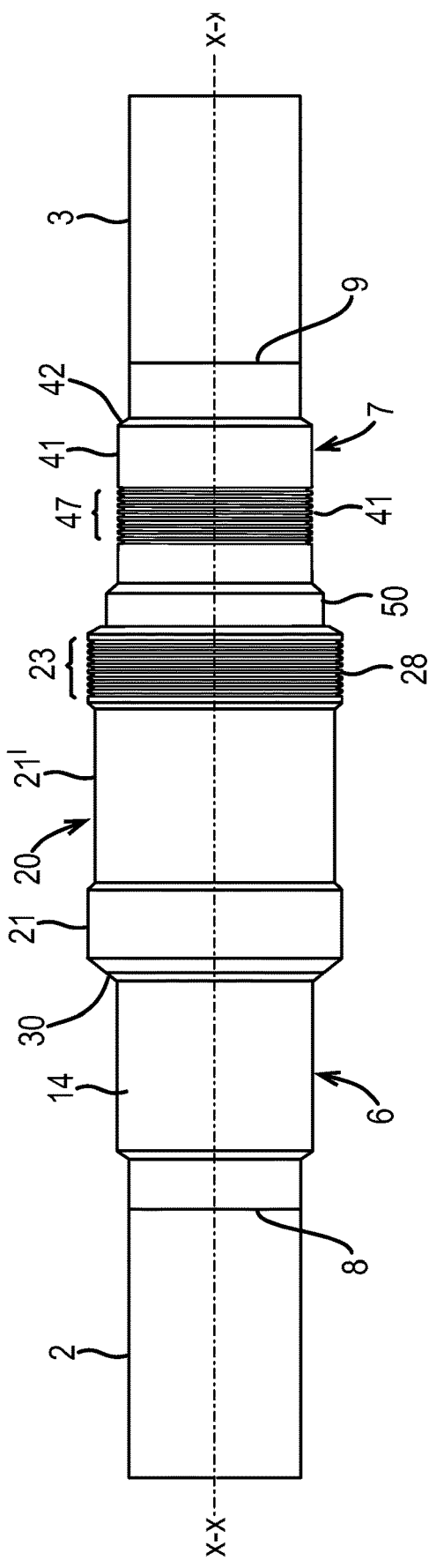

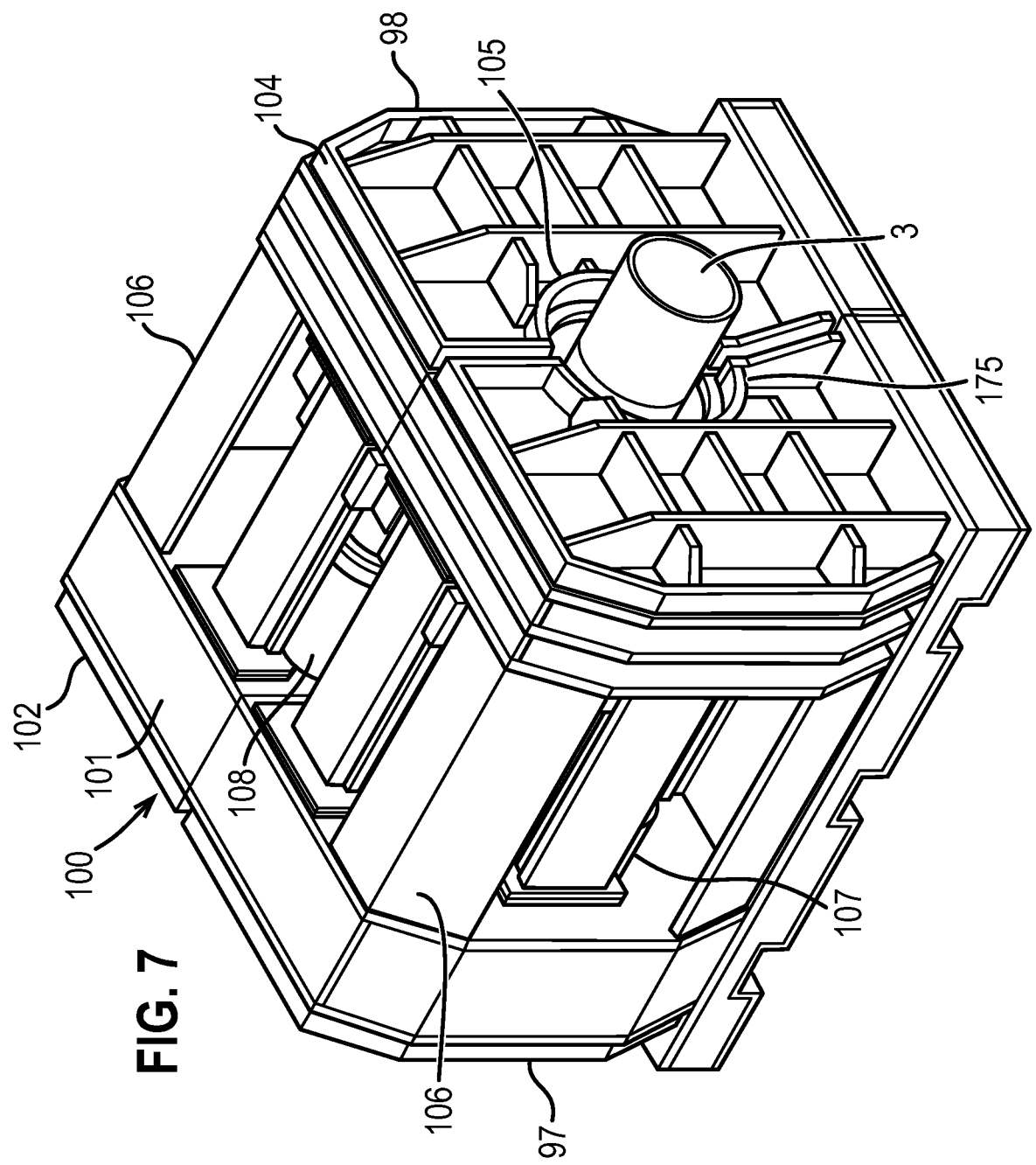

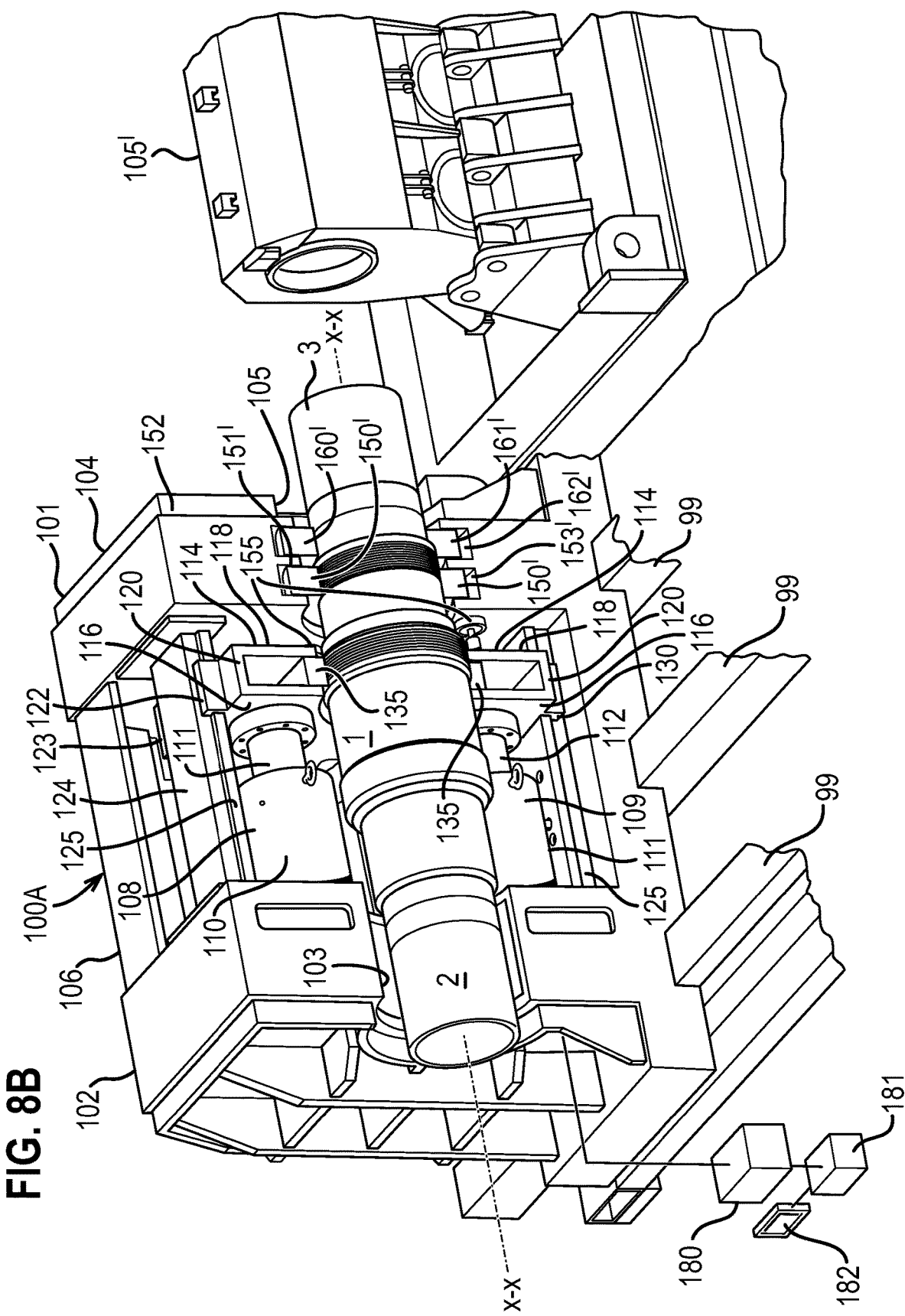

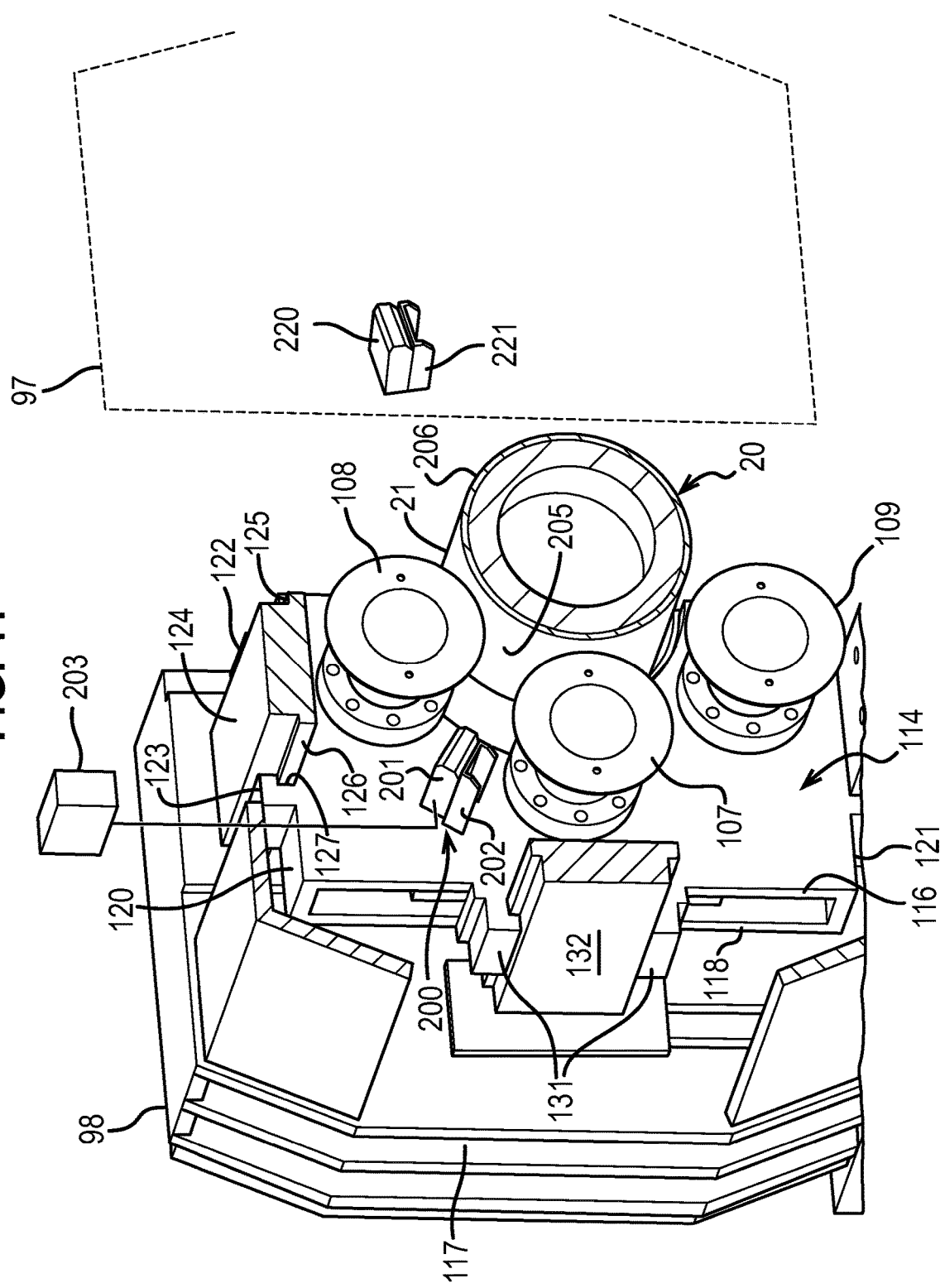

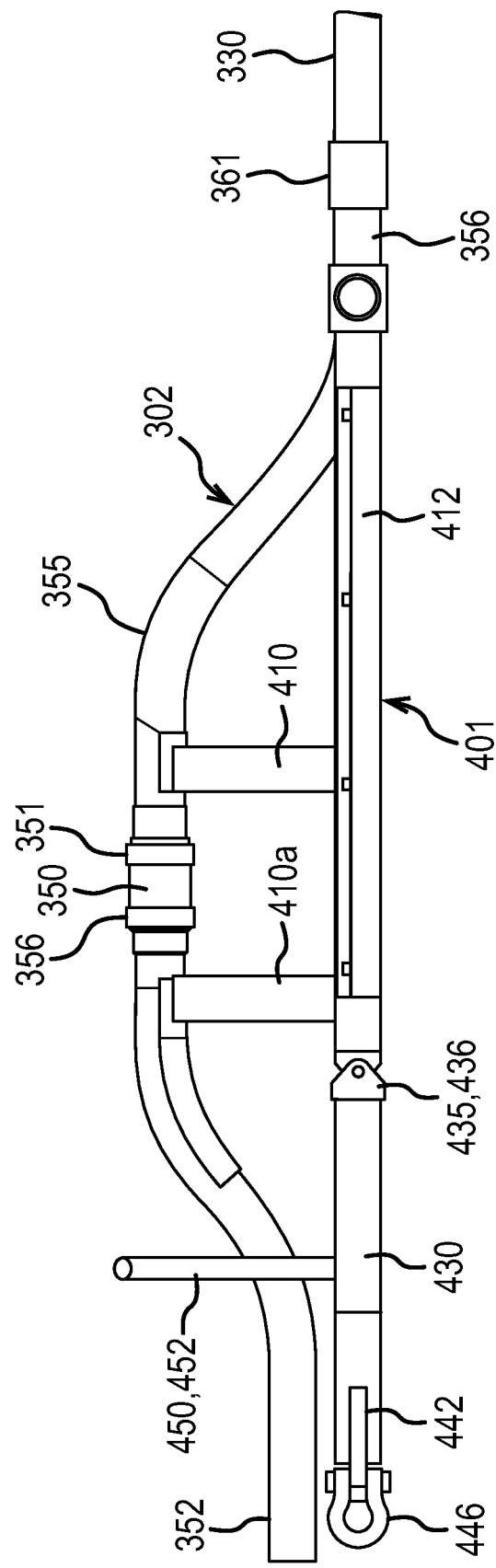

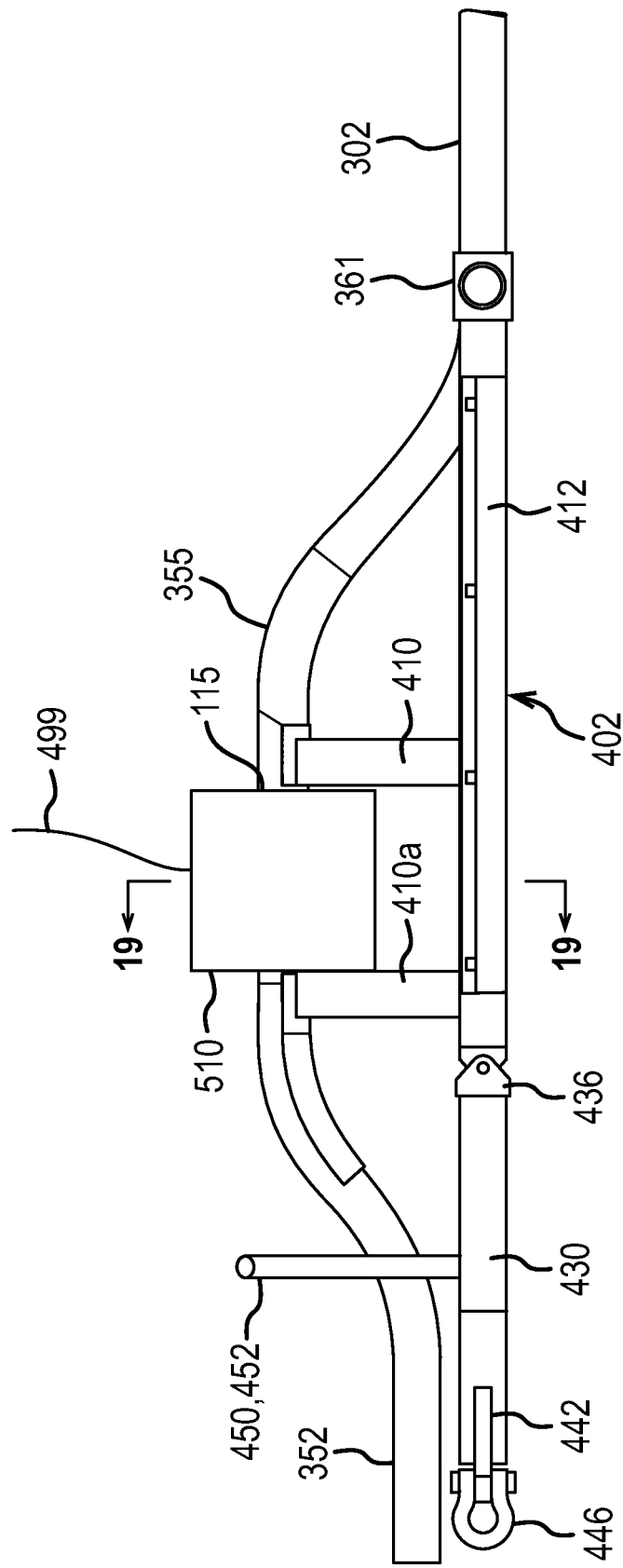

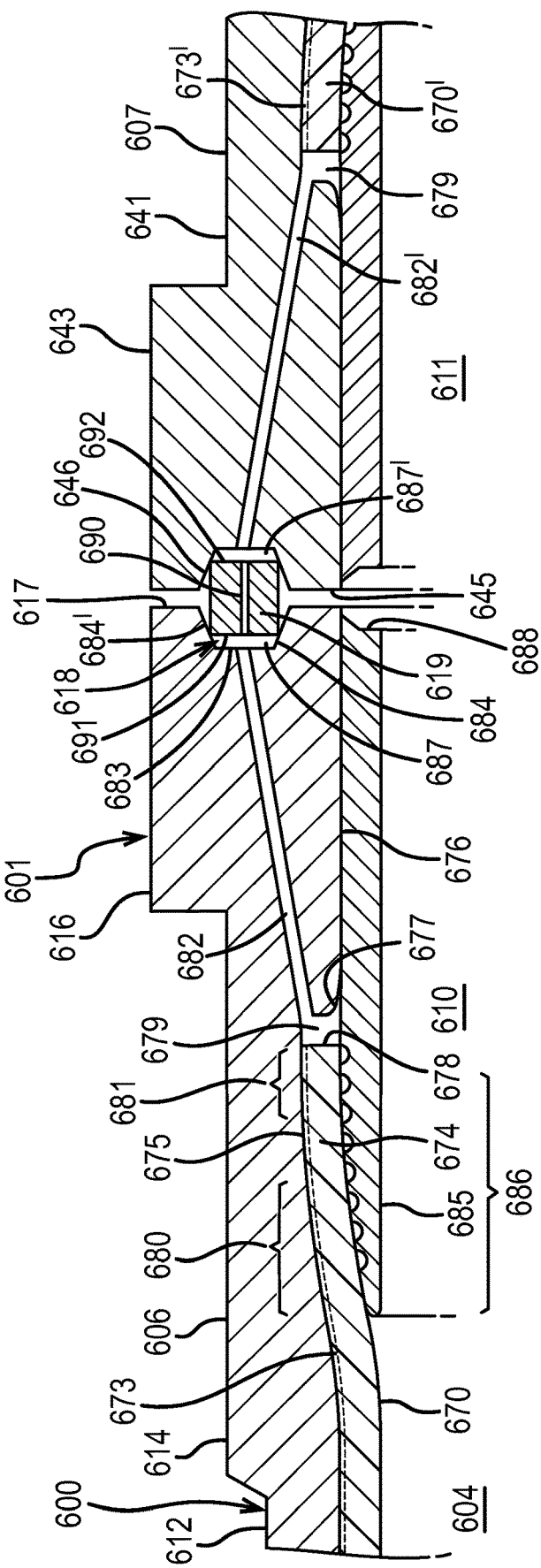
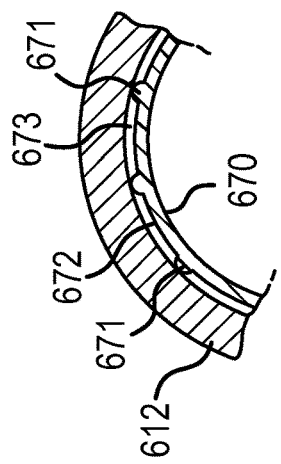
FIG. 21
FIG. 21A

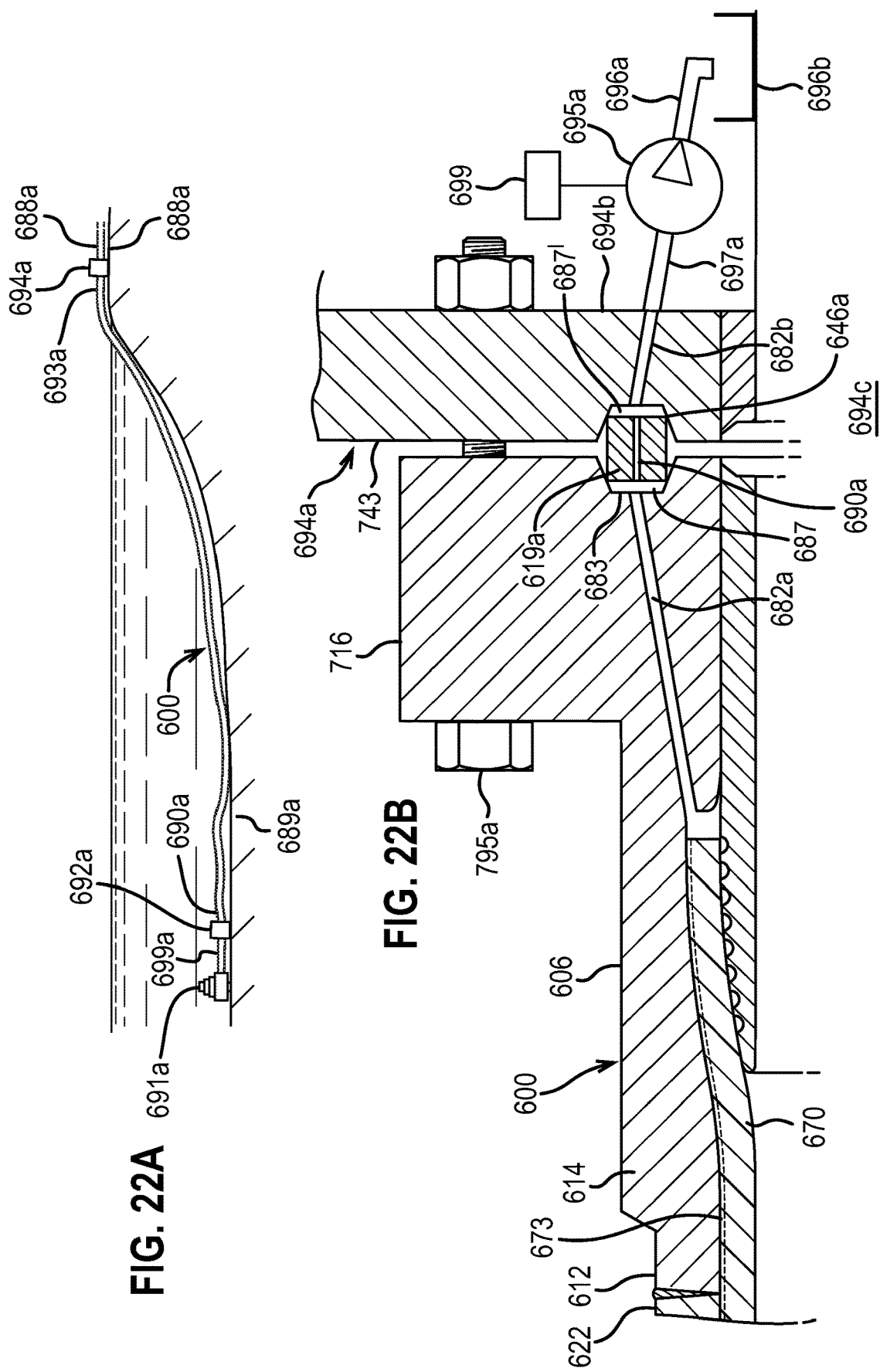

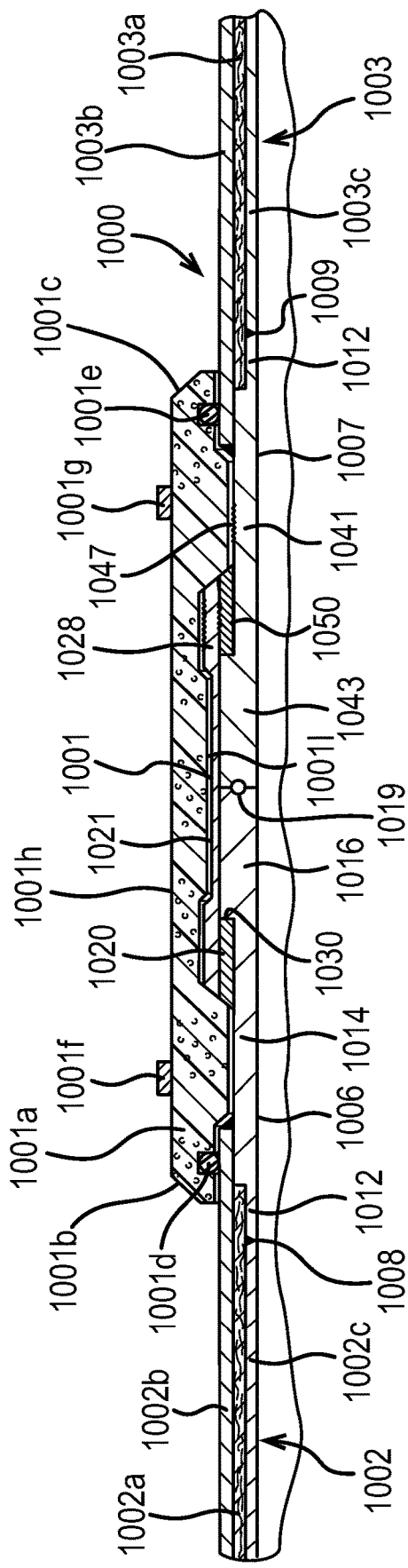
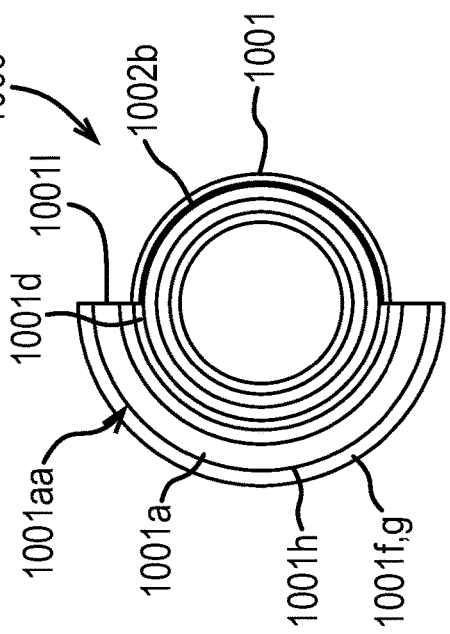

CONNECTION

BACKGROUND

The present invention relates to a connection for connecting two tubular members, a method for connecting two members and a system for connecting two tubular members. The present invention also relates to a method, apparatus and system for confirming a connection has been made. The present invention also relates to a method and apparatus for laying an end termination of a pipeline or flowline.

Tubular members are used to convey fluids. Such tubular members are used in pipelines, flowlines and risers. Tubular members may be used to convey oil and gas off-shore. There are many types of tubular members used in the off-shore oil and gas industry, such as: export pipelines, which may extend along a seabed from a well head of a producing well or a manifold linking several well heads located beneath the sea to a land-based storage facility or refinery; risers, which extend upwardly from a well head of a producing well located beneath the sea to a drilling rig or a buoy for connection to a sea tanker; and flowlines connecting subsea well heads to a manifold. Furthermore, tubular members may be used in the construction and maintenance of oil and gas wells. Examples of such tubular members used in the construction and maintenance of oil and gas wells are risers extending upwardly from a well and coiled tubing used mainly for intervention, maintenance and stimulation of wells. The tubular members may be rigid, flexible and/or coilable.

Off-shore pipelines are generally made from mild steel or high strength steel in sections which are transported on a pipe laying vessel, such as a barge or ship, to their point of use. The sections of rigid pipeline are welded together and lowered into the sea off the aft of the vessel to form a continuous pipeline which sits on the seabed. The welded pipeline is generally lowered from the vessel using one of three systems: S-lay, J-lay or reeled.

Using the S-lay system, the free end of pipeline is arranged generally horizontally on a roller bed on a deck of the vessel with a new section also laying horizontally and subsequently welded to the free end. The pipeline is off-loaded from the aft of the vessel along a stinger which projects rearwardly and downwardly into the sea from the aft of the vessel. The pipeline assumes a lazy S-shape between the seabed and the vessel.

Using the J-lay system, the free end of the pipeline is held at an angle to suit the water depth, which may be near vertical for deep water. The pipeline is held at the desired angle at the aft of the vessel, with a new section of pipeline arranged on a bed lying at the desired angle and is welded to the free end of the pipeline. The pipeline is off-loaded at the desired angle from the aft of the vessel. The pipeline assumes a lazy J-shape between the seabed and the vessel.

Using the reeled system, a length of welded pipeline is reeled around a large reel located on the vessel and unreeled through a straightener and off the aft of the vessel. The pipeline assumes a lazy J-shape between the seabed and the vessel.

Once the pipeline is in service, the pipeline is generally built to withstand an internal pressure of typically up to 5,000 psi (350 bar) from conveying fluid. The pipelines may have a diameter of between 2" (50 mm) and 48" (1.2 m), but are generally in the order of 8" (200 mm) to 24" (600 mm).

In the production phase of an oilfield, flowlines are a string of tubular members which convey oil and gas from a plurality of producing wellheads to a manifold and may be in the order of tens to hundreds of metres long. A pipeline may be a string of tubular members for conveying oil and gas from the manifold to an existing platform or on-shore and may be in the order of kilometres.

Oil and gas risers generally fall into one of two categories: marine risers and production risers. The former rises through the sea from a blowout preventer located on the seabed and the latter extends continuously from the seabed to a blowout preventer located on a surface platform. Risers are generally built to withstand pressures of up to between 15,000 psi (1050 bar) and 20,000 psi (1400 bar). Risers may comprise a single string of tubular members forming a continuation of wellbore casing in a drilled formation below the seabed and may comprise a number of additional parallel pipes for conveying inter alia choke and kill fluids. Risers made from high strength steel in sections having connections comprising upper and lower threaded ends and/or with flange connectors. Each section of a rigid riser is rigid to the extent that it is self-supporting when racked vertically and when racked horizontally between ends, deflects a small amount under its own weight.

Flexible tubulars, such as flexible risers are generally composite made from several concentric layers, including steel helical bands and plastic layers. Flexible risers may be made in sections and transported in the same way as rigid risers or coiled on to large reels and thus of a long length with few connections when in situ.

Coiled tubing used in the construction and maintenance of oil and gas wells is generally small diameter (typically less than 3.25 inches, (83 mm)) and made from a mild steel. Coiled tubing is coilable on to reels.

Tubulars, such as pipelines and flowlines normally require an end termination. For shallow water applications each end of the pipeline will have a simple pigging heads which are removed by divers after the pipeline has been flooded, gauged and pressure tested. These heads are attached to end of pipe using standard flanges and removed by divers prior to the divers' tying-in the pipeline ends into a rigid riser attached to platform or manifold or direct to a single wellhead. PLETs (Pipeline End Terminations) are more sophisticated and expensive terminations which are generally used in deeper water, generally, but not exclusively, to facilitate diverless tie-ins using ROVs.

A PLET is generally a rigid structure designed to be left on a seabed, which holds the end of a pipeline and its end termination at a predetermined distance from the seabed to facilitate, use of: attaching a pig launcher at one end and pig catcher at the other end of the pipeline for a pigging tool used inter alia for cleaning, inspecting and pressure testing the pipeline; and subsequently to make connections to a piece of equipment on the seabed, such as a manifold or wellhead. The PLET facilitates alignment of the end terminations to form a connection, as well as providing a space around the connector to facilitate making the connection. Typically, for shallow water applications, a flange connector is provided and a diver with a bolt driver makes-up the connection. Alternatively, or if the seabed is located in deep water, a Remote Operated Vehicle (ROV) may be provided with bespoke bolt system and is used to make-up the flange connection. A short section of flexible pipe or shaped rigid tubular is usually used to connect the end termination of the pipelines and flowlines to the manifolds and wellheads.

In certain circumstances, tubular members may transport fluids that are highly corrosive to the mild steel or high strength steel used in the body of the tubular. Such circumstances may be:

in the drilling for oil and gas in certain types of formation likely to encounter corrosive fluids, such as those comprising sulphur;

in conveying production fluids which may be corrosive;

in fracking operations in which corrosive fluids may be used, such as sea water; and in well stimulation operations such as re-injection of oil and gas wells, in which sea water may be used.

Injection fluids, production fluids or fluids found in the zones being drilled through may produce highly corrosive fluids which may attack the mild and high strength steel tubulars.

To overcome corrosion problems, such tubulars may be made with a chromium alloy instead of mild steel. However, chromium alloy is very expensive and if a surface of the chromium alloy tubular is scratched, corrosion may still occur.

It is also common to use lined mild steel or high strength steel tubular members with liners made of glass reinforced epoxy, plastic, stainless steel, or other corrosion resistant materials. Such lined steel tubular members may be used for production tubing, pipelines and risers.

Corrosive fluids may be two-phase or multi-phase fluids, such as oil, gas and water or sea water, which has dissolved salts and air trapped therein. Sea water and other corrosive fluids are commonly used in re-injection wells. A re-injection well may be an existing well into a reservoir or a specially drilled well into a depleted reservoir. Re-injection fluids are pumped down into the reservoir to stimulate and increase pressure in the reservoir to force any desirable oil and gas out of the reservoir through a producing well.

Corrosive fluids may also be produced oils and gases and thus lined production tubulars and lined pipe lines are often desirable. Such production fluids may be single phase or multi-phase fluids containing a combination of liquid, solids and gas.

One typical lined tubular is a dual or double walled tubular in which the inner wall is a liner tube made of a corrosion resistant material that serves as a conductor for the corrosive fluid, and an outer wall or pipe that is designed to provide strength to withstand the internal pressures of the corrosive fluid, as well as external forces such as external ambient water pressure, mechanical loading, etc. A mild or high strength steel walled tubular may be lined with a High Density Polyethylene (HDPE), stainless steel or Glass Reinforced Epoxy (GRE) liner. The GRE liner is inserted into a steel walled tubular and cemented to the inside wall of the steel walled tubular. The HDPE liner may be pulled through the tubular with and left with a friction fit.

Rigid tubulars are of limited length due to conditions and limitations to which the tubulars are subjected on site, such as storage racks and handling equipment. Thus, in the case of sections of pipeline each section is usually about 12 m to 24 m long, while the pipeline may be tens or hundreds of kilometres long. The diameter of the pipeline may be from 2" (54 mm) to 48" (1.22 m). The liner is concentric with the outer steel wall. The liner may be formed from extruded HDPE with a series of external ribs for spacing liner from the outer steel wall, which define axial passages for conveying gases which may permeate from the bore through the liner into the axial passage ways.

WO 2004/016977 discloses a means for connecting pipe, comprising a seal, flanges, a threaded portion and a nut, where the end portion of the pipe is equipped with a concentric press surface located immediately proximal to the periphery of the pipe and designed to be able to take an axial force from a preloading tool, which force is distributed evenly or point-by-point about the periphery of the pipe end to activate the seal arranged between adjacent flanges. The preloading tool comprises two end sections connected to two or more rods, each rod being equipped with a hydraulic cylinder.

The inventor observed that pipelines, flowlines and risers should be wholly recoverable, and components thereof reused once the pipeline was no longer needed. To this end, the inventor observed that ease of recovery is very important to meet this objective.

The inventor has observed that the overall diameter of the connection should be minimised to allow for insertion through tools, holes and to reduce material used in the connection.

The inventor has also observed that the connection requires a large tensile force to be applied to the connection in order to ensure activation of a seal. The inventor has also observed that once the correct tensile force has been applied to the connection, spinning of a nut does not require a high torqueing force, nor a corresponding reaction grip on a non-rotating part of the connection.

The inventor has also observed that alignment of a tensioning tool is critical in perfecting a connection.

There is a need for a way of reducing the risk of corrosion in the coupling and the threads between the coupling and the pipe ends.

There is a need for connecting tubular members which may easily be disconnected, so that the tubular member can be reused.

The inventor also observed that it would be desirable to have a system for confirming that a connection has been made properly at the earliest possible opportunity to do so.

The inventor also observed that there is a need for an end termination which can be made-up to a further connection lying underwater on a seabed.

The inventor also observed that there is a need for an end termination which can be deployed from a vessel, such as a ship or barge in an efficient manner.

In some circumstances, it is desirable to insulate a pipeline to maintain a temperature in the fluid being conveyed. Sometimes it is desirable to keep the fluid at a temperature which facilitates flow of the fluid through the pipeline. Alternatively or additionally, it is desirable to maintain a temperature at which it is unlikely for hydrates to form in the fluid being conveyed.

The inventor also observed that cold spots in the pipeline should be avoided to maintain temperature in the fluid being conveyed. The inventor also observed that there is a need to insulate connections between pipes.

SUMMARY AND STATEMENTS OF INVENTION

In accordance with the present invention, there is provided a system for making a connection between a first tubular member and a second tubular member having coincident bores for conveying a fluid, the connection having an axis in the general direction of flow of said fluid therethrough, the system comprising a connection and a tensioning tool, the connection having a first tubular end comprising a first end flange having an end face and a collar comprising a sleeve and an end stop fixed to the sleeve, said sleeve arranged about said flange and said end stop arranged about said tubular end, said collar slideable along said tubular end, the connection further having a second tubular end comprising a second end flange having an end face and a locking nut about and slideable along said first tubular end, the tensioning tool for applying axial tension to said collar relative to said second tubular end characterised in that at least one of said sleeve and said second tubular end has a set of parallel circumferential grooves therein and said tensioning tool has a set of ridges, the system comprising the steps of moving said set of ridges into said set of grooves and applying an axial tension to said collar relative to said second tubular end.

Alternatively or additionally, the sleeve and second tubular end comprise a set of ridges and the tensioning tool comprises a set of grooves.

The present invention also provides a connection for use in the system of the invention, the connection having a first tubular end comprising a first end flange having an end face and a collar comprising a sleeve and an end stop, said sleeve arranged about said first end flange and said end stop arranged about said first tubular end, said collar slideable along said tubular end, the connection further having a second tubular end comprising a second end flange having an end face and a locking nut about and slideable along said second end characterised in that at least one of said sleeve and said second tubular end comprises a set of circumferential grooves.

Optionally, the collar has an internal threaded portion and the locking nut has a corresponding external threaded portion. Optionally, the internal threaded portion and the has a corresponding external threaded portion of the locking nut are sized to threadedly mate to lock the first and second tubular ends together. Optionally, the sleeve is formed integrally with the end stop for a single piece collar.

Optionally, the end stop is located at a distal end of the sleeve and the set of grooves are located at a proximal end of the sleeve. Optionally, a body portion is provided between the set of grooves and the end stop, which body portion elastically extends during tensioning with the tensioning tool and may remain under elastic extension once the tensioning tool is removed and the connection is made. Optionally, the collar is slideable along the first tubular end until the end stop abuts the first end flange. Optionally, the locking nut is slideable along the second tubular end until the locking nut abuts the second end flange. Optionally, the end stop lies within the sleeve and is concentric therewith. Optionally, the end stop is fixed to or integral with the sleeve. Optionally, the end stop is threaded to the sleeve, the end stop having a male thread and the sleeve having a female thread along at least a portion of an interior surface.

Optionally, each groove of the set of grooves is a sloove. A sloove is a groove with rounded inner corners and a flat bottom portion. Furthermore, slooves optionally have rounded or square top corners. Optionally, the groove has a rounded cross-section or a square cross-section. The grooves preferably increase net bearing area for application of pre-loading compared to a single face while keeping the overall thickness of the collar to a minimum.

The first tubular member has a wall thickness. Optionally, said first tubular end comprises a proximal portion of larger wall thickness than the tubular and less than the wall thickness of the first end flange. Optionally, the second tubular end comprises a proximal portion of larger wall thickness than the second tubular and less than the wall thickness of the second end flange.

Optionally, a seal is arranged between the pipe ends and is activated by tension applied by the tensioning tool and maintained by making the connection. Optionally, the seal is a ring seal arranged in a groove in one end face one of the flanges and projects therefrom. Optionally, a ring gasket seal is pre-installed in a groove in one of the flanges, optionally with a metal to metal super glue and optionally with a flange end protector to protect ends before make-up. The flange end protector is removed before the connection is made.

Optionally, the pipe ends are integral with a tubular member which makes up a pipeline, flowline or riser. Optionally, the pipe ends further comprise a bearing portion which is of greater wall thickness than the thickness of the tubular members making up the pipeline, flowline or riser. Optionally, the flanges are of greater wall thickness than the bearing portions. Optionally, the end stop of the collar is slideable and rotatable along the bearing portion of the first tubular end. Optionally, the nut is slideable and rotatable along the bearing portion of the second tubular end.

In accordance with another aspect of the present invention, there is provided a connection having a first tubular end comprising a first end flange having an end face and a collar comprising a sleeve and an end stop, said sleeve arranged about said first end flange and said end stop arranged about said first tubular end, said collar slideable along said tubular end, the connection further having a second tubular end comprising a second end flange having an end face and a locking nut about and slideable along said second end characterised in that the end stop lies within the sleeve and is concentric therewith, the end stop threaded to the sleeve. Optionally, the end stop has a male thread about its outer surface and optionally, the sleeve has a female thread along at least a portion of an interior surface.

In accordance with another aspect of the invention, there is provided a system for making a connection between a first tubular member and a second tubular member having coincident bores for conveying a fluid and an axis in the general direction of flow of said fluid therethrough, the system comprising a connection and a tensioning tool, the connection having a first tubular end comprising a first end flange having an end face and a collar comprising a sleeve and an end stop, said sleeve arranged about said first end flange and said end stop arranged about said tubular end, said collar slideable along said first tubular end, the connection further having a second tubular end comprising a second end flange having an end face and a locking nut about and slideable along said second tubular end, the tensioning tool for applying axial tension to said collar relative to said second tubular end characterised in that said tensioning tool comprises a set of rams, each ram comprising a piston and a cylinder which apply tension to stretch the sleeve by extending the piston from the cylinder.

A tensioning tool of the system of the present invention, the tensioning tool comprising a structural body, having a first structural end and a second structural end, at least one ram having a fixed end and a free end, the fixed end fixed to said first structural end and said free end movable towards and away from said second structural end, wherein said free having an insert for engaging a collar of a connection.

Optionally, the piston and cylinders are driven using hydraulic fluid.

Optionally, the tensioning tool comprises a retaining apparatus for axially retaining said second tubular end in relation to said cylinder and a further retaining apparatus for axially retaining said sleeve of said first tubular end in relation to said piston. Optionally, the axially retaining apparatus and/or the further axially retaining apparatus comprises a plurality or multiplicity of grooves in the second tubular end and sleeve and ridges in the tensioning tool insertable into the grooves, which are preferably annular and preferably lying in a plane perpendicular to the axis, although may be arranged at an angle thereto in a chevron pattern or the like. Optionally, the axially retaining apparatus and/or the further axially retaining apparatus comprises an annular lug on the second tubular end and the sleeve and a corresponding abutting lugs in the tensioning tool.

In accordance with another aspect of the invention, there is provided a system for making a connection between a first tubular member and a second tubular member having coincident bores for conveying a fluid and an axis in the general direction of flow of said fluid therethrough, the system comprising a connection and a tensioning tool, the connection having a first tubular end comprising a first end flange having an end face and a collar comprising a sleeve and an end stop, said sleeve arranged about said first end flange and said end stop arranged about said first tubular end, said collar slideable along said tubular end, the connection further having a second tubular end comprising a second end flange having an end face and a locking nut about and slideable along said second tubular end, the tensioning tool for applying axial tension between said collar and said second tubular end characterised in that said tensioning tool comprises a structural body and a set of rams about an opening for receiving connection, and parallel with said axis of said connection, each ram having one end fixed to said structural body and a free end moveable upon activation of said ram and an insert arranged on said free ends of said rams, comprising an insert for engagement with said sleeve.

The rams may be of smaller and more cost effective to apply the same pre-load as rams arranged to act in contraction which will result in a more compact tensioning tool.

Optionally, the structural body of said tensioning tool comprises at least a first and second part, each part comprising at least one of ram of said set of rams, each ram having an insert, the first and second parts moveable relative to one another to allow said insert to engage said sleeve of said connection.

Optionally, said insert is arranged in an insert holder. Optionally, the insert is radially moveable in said insert holder.

Optionally, said tensioning tool comprises an insert having a set of ridges and said sleeve comprises a set of grooves, wherein optionally, upon radial movement of said insert, said set of ridges engages in set of grooves. Optionally, the insert holder comprises an insert ram for moving said insert radially relative to said insert holder. Optionally, the tensioning tool further comprises a reaction insert arranged in a reaction insert holder fixed to said structural body. Optionally, each of the first and second parts of the body each comprise at least one reaction insert. Optionally said reaction insert is radially moveable to facilitate engagement with said second tubular end. Optionally, the reaction insert is radially moveable within the insert holder using a ram.

Optionally, the insert is fixed in said reaction insert holder in the structural body and said structural body comprises at least first and second parts moveable radially to and from said connection, whereupon said inserts selectively engage and disengage said second pipe end of said connection. Optionally, the structural body comprises at least first and second parts moveable radially on rails arranged transversely to the axis of the connection. Using the tensioning tool having first and second parts in accordance with the present invention the present invention allows items such as a Pipeline End Termination apparatus to move through the tensioning tool located in a roller bed assembly line on a vessel, as the first and second parts of the tensioning tool can move apart sufficient for the PLET to pass therethrough.

Optionally, an alignment guide is provided in said structural body which may be radially movable or may be radially fixed. The alignment guide may be used for axially aligning the inserts with the grooves. The alignment guide may comprise an end stop, for a part of the connection to abut to align the grooves with the ridges of the reaction inserts of the second tubular end and may also align the ridges of the inserts with the grooves of the collar of the first tubular end of the connection. The alignment guide may also be used as an additional reaction surface for a part of the connection to bear against during tensioning.

Optionally, the tensioning tool further comprises a spinner to spin the locking nut of the connection. Optionally, the spinner is arranged on the free end of the ram and movable therewith. Optionally, the spinner is arranged on the insert holder. The spinner may comprise a wheel with a smooth perimeter for spinning the locking nut on a smooth wall portion of the locking nut. Optionally, the smooth perimeter has a surface to facilitate an increase in contact force, such as a rubber or other high friction surface. The spinner need only spin the locking nut to a low torque to lock the collar in place. Thus, the spinner may not need a wheel provided with a castellated portion to mate with a corresponding castellated portion on the locking nut nor a toothed portion or the like to mate with a toothed track on the locking nut.

The tensioning tool of the present invention may use rams that apply the required tensioning force to preload the collar in compression may be more efficient than if the tensioning force to preload the collar is applied with rams in tension. Optionally, the tensioning force is applied to the connector via inserts that can be interchanged to suit connector/pipe size. The preloading tooling may be made in first and second parts that can be opened such that end terminations can be lifted out using a pipe laying vessel's crane. The tensioning tool may be fitted with sensors such that the pipe/connector stop at the correct location for the slooves to engage with the inserts of the tensioning tool. At this point the pipe may be held by a separate hang-off unit.

In accordance with another aspect of the invention, there is provided a system for making a connection between a first tubular member and a second tubular member having coincident bores for conveying a fluid and an axis in the general direction of flow of said fluid therethrough, the first and second tubulars having a wall thickness defined by the bore and an outer surface, the system comprising a connection and a tensioning tool, the connection having a first tubular end comprising a first end flange having an end face and a collar comprising a sleeve and an end stop, said sleeve arranged about said flange and said end stop arranged about said first tubular end, said collar slideable along said tubular end, the connection further having a second tubular end comprising a second end flange having an end face, a proximal portion and a locking nut about and slideable along said proximal portion and a shoulder arranged between the second tubular end and the proximal portion, the tensioning tool for applying axial tension between said collar and said second tubular end characterised in that said tensioning tool comprises a body and a set of rams about an opening for receiving connection, and parallel with said axis of said connection, each ram having one end fixed to said body and a free end comprising engaging means for engaging said sleeve, said set of rams for applying tension to said connection, wherein said tensioning tool further comprises an alignment guide about an opening in said tensioning tool for receiving said connection, said alignment guide radially movable from a retracted position allowing said connection to pass through said opening and a radially extended position to abut said shoulder of said connection to align said engagement means with said connection.

In accordance with another aspect of the invention, there is provided a system for making a connection between a first tubular member and a second tubular member having coincident bores for conveying a fluid and an axis in the general direction of flow of said fluid therethrough, the first and second tubulars having a wall thickness defined by the bore and an outer surface, the system comprising a connection and a tensioning tool, the connection having a first tubular end comprising a first end flange having an end face and a collar comprising a sleeve and an end stop, said sleeve arranged about said flange and said end stop arranged about said first tubular end, said collar slideable along said tubular end, the connection further having a second tubular end comprising a second end flange having an end face, a proximal portion and a locking nut about and slideable along said proximal portion and a shoulder arranged between the second tubular end and the proximal portion, the tensioning tool for applying axial tension between said collar and said second tubular end characterised in that said tensioning tool comprises a body and a set of rams about an opening for receiving connection, and parallel with said axis of said connection, each ram having one end fixed to said body and a free end comprising engaging means for engaging said sleeve, said set of rams for applying tension to said connection, wherein said tensioning tool further comprises an alignment guide about an opening in said tensioning tool for receiving said connection, the structural body of said tensioning tool comprising at least a first and second part, each part comprising at least one of ram of said set of rams, the first and second parts moveable relative to one another to selectively allow said connection to pass through said opening or abut said shoulder of said connection to align said engagement means with said connection. Optionally, the alignment guide has a portion fixed to at least one of the first part of the structural body, preferably both. Optionally, the alignment guide is radially fixed to the structural body.

In accordance with another aspect of the invention, there is provided a system for confirming a connection between first and second tubulars has been made, the system comprising a connection and a tensioning tool, the connection having a first tubular end comprising a first end flange having an end face and a collar comprising a sleeve and an end stop fixed to the sleeve, said sleeve arranged about said flange and said end stop arranged about said first tubular end, said collar slideable along said tubular end, the connection further having a second tubular end comprising a second end flange having an end face and a locking nut about and slideable along said second tubular end, the tensioning tool for applying axial tension between said collar and said second tubular end characterised in that said tensioning tool further comprises a camera having a field of view directed at said sleeve of said collar for collecting images of the sleeve during tensioning of the sleeve. This is a non-contacting optical technique for measuring strain in the sleeve.

Optionally, the system further comprises a computer for executing an algorithm to assess the strain in said sleeve. Optionally, the algorithm is based on Digital Image Correlation (DIC) technique.

Optionally, the camera is a CCD (Charged Coupled Device) or CMOS (complementary metal-oxide semiconductor) camera.

Optionally, the sleeve of the collar is prepared by coating an exterior surface of the sleeve with a coating. Optionally, the coating is a paint, preferably providing a pattern which is random, rich in contrast, speckle pattern which is typically created with standard aerosol paints. Optionally, the natural surface pattern of the sleeve maybe suitable. The pattern (which can be natural, or applied) is tracked all over the surface of the imaged material.

Optionally, the sleeve has a set of grooves therein along a portion thereof, and a smooth walled portion. The smooth walled portion may provide a length of the sleeve within the camera's field of view for contactless strain measurement.

Optionally, the camera is arranged on the free end of the ram and optionally, on the insert holder. Thus, the camera remains in a fixed, known position in relation to the sleeve of the connection.

Optionally, a second camera is arranged in the tensioning tool and has a field of view directed at said sleeve. Optionally, a light source is provided which is generally directed in the same field of view as the camera. Optionally, the tensioining tool comprises a camera assembly which comprises a housing housing the camera. Optionally, the housing also houses the light source. Optionally, the housing also comprises the second camera.

Optionally, the system further comprises the step of converting the strain into a stress using Young's Modulus of the material of the sleeve to present a load figure which an operator uses to assess if there is sufficient load in said connection to activate and maintain a seal.

The system may incorporate a single camera forming part of a single DIC assembly or dual cameras forming part of a dual DIC assemblies where the strain measurements can be compared to each other for redundancy and/or error checking.

The tensioning tool may be for use on a pipe laying vessel or for use subsea.

Optionally, the system comprises the step of applying tension to said collar with said tensioning tool and spinning said locking nut to lock the first end termination and further end termination together to make said connection.

Optionally, the system further comprises the step of relaxing and releasing the tension provided by the tensioning tool, collecting images of the sleeve after release.

The present invention also provides a method for confirming a connection between first and second tubulars has been made, the method comprising the steps of: capturing an image of at least a portion of a sleeve of a collar of an unmade connection; applying tension in said collar; locking said collar to make said connection; relaxing and releasing tension in said collar and capturing at least one further image after release; and comparing said images or data obtained from said images to obtain a strain measurement. The tension is applied axially with the tubulars.

Optionally, the method further comprises the step of comparing said strain measurement with a predetermined strain measurement to assess if a connection has been properly made. Optionally, the method further comprises the step of capturing a yet further image during tensioning to assess strain and relaxing tension when said strain meets or exceeds a predetermined threshold. Optionally, the step of locking said collar comprises the step of rotating a locking nut preferably about the axis of said tubulars.

Optionally, the sleeve of the collar is prepared by coating an exterior surface of the sleeve with a coating.

Optionally, the method further comprises the step of converting the strain into a stress using Young's Modulus of the material of the sleeve to calculate a load figure.

The present invention also provides a method for connecting first and second tubulars, the method comprising the steps of capturing an image of at least a portion of a sleeve of a collar of an unmade connection, applying tension in said collar, capturing at least one further image during tensioning in said collar to assess strain and relaxing tension when said strain meets or exceeds a predetermined threshold.

Optionally, if the strain does not meet or exceed a predetermined threshold, tensioning continues and at least one yet further image is captured to assess strain and relaxing tension when said strain meets or exceeds a predetermined threshold.

In accordance with another aspect of the invention, there is provided an apparatus to support an end of a pipeline or flowline, the apparatus comprising a base with at least one raised support for supporting an end of pipeline or flowline characterised in that a deployment frame is hinged to said base.

Optionally, the apparatus further comprises a curved section of pipe having first and second ends, the first end supported by or held by or located on said at least one raised support and having an end termination and said second end trailing from said base and provided with a further end termination. Optionally, the curved section of pipe is rigid to the extent that it maintains its curve permanently in normal use. Optionally, the curved section of pipe assumes a lazy S-shape, having one end supported on the raised support lying either horizontally, vertically or at an angle therebetween and a second end trailing from the base, preferably horizontally. Optionally, the curved pipe comprises at least two sections, optionally welded together, at least one of which of which may be curved. Optionally, the curved portion comprises a straight portion of pipe on to which said further end termination is attached. The straight portion may trail between 10 m and 20 m from the frame.

Optionally, the base comprises a frame made up of a plurality of structural beams. Optionally, the beams are of square, round, oval or polygonal section. Optionally, at least one mud mat is hinged to said base.

Optionally, the end of the pipeline or flowline is a first pipe end or second pipe end of a connection of the type disclosed herein. Optionally, the connection of the present invention, or any other connection disclosed herein.

Optionally, the apparatus comprises at least one articulation to facilitate feeding the apparatus along a curved bed of the stinger. The articulation may facilitate an underside of the apparatus to conform to the curved bed of the stinger.

Optionally, the apparatus further comprises a shackle, lug or other suitable connection to facilitate pulling the apparatus along the stinger, preferably with a wireline. Optionally, the apparatus comprises a base and a deployment frame hinged thereto to allow articulation in a vertical plane. Optionally, a wireline is attached to the deployment frame to pull the apparatus along the stinger to facilitate feeding. Optionally, the wireline is attached to the deployment frame with a shackle and optionally, a swivel.

This aspect of the present invention also provides a pipeline end termination comprising a base with at least one raised support for supporting an end of pipeline or flowline characterised in that the apparatus further comprises a starting pipe section having a curved portion and first and second ends, the first end supported by or held by or located on said at least one raised support and having an end termination and said second end trailing from said base and provided with a further end termination wherein one of the end terminations comprises a first end flange having an end face and a collar comprising a sleeve and an end stop, said sleeve arranged about said first end flange and said end stop arranged about a first tubular end, said collar slideable along said tubular end, the other end termination comprising a second tubular end comprising a second end flange having an end face and a locking nut about and slideable along said second end wherein at least one of said sleeve and said second tubular end comprises a set of circumferential grooves.

This aspect of the present invention also provides a method for deploying a pipeline end termination from a pipelaying vessel, the pipeline end termination of the invention, the method comprising the steps of attaching an end termination to at least one joint of pipeline to the second end termination of the pipeline end termination, feeding the apparatus with said pipeline along a stinger of the pipe laying vessel to a destination on a seabed.

Optionally, the method further comprises the step of pulling the pipeline end termination along the stinger with a wireline. Optionally, the wireline is arranged about a sheave of a block fixed to or to a frame fixed to the seabed. Optionally, the wireline is wound around a driven drum on a pipe laying vessel and reeled therefrom. Optionally, the pipe laying vessel having a firing line comprising a roller bed, a tensioning tool for tensioning said connection, at least one of one of a hang-off or pipeline tensioner, and a stinger, the method further comprising the step of lifting said frame of said pipe end termination on to firing line aft of the tensioning tool, and the at least one of one of a hang-off or pipeline tensioner, with a straight portion of said starting pipe section within said tensioning tool.

Optionally, the wireline is arranged about a sheave of a block fixed to or to a frame fixed to the seabed for deploying a starting end to a pipeline or flowline. The block may be fixed to a pile driven into the seabed or an initiation block. Optionally, the wireline is wound around a driven drum on the pipe laying vessel and reelable in and out therefrom.

In accordance with another aspect of the invention, there is provided a method for connecting a pipeline to a subsea device such as a manifold or a subsea tree of a wellhead, the method comprising the steps of providing an apparatus supporting a starting pipe section, the starting pipe section provided with a first end termination and a second end termination, the method further comprising the steps of connecting the second end termination to an end termination of a pipeline being deployed and lowering the apparatus on to a seabed, axially aligning a further end termination with the first end termination, one of said first end termination and further end termination having a collar and the other having a locking nut and spinning one of the locking nut and collar to form a connection, installing an underwater tensioning tool about said connection and applying tension to said collar with said tensioning tool and spinning said locking nut to lock the first end termination and further end termination together to make said connection.

Optionally, the subsea device has a flexible tubular or rigid pipe spool provided with said further end termination.

Optionally, the method further comprises the step of pigging the pipeline before the first end termination is made to said further end termination of the subsea device.

In accordance with the present invention, there is provided an underwater tensioning tool comprising at least two parts, each part provided with at least one ram, said parts having a central opening for receiving a connection, the parts movable radially about the connection to allow the be clamped together about the connection.

The present invention also provides system for connecting the end of a pipeline or flowline on the seabed to a subsea device, the system comprising an apparatus having a base with at least first and second raised supports each comprising a seat, said first raised support for supporting a first end termination of a starting pipe section (360), the second raised support for supporting the further end termination of a connection of a linking tubular, said at least first and second raised supports spaced to allow said first end end termination to be connected with said second end of said connection and for receiving a tensioning tool for applying an axial tension to a sleeve of the connection. Optionally, the tensioning tool is the tensioning tool in the present invention. Optionally, the tensioning tool comprises first and second parts forming a throat, the first and second parts hinged to open about said connection between said first and second raised supports to receive said connection in said throat and closable about said connection whereupon said tensioning tool is activated to apply tension to said sleeve of said connection. Optionally, the raised supports are arranged to support the end termination in a horizontal plane. Optionally, the tensioning tool is lowered on a line from a surface vessel and aligned between the raised supports by a diver or a Remote Operated Vehicle (ROV).

The end termination may be arranged horizontally for connection with a corresponding termination in a horizontal plane or may be arranged vertically for connection with a corresponding termination in a vertical plane (not shown in the drawings).

In accordance with another aspect of the invention, there is provided a connection comprising first and second tubular members having a coincident bore, said first tubular member lined with a liner having a first flow path in an annular region therebetween, said second tubular member lined with a liner having a second flow path in an annulus therebetween, said first tubular member having an end flange and the second tubular member having a corresponding end flange, characterised in that said flange and said corresponding flange comprise a further flow path to link said first flow path with said second flow path.

In accordance with this aspect of the invention, there is also provided system comprising a pipeline provided with a multiplicity of connections, each connection comprising first and second tubular members having a coincident bore, said first tubular member lined with a liner having a first flow path in an annular region therebetween, said second tubular member lined with a liner having a second flow path in an annulus therebetween, said first tubular member having an end flange and the second tubular member having a corresponding end flange, characterised in that said flange and said corresponding flange comprise a further flow path to link said first flow path with said second flow path, the system further comprising a manifold for maintaining a constant flow through said flow path along at least a portion of said pipeline.

Optionally, the flow path comprises a port extending through said flange and optionally a further port extending through said corresponding flange. Optionally, at least one of the flange and corresponding flange has an annular recess therein for receiving a ring seal, and optionally, the port extends to said recess. Optionally, the connection further comprises a ring seal located in said recess. Optionally, the ring seal is glued therein to inhibit the ring seal falling out of the recess during make-up of the connection. Optionally, the ring seal has a plurality of holes therethrough to allow fluid to flow between adjacent flanges and optionally, recesses. Optionally, the ring seal sits in the recess with an annular space therebehind.

Optionally, the liner has an end portion which sits in an annular cavity in said first tubular member and optionally in said second tubular member. The annular cavity has a final depth optionally substantially equal to the thickness of the liner. Optionally, the annular cavity has a smooth transition region between the inner diameter of the tubular member and the final depth. Optionally, an annular gap is provided between an end of the liner and an end of the annular cavity.

Optionally, the liner is made from an HDPE (high-density polyethylene), PVDF (polyvinylidene difluoride) or XLPE (Cross-linked polyethylene). Optionally, the liner is formed by extrusion.

This aspect of the present invention also provides a method of inhibiting build-up of gases between a liner and a tubular member in a pipeline, comprising at least two tubular members with a connection therebetween, an annular region between each liner and respective tubular member, with at least one flow path in said annular region, and the connection comprising a further flow path, the method comprising the steps of allowing a fluid to flow through said further flow path between said flow paths in said annular region between said liners and said tubular members.

Optionally, the method further comprises the step of inducing movement in the fluid along the flowpath between the liner and the tubular member into a manifold. Optionally, the manifold is arranged onshore. Optionally, the manifold is arranged subsea. Optionally, a manifold is located subsea and a further manifold is located onshore. Optionally, a plurality of manifolds are spaced along the pipeline. Optionally the manifold comprises a pump. Optionally, the pump is a negative pressure pump to induce a pulling force to the fluid. Optionally, the pump is a positive displacement pump to induce a movement to the fluid. Optionally, the pipeline is attached to the manifold with a flange connection. Optionally, the connection is a connection as disclosed herein with respect to FIGS. 1 to 3, or any other connection disclosed herein. Optionally, the connection comprises a ring seal having a multiplicity of axial holes therethrough and optionally arranged in a recess having a contact area for the ring seal to contact to form a seal and an annular flowpath between the ring seal and a wall of the recess to facilitate flow of fluid across the connection. Optionally, a multiplicity of holes are provided which extend from the annular flow path to the axial flowpath between the liner and the tubular.

The inventor has noted that it is important in a lined and coated pipeline to inhibit corrosion in or close to connections between joints of pipe in a pipeline, flowline or riser.

The present invention also provides a pipeline comprising a tubular member having a pipe end provided with a flange, the flange having and external surface, an internal surface and an end face, the end face having an annular recess therein for receiving a ring seal, the annular recess lined with an inlay characterised in that the inlay extends from said annular recess to the internal surface.

Optionally, the inlay extends along the internal surface. Optionally, for between 25 mm and 100 mm and optionally for 50 mm to 75 mm. Optionally, the pipeline is lined with a liner. Optionally, the liner overlaps the inlay. Optionally, the inlay is made from a stainless steel or Inconel. Optionally, a compression ring is used at the flange end of a lined joint of pipeline, wherein the compression ring overlaps the inlay. Optionally, the liner is spaced from the internal wall of the tubular member to provide a fluid flowpath and a hole is arranged in the flange and a further hole in said inlay aligned with the hole to fluidly connect the flowpath with the annular recess, preferably to provide a flowpath across the pipe end and into a corresponding pipe end connected thereto to provide a continuous flowpath along the pipeline. Optionally, the inlay is formed with an annular recess in at least one end face of the flange to provide an annular flowpath for gases to circulate.

In some pipelines, flowlines or risers, it is advantageous maintain a temperature in the fluid being conveyed. It is thus advantageous to insulate the pipeline, flowline or riser. The inventor has noted that it is important not to have bridges in the pipeline, flowline or riser where temperature variations can not only change the temperature of the fluid being conveyed, but may induce the formation of hydrate crystals and/or flow patterns within the fluid.

The present invention also provides an insulated pipeline comprising a first and second inner tubular members, each having a concentric outer carrier pipe and insulation in an annulus therebetween, the tubular members having each having a pipe end and a connection therebetween, the connection comprising a first pipe end comprising first hub and a first end flange having an end face and a collar comprising a sleeve and an end stop fixed to the sleeve, said sleeve arranged about said first end flange and said end stop arranged about said first pipe end, said collar slideable along said pipe end, the second pipe end comprising a second hub, a second end flange having an end face and a locking nut about and slideable along said first pipe end, wherein the connection comprises an insulating jacket.

Optionally, the outer carrier pipe is welded to the hub. Optionally, a seal is arranged between the insulating jacket and the connection. Optionally, a seal is provided at each end of the insulating jacket, optionally in an annular or semi annular recess. Optionally, the insulating jacket comprises shells which can be offered up to the connection radially and optionally held in place on the connection with bands to inhibit the shells from parting radially from the connection. The insulating jacket optionally comprises a contoured inner surface to substantially match contours of the connection, including the collar, hubs, grooves or slooves and carrier pipe. Optionally, the insulating jacket overlaps the insulated pipe to inhibit bridging.

For the avoidance of doubt, a system, apparatus or method of the invention may comprise any or all of the aspects and optional feature and steps as set out herein.

BRIEF DESCRIPTION OF THE DRAWINGS

For a better understanding of the present invention reference will now be made, by way of example only, to the accompanying drawings, in which:

FIG. 1 is a perspective view in section of a connection in accordance with the present invention;

FIG. 2 is a cross-sectional view of the connection shown in FIG. 1 in a final stage of connection;

FIG. 3 is a side view of the connection shown in FIG. 1 in the final stage of connection;

FIG. 7 is a perspective view of a tensioning tool in accordance with the present invention for use in making a connection in accordance with the present invention;

FIG. 8B is a perspective view showing a first half of a further embodiment of a tensioning tool, with a connection shown in FIG. 1 between two tubular members in the tensioning tool and a hang-off apparatus for use in controlling deploying a string of tubular members;

FIG. 11 is a scrap sectional perspective view of part of a second half of the tensioning tool shown in FIG. 7 comprising a camera system in accordance with the present invention and with a connection arranged in the tensioning tool shown in section;

FIG. 17 is a side view of the pipeline end termination and flexible pipe shown in FIG. 16;

FIG. 18 is a side view of the pipeline end termination and flexible pipe with a tensioning tool of a system for connecting a pipeline to a subsea device in accordance with the present invention showing a stage in making-up a pipeline end termination with the flexible pipe provided with a corresponding end termination;

FIG. 19 is an end view, partly in section, of the pipeline end termination and flexible pipe with tensioning tool shown in FIG. 18;

FIG. 20 is a side view of the pipeline end termination and flexible pipe with tensioning tool shown in FIG. 18, the tensioning tool shown in cross-section FIG. 21 is a schematic side cross-sectional view of part of a lined pipeline and connection between sections of pipeline in accordance with a further aspect of the present invention;

FIG. 21A is a cross-sectional view of part of a lined pipeline shown in FIG. 21;

FIG. 22A is a schematic view of a pipeline in accordance with the present invention comprising a lined pipe connection in accordance with the present invention;

FIG. 22B is a schematic view of an end of a pipeline in accordance with the present invention terminating at an onshore manifold;

FIG. 25A is a side view in cross-section of part of an insulated pipeline in accordance with another aspect of the present invention; and FIG. 25B is a cross-sectional view of the part insulated connection shown in FIG. 25A.

DETAILED DESCRIPTION

Figures 4, 5:
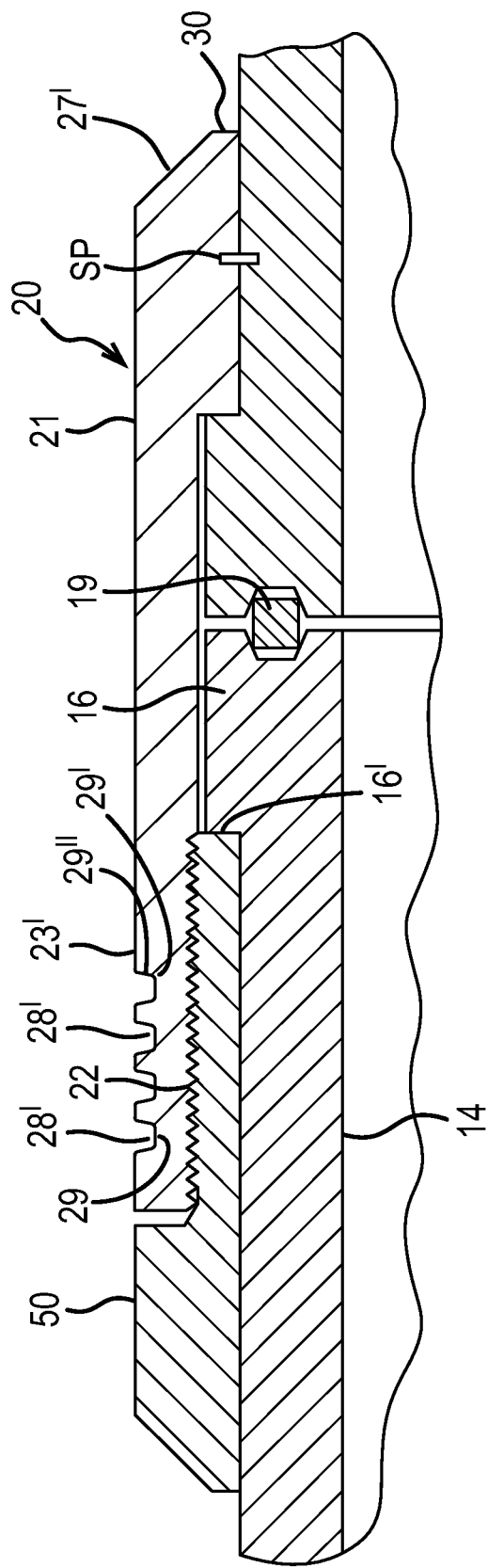
FIG. 4 is an enlarged cross-sectional view of a connection in accordance with the present invention comprising an alternative collar.
FIG. 5 is a perspective view of a BX-type ring gasket used in the connection shown in FIG. 1.

Referring to FIGS. 1 to 3, there is shown a connection 1 between two tubular members 2 and 3 having substantially coincident bores 4 and 5 for conveying fluids.

Each tubular member 2 and 3 may be made from any suitable material, such as mild steel, high strength steel, stainless steel, plastics material, or composite materials. The tubular member may be of circular cross-section. The tubular members 2 and 3 are shown without a lining, although the tubular member may also be lined with a suitable corrosion resistant liner. The tubular members 2 and 3 may be of any suitable length and may have a pipe end 6 and 7 at each end to make a connection with an adjacent tubular member at each end to form a string of tubular members.

In this example, the tubular members 2 and 3 are each made from a high strength steel, such as a high carbon content steel. The tubular members 2 and 3 are made up of four 12 m (40 ft) long sections of tubular (not shown in the Figures), which may have a circumferential chamfer on the external surface of each end of the sections of tubular across the thickness of the wall of the tubular member and welded together with butt welds within a space provided by the abutting tapers to form a tubular member 48 m (160 ft) long (not shown in full). The welded four sections of tubular are provided with pipe ends 6 and 7 at each end. The welded four sections of tubular and pipe ends 6 and 7 may be referred to as a "quad joint". The tubular members 2 and 3 have an inner surface bounding the respective bore 4 and 5 and an outer surface defining a wall thickness 13 therebetween. Alternatively, the tubular member may comprise one (12 m), two (24 m, known as a double), three (36 m known as a triple) or other suitable number of welded together sections.

The connection 1 comprises first and second pipe ends 6 and 7 which are welded to the tubular members 2 and 3 respectively with a circumferential butt welds 8 and 9. The welds 8 and 9 may be machined to produce a smooth continuous external surface. The internal surface is generally smooth. Machining the welds may also improve fatigue performance. The pipe ends 6 and 7 have substantially coincident bores 10 and 11, which are also substantially coincident with bores 4 and 5 to form a continuous bore for the passage of fluid. It should be noted that the pipe ends 6 and 7 may alternatively be adhered to the tubular members 2 and 3 or otherwise attached. Alternatively, the pipe ends 6 and 7 may be formed integrally with the tubular members 2 and 3.

First pipe end 6 has a distal end portion 12 having a wall thickness which is substantially equal to the wall thickness 13 of the tubular member 2. First pipe end 6 also has a proximal portion 14 of increased wall thickness, having an outer wall of larger diameter than the outer diameter of the tubular member 2. The wall thickness of the proximal portion 14 may be approximately double the wall thickness 13 of the tubular members 2 and 3, although may be of any suitable thickness. A shoulder 15 is formed between the outer surface of the distal portion 12 and the enlarged outer diameter of the proximal portion 14. The shoulder 15 may be chamfered. The first pipe end 6 also has a proximal end flange 16 of a greater wall thickness than the proximal portion 14 and may be approximately triple the wall thickness 13 of the tubular member 2 although may be of any suitable thickness. A shoulder 16' is formed between the outer surface of the proximal portion 14 and the outer diameter of the proximal end flange 16. The shoulder 16' may be perpendicular to the axis X-X of the pipe, or may be chamfered at any suitable angle. The proximal end flange 16 has a substantially planar end face 17 lying in a plane perpendicular to axis X-X of the connection 1. The planar end face 17 has a continuous recess 18 therein, which is substantially concentric with the inner and outer wall of the proximal end flange 16 and is arranged therebetween. The continuous recess 18 is sized and shaped to receive a first portion of ring seal gasket 19, leaving a second portion protruding from the continuous recess 18. The ring seal gasket 19 may be placed loosely in the recess or may be adhered therein with a glue, such as a metal-to-metal glue, or may be sized to form a friction fit therebetween. The first pipe end 6 may be made from a single piece of material, such as high strength steel.

The ring seal 19 may be a BX Type Ring Joint Gasket, which are generally CNC machined. The BX Type Ring Joint Gasket are energised by providing an axial force when making the connection 1. The BX Type Ring Joint Gasket may, as shown in FIG. 5 may have chamfered corners 19', although a ring seal may be of square section. The ring seal may be made from a high strength seal or a stainless steel, preferably having a high chromium content. The ring seal 19 may be made from a stainless steel such as grade 316L or an Inconel, such as grade 825.

Figure 6:
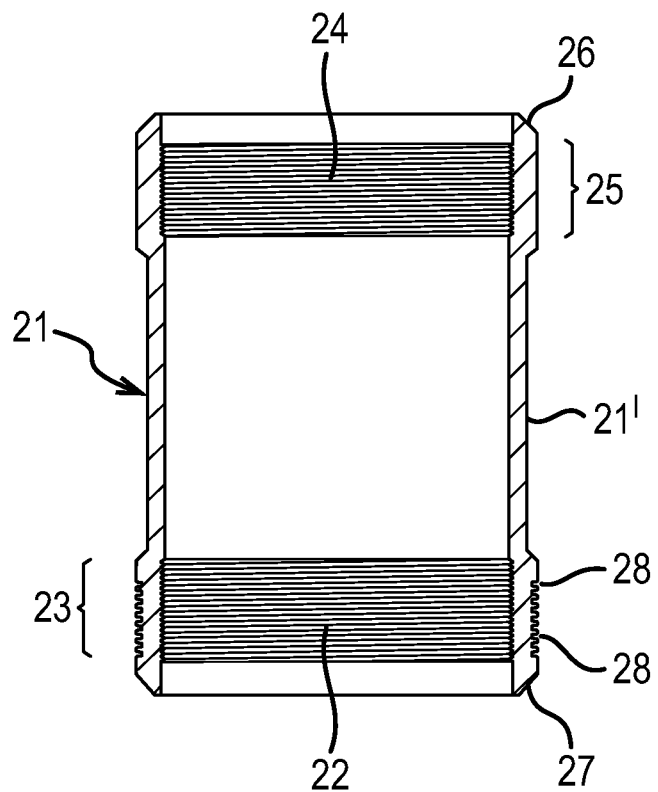
FIG. 6 is an enlarged side cross-sectional view of a sleeve of a collar of the connection shown in FIG. 1.
Figure 6A:
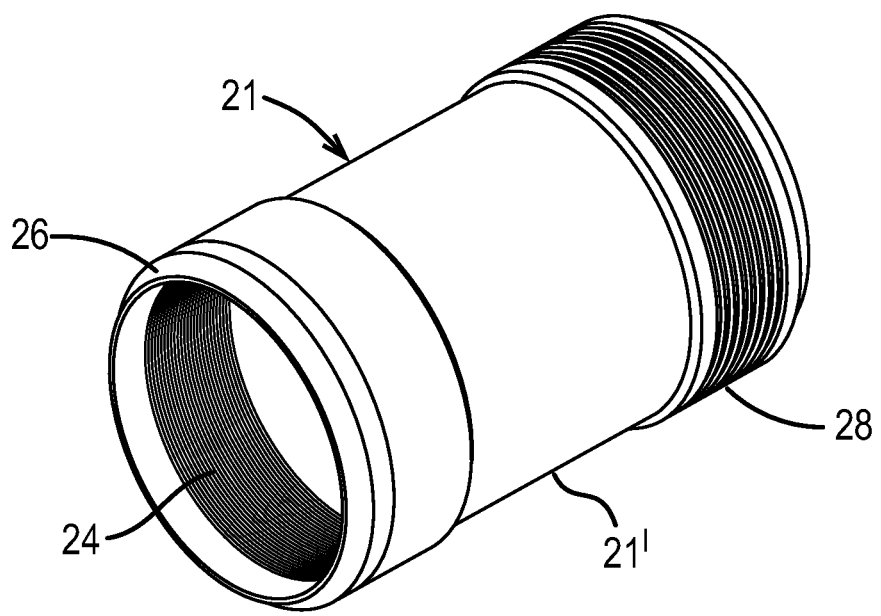
FIG. 6A is a perspective view of the sleeve shown in FIG. 6.
Figure 7A:
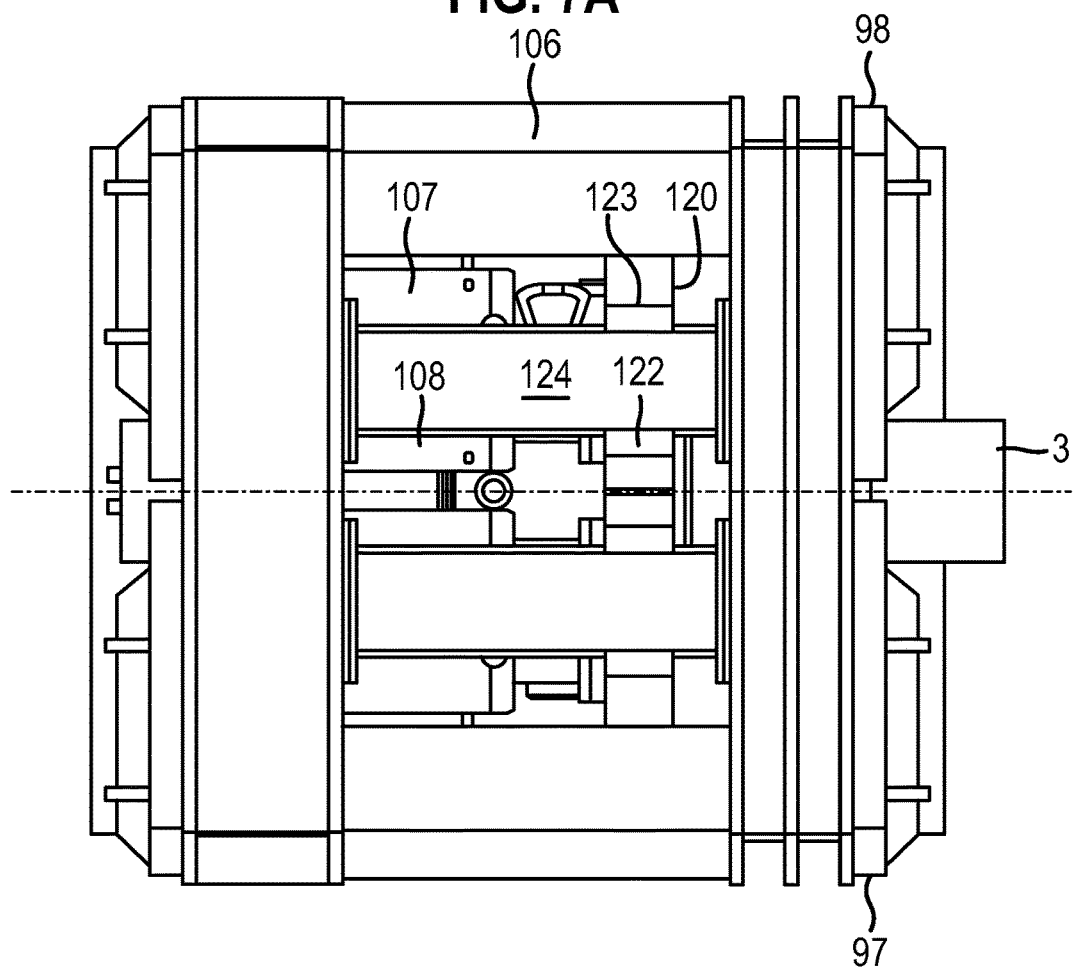
FIG. 7A is a top plan view of the tensioning tool shown in FIG. 7.
Figure 7B:
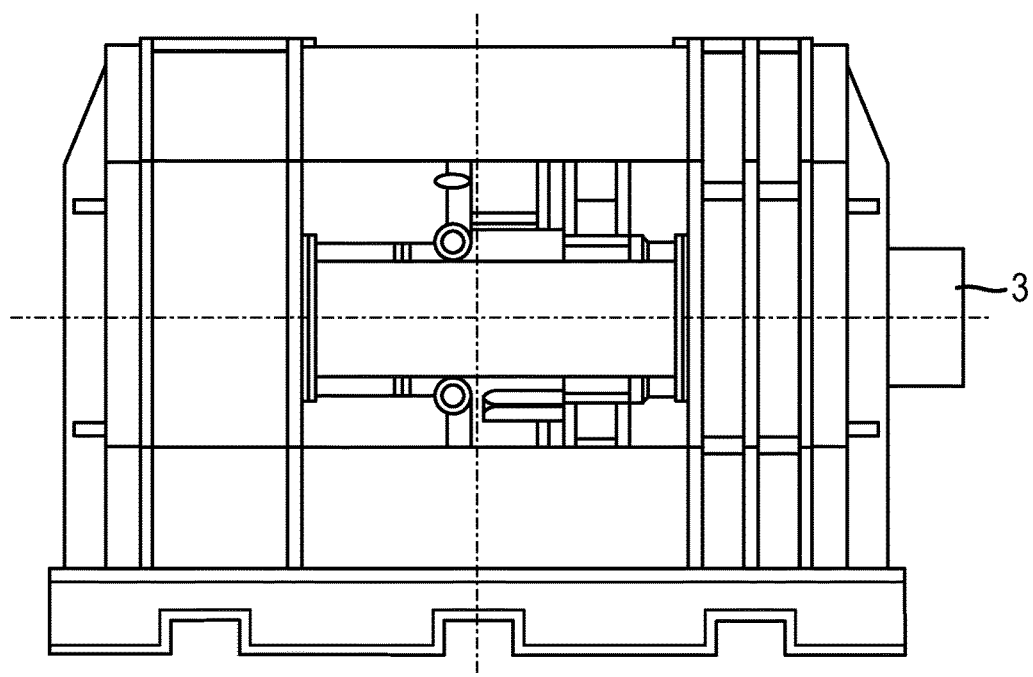
FIG. 7B is a side elevation of the tensioning tool shown in FIG. 7.

The first pipe end 6 has a collar 20 comprising a sleeve 21 shown in detail in FIGS. 6 and 6A. The sleeve 21 is tubular having a circular cross-section and may be made from a high strength steel. The sleeve 21 has a wall thickness defined by an inner surface of a diameter substantially equal or very slightly larger than the outer diameter of the proximal end flange 16, such that in use, the sleeve 21 can slide over the outer surface of the proximal end flange 16. The wall thickness of the sleeve is also defined by an outer surface which may be of constant diameter, as shown in the embodiment of FIG. 4 or may have a recessed body portion 21' of slightly smaller diameter, as shown in FIGS. 1 to 3, 6 and 6A. The sleeve 21 has a female thread 22 tapped into the inner surface along a proximal end portion 23. The sleeve 21 also has a female thread 24 tapped into the inner surface along a distal end portion 25. An outer surface of the sleeve 21 has chamfered ends 26 and 27 and a set of parallel circumferential grooves 28 spanning the proximal end portion 23.

Referring to FIG. 1, the collar 20 also comprises an end stop ring 30 having an inner surface defining a diameter substantially equal to or slightly larger than the outer diameter of the proximal end portion 14, such that, in use the end stop ring 30 is slideable along the proximal end portion 14. The inner surface may be smooth. The end stop ring 30 is a continuous ring having an outer surface of a diameter substantially equal to the inner diameter of the sleeve 21. The outer surface is provided with a male thread 31 which mates with female thread 24 of the end portion 25 of the sleeve 21. During construction of the connection 1, the sleeve 21 is slid from the free end of the pipe end 6 over the proximal end flange 16, whereupon the end stop ring 30 is threaded into the sleeve 21 and remains fixed therein. It should be noted that the end stop ring 30 is not separated from the sleeve 21 whilst a connection is made-up in the field.

To ease assembly, the end stop ring 30 may comprise two semi-circular clam shell portions (not shown) which can be offered up radially to the proximal end portion 14 of the pipe end 6. Screw threads on each of the clam shell portions match and align to form a continuous thread about the outer surface of the clam shell. During assembly, the sleeve 21 is then slid over the free end of the pipe end 6 and threaded on to the clam shell portions forming the end stop ring 30.

Alternatively, as shown in FIG. 4, the end stop ring 30 may be formed integrally with the sleeve 21, such that the collar is formed in a single piece and then slid on to the pipe end 6 before the pipe end is welded or otherwise attached to the tubular member 2. The collar shown in FIG. 4 also shows the outer diameter having a constant diameter, save for a distal end chamfer 27' and plurality of parallel circumferential tensioning slooves 28' spanning the proximal end portion 23'.

Figure 10:
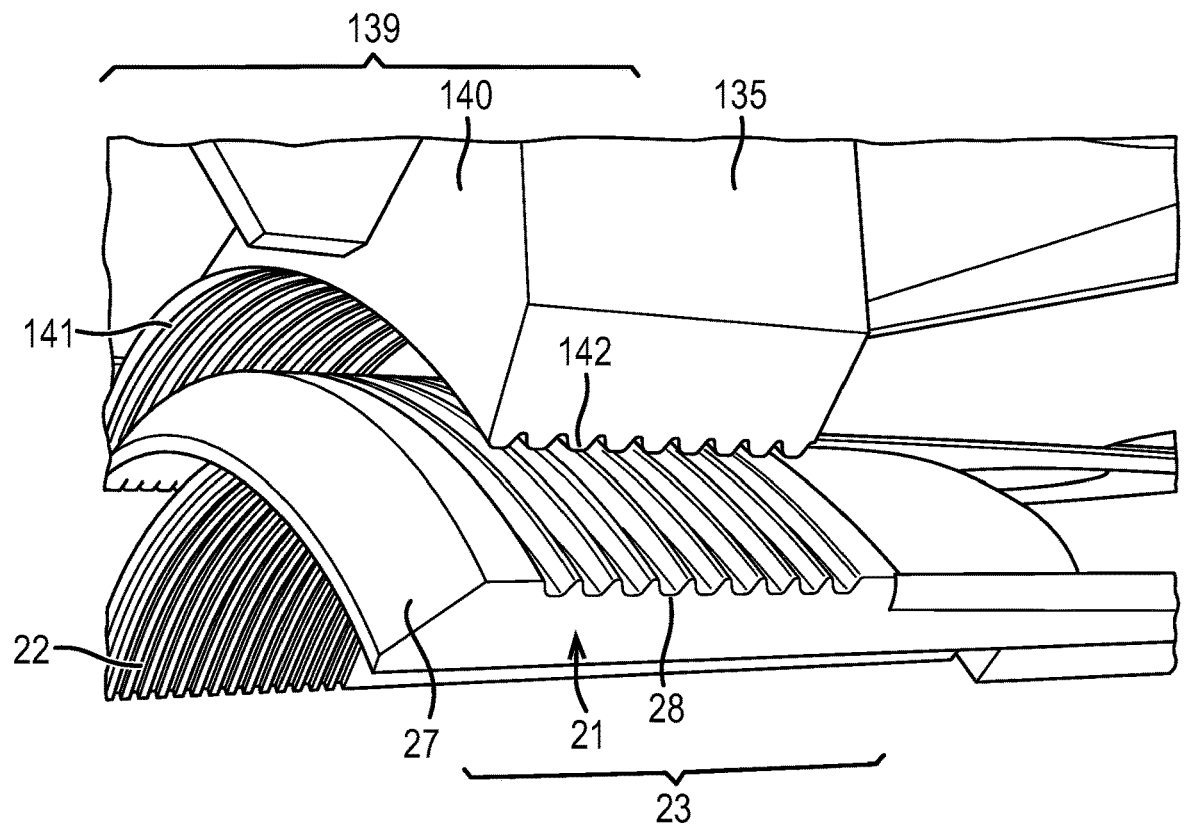
FIG. 10 is a perspective view showing part of the sleeve shown in FIG. 6 and showing a portion of an insert of a tensioning tool.
Figure 10A:
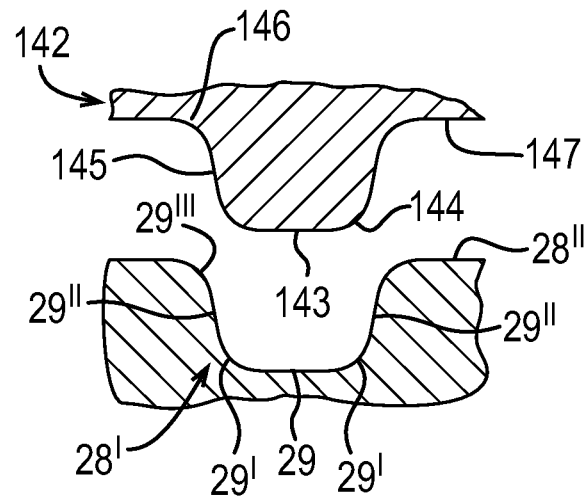
FIG. 10A is a cross-sectional view showing a sloove and a sloove ridge.

A sloove 28' is a particular type of groove, with a substantially flat bottom 29 with curved corners 29' joining the flat bottom 29 to substantially vertical side walls 29". A further example of a sloove is shown in FIG. 10A, in which the sloove 28' comprises a flat bottom 29 with curved corners 29' joining the flat bottom 29 to substantially vertical side walls 29". Curved top portion 29''' joins the side walls 29" to substantially flat tops 28". The cross-section of a sloove resembles a U-shape.

The second pipe end 7 has a distal end portion 40 having a wall thickness which is substantially equal to the wall thickness of the tubular member 3. An end of the distal end portion 40 is welded to an end of the tubular member 3. Second pipe end 7 also has a proximal portion 41 of increased wall thickness, having an outer wall of larger diameter than the outer diameter of the tubular member 3. The wall thickness of the proximal portion 41 may be approximately double the wall thickness 13 of the tubular member 3. A shoulder 42 is formed between the outer surface of the distal portion 12 and the enlarged outer diameter of the proximal portion 41. The shoulder 42 may be chamfered. The second pipe end 7 also has a proximal end flange 43 of a greater wall thickness than the proximal portion 41 and may be approximately triple the wall thickness 13 of the tubular member 3. A shoulder 44 is formed between the outer surface of the proximal portion 41 and the outer diameter of the proximal end flange 43. The shoulder 44 may be perpendicular to the axis X-X of the pipe or may be chamfered at any suitable angle. The proximal end flange 43 has a substantially planar end face 45 having a continuous recess 46 therein, which is substantially concentric with the inner and outer wall of the pipe end 6 and is arranged therebetween. The continuous recess 18 is sized and shaped to receive a second portion of the ring gasket 19. The second pipe end 7 may be made from a single piece of material, such as high strength steel.

The outer surface of the proximal end flange 43 of the second pipe end 7 is sized to be coincident with the outer surface of the proximal end flange 16 of the first pipe end 6, such that collar 20 is slideable thereover.

A locking nut 50 is substantially tubular and may be made from a high strength steel. The locking nut 50 has a wall thickness defined by an inner surface of a diameter substantially equal or very slightly larger than the outer diameter of the proximal portion 41, such that in use, the locking nut 50 can slide over the outer surface of the proximal end flange 16. The wall thickness is also defined by an outer surface which has a male thread 51 arranged along a proximal end 52, such that, in use the male thread 51 threadedly mates with female thread 22 of the collar 20. A distal end of the locking nut 50 is provided with a chamfer 53 and a proximal end of the locking nut 50 is provided with a perpendicular face 54 to abut perpendicular shoulder 44 of the proximal end flange 43. Alternatively, the proximal end of the locking nut 50 may be provided with a chamfered surface to provide a contact surface with a corresponding chamfer if the proximal end flange 43 is provided with same.

A set of parallel circumferential tensioning slooves 47 is formed in the proximal portion 41 in a tensioning region 49 between a proximal area 48 about which the locking nut 50 is arranged and the shoulder 42. There may be a plurality of at least two circumferential tensioning slooves in the set 47. Optionally a multiplicity of between three and twenty parallel circumferential tensioning slooves in the set 47 and optionally between six and fifteen and preferably nine such grooves in the set 47. Each sloove may be between 3 mm and 25 mm wide, preferably between 5 mm and 15 mm wide and most preferably about 10 to 12 mm wide. Each sloove may have a depth of between 2 mm and 20 mm, preferably between 5 mm and 15 mm and most preferably between 5 mm and 7 mm deep. The slooves may be separated from each other by a distance approximately equal to the width of the groove. The set of parallel circumferential grooves 47 is spaced from the shoulder 42 by between 25 mm and 75 mm. The tensioning slooves may alternatively, be any suitable form of tensioning groove having a different profile from a sloove, such as a V-shape groove, a saw tooth V, a slanted V, a U-shape groove or other suitable profile.

Figure 8A:
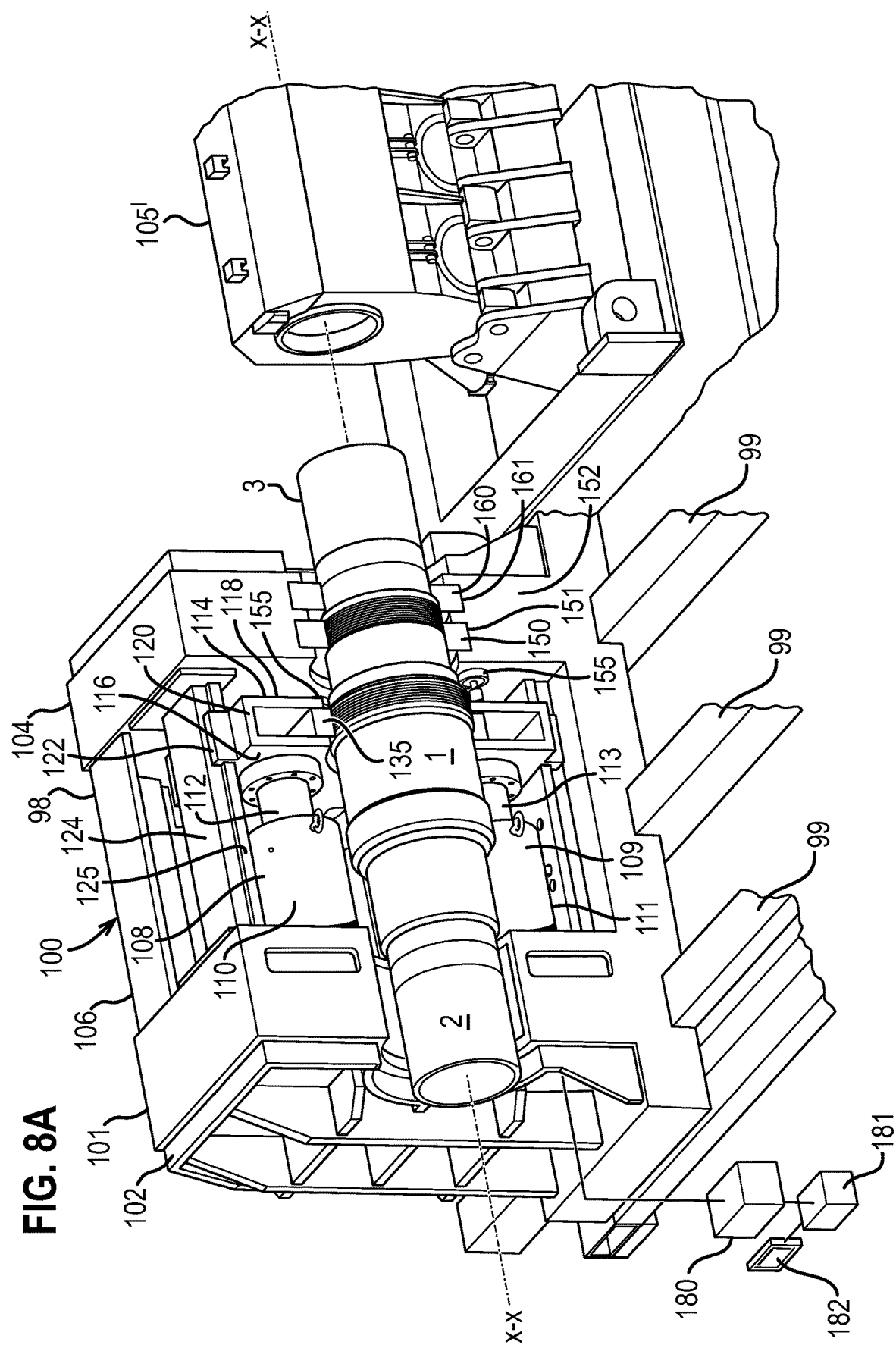
FIG. 8A is a perspective view showing a first half of the tensioning tool shown in FIG. 7, with a connection shown in FIG. 1 between two tubular members in the tensioning tool and a hang-off apparatus for use in controlling deploying a string of tubular members.

When it is desired to make-up connection 1, the tubular members 2 and 3 provided with pipe ends 6 and 7 are offered up to each other. The end face 17 of pipe end 6 is placed in close proximity to and axial alignment with the end face 45 of pipe end 7. The ring gasket seal 19 is retained, such as with a metal-to-metal glue, in recess 18 of pipe end 6 which is in axial alignment with recess 46 of pipe end 7. A tensioning tool, such as tensioning tool 100 shown in FIGS. 7A to 8A or the tensioning tool 100A shown in FIG. 8B, is used to apply axial force to the collar 20 of the first pipe end 6, reacting the force against the second pipe end 7. The sleeve 21 of the collar is placed in tension and may be stretched, deforming within elastic limits. The locking nut 50 is then spun into the collar 20 to lock the pipe ends 6 and 7 together making the connection. It should be noted that the locking nut 50 is simply spun-in to lock the collar in place. It should be noted that no axial force is provided by spinning the locking nut 50. Force provided by the tensioning tool 100 is then relaxed and the force provided by the tension in the sleeve is transferred to the locking nut, which in turn is transferred to the proximal end flange 43. Tension in the collar 20 remains sufficient to provide a constant force on the ring seal gasket 19 to provide a fluid tight seal to inhibit fluid from passing between the bore 3, 5, 10, 11 and ambient seawater surrounding the connection. The extension in the sleeve 21 of the collar 20 is preferably within the elastic limits of the material of the sleeve 21, which is preferably high strength steel.

For example, tensioning force provided by the tensioning tool 100 is approximately 20,000 kN (2,000 Te) for a connection in accordance with the present invention suitable for use in a 16" diameter pipeline.

The tensioning tool 100 comprises first and second halves 97 and 98. The halves 97 and 98 are substantially mirror images of one another and structurally fixed to one another when in use. FIG. 8A shows only second half 98 to show details of parts thereof in a stage of use. FIG. 8B is a further embodiment of the tensioning tool shown in FIG. 8A. Similar parts are referred to with the same reference numerals. Second half 98 has a structural body 101 seated on structural transverse rail girders 99. The structural transverse rail girders 99 may be part of a structure of a pipe laying vessel (not shown) used in the laying of a pipeline on a sea bed. The structural body 101 has a first structural end 102 with a semi-circular receiving opening 103 for receiving a tubular member 2 and 3 provided with connection 1. The structural body 101 further comprises a second structural end 104 with a semi-circular exit opening 105 for allowing the tubular member 2 and 3 provided with connection 1 to pass out from the tensioning tool 100 into a hang-off 105' of the pipe laying barge. If the pipeline is being laid on shallow water, a tensioner (not shown) may be used in place of a hang-off 105'. Furthermore, a hang-off 105' and a tensioner (not shown) may be used in deepwater and shallow water.

The first and second structural members 102, 104 are spaced apart and linked with cladding 106 to define a cavity. The cladding 106 may be made from structural material, such as structural steel and be a stressed member when the tensioning tool 100 is in operation. Three double acting hydraulic rams 107, 108, 109 may be spaced equally about axis X-X at approximately 60 degrees to one another, within second half 98. The rams 107, 108, 109 (only two shown in FIGS. 8A and 8B) each comprises a cylinder 110, 111 fixed to the first structural end 102 and an axially moveable piston 112, 113 (only two shown in FIGS. 8A and 8B) having a free end moveable towards and away from second structural end 104. An insert carrier 114 is fixed to the free end of the piston 112 such that the insert carrier 114 is movable with the free end of the piston 112, 113. The insert carrier 114 comprises a rectangular front plate 116 with an opening about the connection 1 subtending slightly less than 180 degrees about the connection 1 and a corresponding back plate 118 with top and plate 120 linking the front plate 116 to the back plate 118 to define a cavity open to the axis X-X.

Axially aligned top sliders 122, 123 project outwardly from the top end plate 120 which are slidable along and against opposing parallel sides of a top structural girder 124 and (not shown) linking the first structural end 102 to the second structural end 104. The structural girder 124 may comprise integral rails 125 on each of the parallel sides on which the sliders 122, 123 are slidable. A further similar slider 130 and structural girder rail 129 are provided for bottom end plate 120 and a further similar side sliders 131 and structural girder rail 132 are provided for side end plate 120. Thus, one structural girder rail 124, 129, 132 is provided for each ram 107, 108, 109. One structural girder rail 124, 129, 132 is provided for each of the top, bottom and side end plates 117, 120, 121 of the insert carrier 114.

An insert 135 is arranged in an opening defined between the front plate 116 and back plate 118 and is radially fixed. One embodiment of the insert 135 is shown in FIG. 10 in which part of an insert 135 is being offered up to a sleeve 20 of the first pipe end 6 of connector 1 to be tensioned and locked in place to make the connection 1. For clarity, details of the insert carrier 114 are not shown in FIG. 10, nor further details of the connection 1.

The outer surface of the sleeve 21 has chamfered end 27 and a set of parallel circumferential sloeves 28 spanning the proximal end portion 23.

The insert 135 comprises a body 140 defining a segment 139 of a circle. The insert 135 is preferably made from a high strength steel, but may be made from any suitable material, such as stainless steel and preferably of a material which has similar strength properties to that of the sleeve 20 and the proximal portion 41, so that any extension over the area of the sloeves is equal to that in the sleeve 21 and proximal portion 41. Optionally, the insert 135 is made of a material having stronger strength properties to that of the sleeve 20 and the proximal portion 41, so that preferably the extension of the collar mainly occurs in the sleeve 21. The segment 139 may subtend slightly less than 180 degrees, although may subtend any suitable angle, such as 45 degrees to 180 degrees. The segment 139 has a sleeve engaging surface 141. The sleeve engaging surface 141 has a plurality of parallel sloeve ridges 142, shown in detail in FIG. 10A. The number of sloeve ridges 142 preferably corresponds to the number of sloeves 28 in the sleeve 21 so that the plurality of sloeve ridges 142 corresponds with and fits into the plurality of sloeves 28 in the sleeve 21. Each sloeve ridge 142 corresponds to fit into the sloeves 28. The sloeve ridges 142 may be sized to fit into the sloeves 28 allowing a small amount of room for movement there between. In particular, during tensioning the sleeve 21 will be stretched slightly, by perhaps 0.5 mm along its length.

The sloeve ridge 142 is a type of ridge, with a substantially flat top 143 with curved corners 144 joining the flat top 143 to substantially vertical side walls 145 and curved portion 146 joining the side walls 145 to substantially flat valleys 147.

Figure 9:
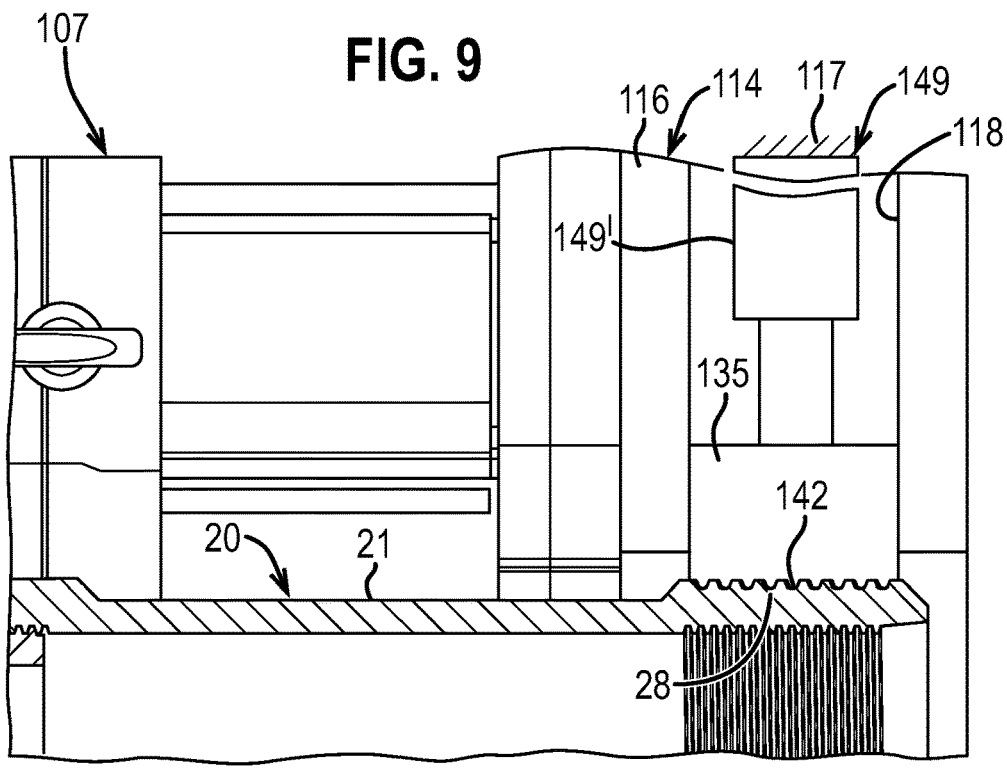
FIG. 9 is a schematic side cross-sectional view of part of the tensioning tool shown in FIG. 8B.

The insert 135 may be radially fixed or may be radially moveable as is shown in FIG. 9. A double acting hydraulic piston and cylinder 149' is arranged to act radially between a rear face of the insert 135 and the side end plate 117. Front plate 116 and rear plate 118 guide the direction of travel of the insert 135. It should be noted that other mechanisms may be used to move the insert towards and away from the connection 1, including, but not limited to, any suitable linear actuator, such as: solenoid electrical actuators; and pneumatic rams. Other mechanisms such as mechanical linkage which translate rotational movement into radial movement of the insert 135 relative to the connection 1. It should be noted that piston and cylinder 149' may also be single acting.

Figure 10B:
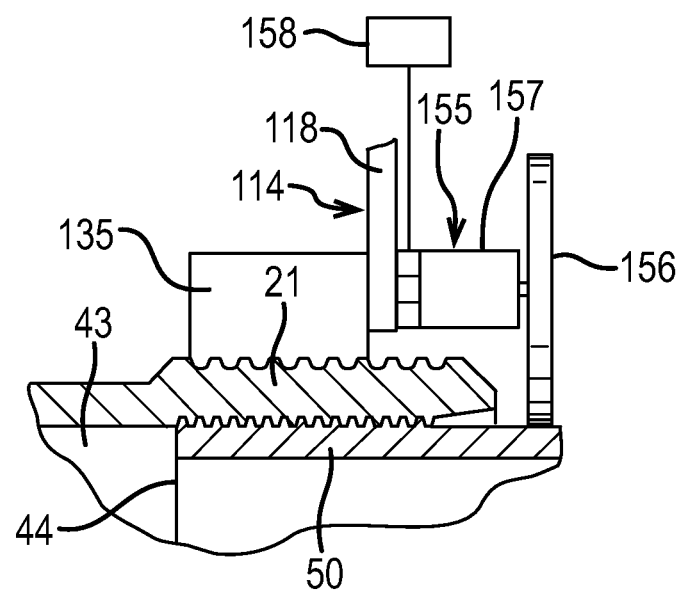
FIG. 10B is a schematic view of a part of the tensioning tool of FIG. 7 showing a spinner for spinning a locking nut of the connection, the spinner fixed to an insert carrier.

One or more spinners 155 is provided on a distal face of the rear plate 118, such that the spinner 155 moves with the insert carrier 114 and thus in use, will be axially aligned with the collar 20. As shown in FIG. 10B, the spinner 155 comprises a wheel 156 and a motor 157 for driving the wheel 156. The motor 157 may be electrically, hydraulically or pneumatically powered. The wheel 156 is axially aligned and resiliently biased to sit on the locking nut 50 of the connection 1 when in use. In use, the wheel 156 spins transverse to the axis X-X, so that when the motor 157 is activated by a controller 158, the wheel 156 spins to rotate the locking nut 50 along helical thread 22,51 relative to the collar 20.

The tensioning tool 100 also comprises a reaction insert 150 to engage the set of parallel circumferential tensioning slooves 47 formed in the proximal portion 41 of second pipe end 7. The reaction insert 150 is arranged in an integral insert carrier 151, which is integral with the body 152 of second structural end 104. The reaction insert 150 is radially fixed within the integral insert carrier 151. The reaction insert 150 may be replaced with a different size insert (not shown) for different size connections for different size pipelines.

A replaceable end stop 160 is provided in an end stop carrier 161 in the body 152 of the second structural end 104. The end stop 160 is radially fixed within the end stop carrier 161 to project from the insert carrier 161. It is envisaged that a physical end stop may not be required, instead using a sensor to sense the axial location of the slooves in relation to the tensioning inserts 135 and reaction inserts 150.

In use, the tensioning insert 135, reaction insert 150 and end stop 160 are selected for the diameter of pipeline and connection 1. It is envisaged that the one tensioning tool 100 will be used to make-up and break connections of a range of sizes, preferably including, but not limited to, connections for use in pipelines of between 2 and 16 inches (50 mm to 400 mm) in diameter. The tensioning insert 135, reaction insert 150 and end stop 160 are installed into their respective holders 114, 151, 161 in the tensioning tool 100.

A controller 181 controls a valve (not shown) to allow hydraulic fluid to flow from a hydraulic power pack unit 180 through a hydraulic circuit (not shown) into and from cylinders 110, 111 of the rams 107, 108, 109 in the second half 98 of the tensioning tool 100 and respective rams (not shown) in the first half 97 to fully retract their respective pistons 112, 113.

The first pipe end 6 of the first tubular member 2 is arranged on a bed of a pipe laying vessel. The second pipe end 7 of the second tubular 3 is handled so that first pipe end 6 is axially aligned with second pipe end 7. Any end protectors are removed, either on an elongate roller bed (known as "firing line" or in a storage stack before the joints of pipeline are placed in the firing line. End face 17 and end face 45 are butted up to one another whereupon seal 18 inserts into recess 46. A shear pin SP (FIG. 4) is arranged between the end stop 30 of the collar 20 and the proximal portion 14 of the first pipe end 6 to maintain axial location of the collar 20.

Alternatively, a shear pin is not arranged between the collar 20 and the first pipe end 6 and thus no shear pin is used. As is best appreciated from referring to FIG. 1, the collar 20 is slid towards second pipe end 7, such that the proximal end portion 23 slides over end flanges 16 and 43. The locking nut 50 is slid along proximal portion 41 towards first pipe end 6 so that male threads 51 of the locking nut 50 engage female threads 22 of the collar 20. A threaded joint is made loosely by turning the locking nut 50 relative to the collar 20 hand tight, with a predetermined number of turns, so that axial location of the collar is known. The connected tubulars 2 and 3 may then move along the bed to tensioning tool 100.

The two halves 97 and 98 of the tensioning tool 100 are offered up to the connection 1 radially, from either side of connection. Each half 97, 98 may be slideable along transverse structural rail girders 99 towards and away from the connection 1. The connection 1 is axially aligned so the shoulder 42 abuts the end stop 160. This aligns the reaction inserts 150 with the set of slooves 47 in the second pipe end 7. Sloove ridges 142 of the tensioning insert 135 are thus aligned with the known position of the slooves 28. The two halves 97 and 98 are moved towards each other along girders 99 so that the sloove ridges of the reaction inserts 150 insert into the set of slooves 47 in the second pipe end 7 and sloove ridges 142 of the tensioning insert 135 insert into slooves 28. The two halves 97 and 98 are then fixed together about the connection 1, such that the semi-circular receiving and exit openings 103 and 105 of the second half 98 meet respective semi-circular receiving and exit openings 173 and 175 of the first half 97 to form complete circular receiving and exit openings. Being able to fix the two halves 97 and 98 together provides a positive indication that the sloove ridges 142 and (not shown) are properly engaged with their respective slooves 28 and 51.

Alternatively, the tensioning insert 135 is radially moveable on and initially set to their radially retracted positions on their respective movement mechanisms 149 (and not shown). The controller 181 controls the valve (not shown) to allow hydraulic fluid to flow from a hydraulic power pack unit 180 through a hydraulic circuit (not shown) into and from cylinders 110, 111 of the rams 107, 108, 109 in the second half 98 of the tensioning tool 100 and respective rams (not shown) in the first half 97 to fully retract their respective pistons 112, 113 and to move the insert 135 into alignment with the slooves 28 in the collar 20. The tensioning inserts 135 in the first and second halves 97, 98 are then radially moved by their respective movement mechanism 149 to engage the collar 20. The set of parallel circumferential tensioning sloove ridges 142 of the tensioning inert 135 are engaged with the set of parallel circumferential tensioning slooves 28 of the collar 20 of the first pipe end 6.

The curved corners 144 of the sloove ridge 142 and the curved corners 29''' of the sloove 28 facilitate guiding the sloove ridge 142 into the sloove 28. The curved corners 144 and 29''' facilitate alignment of the plurality of sloove ridges 144 with the plurality of slooves 28.

The extent of extension of the movement mechanism 149 is used positive indication that the sloove ridges 28 are properly engaged with the slooves 28 of the collar 20.

The six rams 107, 108, 109 and (not shown) of the first and second halves 97, 98 of the tensioning tool 100 are now activated using the controller 181 to activate the hydraulic power pack unit 180 to flow hydraulic power fluid through the hydraulic circuit to extend the pistons 112,113 and (not shown) simultaneously and evenly, which moves the insert carriers 114 relative to the structural body 101, moving the collar 20, shearing any shear pin SP, until the end stop ring 30 of the collar 20 abuts shoulder 16' of the end flange 16 of pipe end 6. The reaction inserts 150 are axially fixed to the structural body 101, so that engagement of the reaction inserts 150 with the proximal portion 41 of the pipe end 7 inhibits the pipe end from moving relative to the collar 20 of pipe end 6. The free end of the pistons 112,113 and associated insert carriers 114 carry on moving, applying a preload force to the ring seal 19 between the two pipe end faces 18 and 45, until the ring seal 19 is fully activated and functional for its intended pressure rating. This is indicated by meeting or exceeding a hydraulic pressure indicated by a pressure reading on a display 182. If the seal 19 is of the type which is activated by internal fluid pressure or other means, the pre-load is applied to the end faces 18 and 45. The free end of the piston 112, 113 may carry on moving the collar 20 stretching the sleeve 21. The spinner 155 is then activated to spin the locking nut 50 into the thread 22 of the collar 20, locking the tubulars 2 and 3 together and making the connection 1.

Hydraulic pressure is relieved from the six rams (107-109 and (not shown). This transfers tension in the sleeve 21 provided from the six rams 107, 108, 109 and (not shown) to the connection 1. The sleeve 21 may be stretched in the tensioning procedure, perhaps by approximately 0.5 mm. An activation force of approximately 20,000 kN (approximately 2,000 tonnes force) may be required to activate a seal 19 in a connection 1 in a 16" pipe line. The first and second halves 97 and 98 are slid apart on girders 99 away from the connection 1. Alternatively, the movement mechanism 149' is activated to retract the inserts 135, 150. The six rams 107, 108, 109 (and not shown) are then fully retracted by removing hydraulic power fluid from the cylinders 110, 111 or by pumping in hydraulic fluid from the hydraulic power pack unit 180 to a reverse side of the piston in the cylinder 110,111.

Referring to FIG. 8B, there is shown a tensioning tool 100A generally like the tensioning tool 100, save for details of the reaction inserts 150' and replaceable end stop 160'. This embodiment of the tensioning tool allows the tubular members to move axially within the tensioning tool 100A without need for separating first and second halves 97 and 98 during making a first connection 1 and subsequent connections, the pipeline passing through the tensioning tool 100A axially through openings 103 and 105. The same reference numerals used in FIG. 8A are used to denote similar parts in tensioning tool 100A.

The tensioning tool 100A comprises a radially moveable insert 135 in insert carrier 114. The tensioning tool 100A also comprises a reaction insert 150' in each half 97 and 98 to engage the set of parallel circumferential tensioning slooves 47 formed in the proximal portion 41 of second pipe end 7. The reaction insert 150' is arranged in an integral insert carrier 151', which is integral with the body 152 of second structural end 104. The reaction insert 150' is radially moveable within a cavity 153' of the integral insert carrier 151' using a movement mechanism (not shown) similar to the movement mechanism 149 described for moving the insert 135 in insert carrier 114. The reaction inserts 150' are provided with a set of parallel circumferential tensioning sloove ridges (not shown) to correspond with and for engaging the set of parallel circumferential tensioning slooves 47.

The tensioning tool 100A also has a replaceable end stop 160' provided in an end stop carrier 161' defining a cavity 162' in the body 152 of the second structural end 104. The end stop 160' is radially moveable within the end stop carrier 161' to selectively project from the cavity 162'. The replaceable end stop 160' is moveable within the cavity 162' using a movement mechanism (not shown) similar to the movement mechanism 149 described for moving the insert 135 in inert carrier 114.

In use, the tensioning insert 135, reaction insert 150 and end stop 160 are selected for the diameter of pipeline and connection 1. It is envisaged that the one tensioning tool 100A will be used to make-up and break connections of a range of sizes, preferably including, but not limited to, connections for use in pipelines of between 2 and 16 inches (50 mm to 400 mm) in diameter. A larger tensioning tool using the similar but larger elements may be used for sizes up to 48" in diameter. The tensioning insert 135, reaction insert 150 and end stop 160 are installed into their respective the tensioning tool 100A.

The two halves 97 and 98 of the tensioning tool 100A are fixed together, such that the semi-circular receiving and exit openings 103 and 105 of the second half 98 meet respective semi-circular receiving and exit openings 173 and 175 of the first half 97 to form complete circular receiving and exit openings. In this embodiment, the tubular members and associated first and second tubular ends 6 and 7 are moved axially through the tensioning tool 100A. There is no need to move the two halves apart during make-up or break out of a multiplicity of connections. However, the two halves may be moved apart to allow a PLET or other large device in the pipeline from passing therebetween.

The tensioning insert 135, reaction insert 150 and end stop 160 are moved to their radially retracted positions using their respective movement mechanisms 149 (and not shown). Hydraulic fluid is allowed to flow from a hydraulic power pack unit 180 through a hydraulic circuit (not shown) into and from cylinders 110, 111 of the rams 107, 108, 109 in the second half 98 of the tensioning tool 100 and respective rams (not shown) in the first half 97 to fully retract their respective pistons 112, 113.

A first end of tubular member 3 is inserted into the tensioning tool 100A, with a second end lying to the upstream end of the tensioning tool 100A. The second end is provided with second pipe end 7. A further tubular member 2 is handled so that first pipe end 6 is axially aligned with second pipe end 7. Any end protectors are removed. End face 17 and end face 45 are butted up to one another whereupon seal 18 inserts into recess 46. A shear pin SP is arranged between the end stop 30 of the collar 20 and the proximal portion 14 of the first pipe end 6 to maintain axial location of the collar 20.

Alternatively, a shear pin SP is not used. As is best appreciated from referring to FIG. 1, the collar 20 is slid towards second pipe end 7, such that the proximal end portion 23 slides over end flanges 16 and 43. The locking nut 50 is slid along proximal portion 41 towards first pipe end 6 so that male threads 51 of the locking nut 50 engage female threads 22 of the collar 20. A threaded joint is made loosely by turning the locking nut 50 relative to the collar 20 hand tight, with a predetermined number of turns, so that axial location of the collar is known. The connected tubulars 2 and 3 may then move along the bed to tensioning tool 100.

The end stop 160' in the second half 98 and corresponding end stop (not shown) in the first half 97 are now moved radially towards the tubular member 3 to a point at which the end stop is very close to the tubular member 3, but will inhibit the proximal portion 41 of pipe end 7 from passing through. The partly made connection 1 is now moved with the tubular members 2 and 3 through receiving opening 103, 173 until shoulder 42 of the second pipe end 7 abuts the end stop 160.

The reaction inserts 150' in the first and second halves 97, 98 are radially moved by their respective movement mechanism (not shown) to engage the set of parallel circumferential tensioning sloove ridges (not shown) with the set of parallel circumferential tensioning slooves 47 of the second pipe end 7.

The tensioning inserts 135 in the first and second halves 97, 98 are radially moved by their respective movement mechanism 149 to engage the collar 20. The set of parallel circumferential tensioning sloove ridges 142 of the tensioning inert 135 are engaged with the set of parallel circumferential tensioning slooves 28 of the collar 20 of the first pipe end 6.

The curved corners 144 of the sloove ridge 142 and the curved corners 29''' of the sloove 28 facilitate guiding the sloove ridge 142 into the sloove 28. The curved corners 144 and 29''' facilitate alignment of the plurality of sloove ridges 144 with the plurality of slooves 28.

The six rams 107, 108, 109 and (not shown) of the first and second halves 97, 98 of the tensioning tool 100A are now activated by activating the hydraulic power pack unit 180 to flow hydraulic power fluid from through the hydraulic circuit to extend the pistons 112,113 (and not shown) simultaneously and evenly, which moves the insert carriers 114 relative to the structural body 101, moving the collar 20 until the end stop ring 30 of the collar 20 abuts shoulder 16' of the end flange 16 of pipe end 6. The reaction inserts 150 are axial fixed to the structural body 101, so that engagement of the reaction inserts 150' with the proximal portion 41 of the pipe end 7 inhibits the pipe end from moving relative to the collar 20 of pipe end 6. The free end of the pistons 112,113 and associated insert carriers 114 carry on moving, applying a preload force to the ring seal 19 between the two pipe end faces 18 and 45, until the ring seal 19 is fully activated and functional for its intended pressure rating. This is indicated by meeting or exceeding a hydraulic pressure indicated by a pressure reading on the display 181. If the seal 19 is of the type which is activated by internal fluid pressure or other means, the pre-load is applied to the end faces 18 and 45. The free end of the piston 112, 113 may carry on moving the collar 20 stretching the sleeve 21. The spinner 155 is then activated to spin the locking nut 50 into the thread 22 of the collar 20, locking the tubulars 2 and 3 together and making the connection 1.

Hydraulic pressure is relieved from the six rams (107-109 and (not shown). The movement mechanism 149, 149' is activated to retract the tensioning inserts 135, the reaction inserts 150' and the end stop 160'. The six rams 107, 108, 109 (and not shown) are retracted by removing hydraulic power fluid from the cylinders 110, 111 or by pumping in hydraulic fluid from the hydraulic power pack unit 180 to a reverse side of the piston in the cylinder 110,111. This transfers tension from the six rams 107, 108, 109 and (not shown) to the connection 1. The sleeve 21 may be stretched in the tensioning procedure, perhaps by approximately 0.5 mm. An activation force of approximately 20,000 kN (2,000 Te) may be required to activate a seal in a connection 1 for a 16" pipeline.

With a view to confirming that enough force has been applied to ensure a seal between the pipe ends 6 and 7; to indicate that the seal 19 has been properly activated; and to ensure there is sufficient residual force in the connection 1 once the six rams 107, 108, 109 and (not shown) have released their force from the connection, the present invention provides, by way of example the following system.

As best shown in FIG. 11, a camera system 200 comprises at least one camera 201 arranged on a steel ledge 202 welded to a proximal face of front plate 116 of insert carrier 114. The camera 201 will move in concert with the insert carrier 114 and thus the camera will be axially aligned with the sleeve 21 of the collar 20, in use. The camera 201 is directed on to a smooth surface portion 205 of the sleeve 21 between the proximal end portion 23 and the end stop ring 30.

The camera 201 may be of the type sold under the brand name StrainMaster™ by LaVision Inc. The camera 201 may be a high definition CCD or CMOS camera. The camera 201 is linked to a computer 203. Digital images captured by the camera 201 are sent to computer 203 for processing. The computer uses Digital Image Correlation (DIC) to estimate the extension induced in a sample material.

Figure 13:
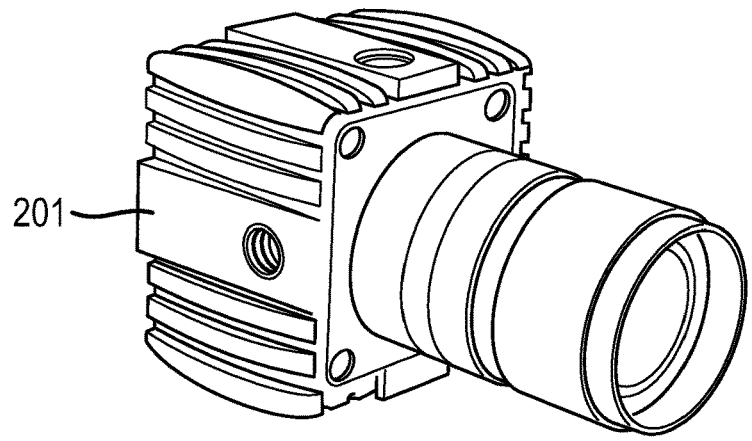
FIG. 13 is a perspective view of an alternative camera for use in the tensioning tool shown in FIG. 11.
Figure 13A:
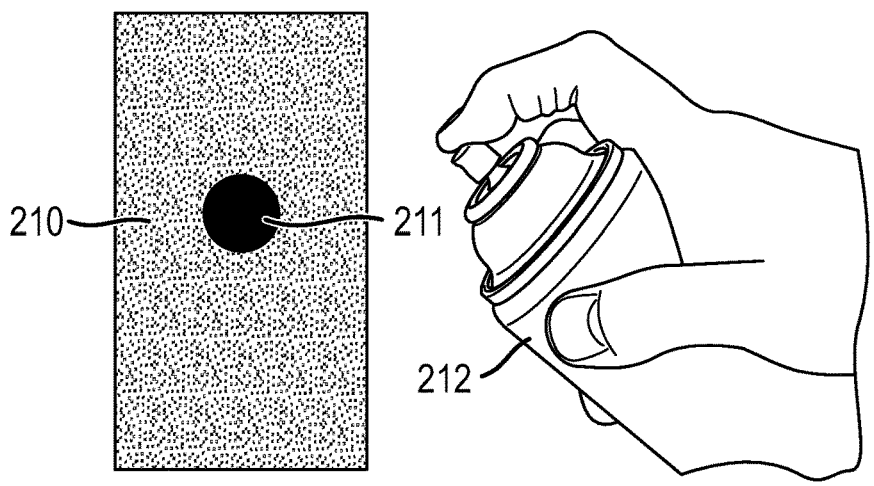
FIG. 13A is a schematic diagram showing a stage of operation of the camera shown in FIG. 13.

The smooth surface portion 205 may be prepared by roughening the surface or by applying a spray paint, which creates a pattern. The pattern is preferably random, rich in contrast, speckle pattern, such as that provided by a spray paint. An example of such a pattern 210 is shown in FIG. 13A, which is shown as having been sprayed on with a can of spray paint 212. The pattern shown in FIG. 13A also shows a black spot 211, which is simply there as a visual indication of the extension, as will be appreciated from FIG. 13B, but is not a necessary step for the purposes of the present invention. Alternatively, the smooth surface portion 205 may have a sufficient pattern to it without need for a pattern to be applied.

Figure 13B:
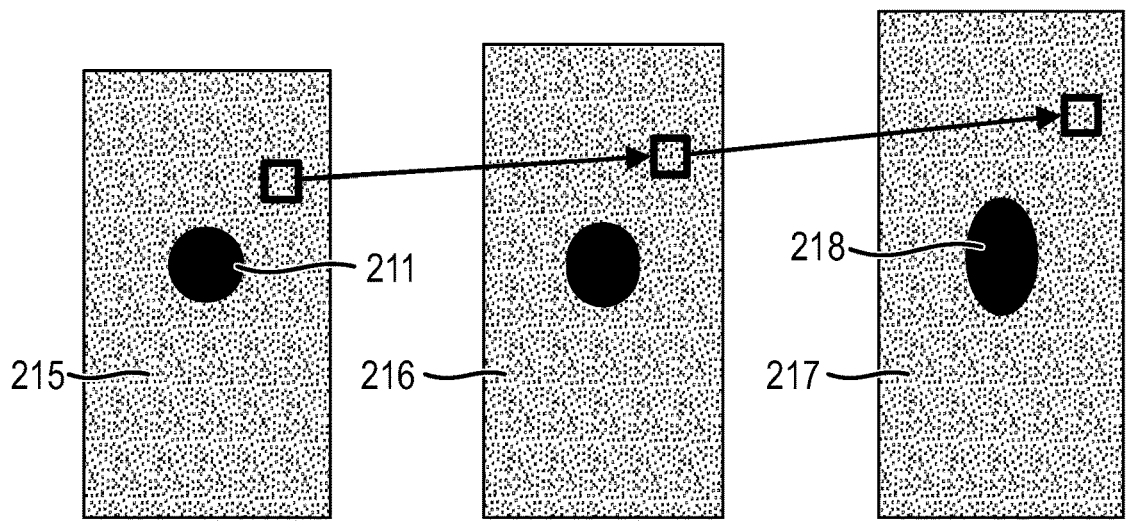
FIG. 13B is a schematic diagram showing stages in operation of the camera shown in FIG. 13.

The camera 201 takes at least one image of the pattern before the six rams 107, 108, 109 and (not shown) are extended, an example of such a first image is shown in FIG. 13B and assigned reference number 215. The first image 215 is transferred to the computer 203. The camera 201 then takes further images of the pattern on the smooth surface portion 205 as the rams extend and load increases, such as second image 216 and third image 217. These further images are also transferred to the computer 203. The pattern changes as the smooth surface portion 205 extends, as can be seen visually by the change in shape of the black dot 211 which changes to a black oval 218 in the third image 217. The computer 203 uses algorithms to carry out Digital Image Correlation to accurately estimate the strain extension in the axial direction. Accuracy of 10 micro strain may be obtained. The camera 201 is preferably capable of capturing 5 megapixel images, using a 25 mm to 75 mm lens. Thus the system measures axial extension on creating a full 2D or possibly a 3D representation (with two cameras pointing at same zone) to create a full strain diagram.

At least one further camera 220 is positioned similarly in the first half 97, indicated by a dashed line, of the tensioning tool 100 and focused on a different side of the sleeve 21 across a smooth surface portion 206 of the sleeve 21 between the proximal end portion 23 and the end stop ring 30. The at least one further camera 220 is similarly arranged on a ledge 221 welded to a proximal face of a front plate (not shown) of an insert carrier (not shown).

The at least one further camera 220 provides redundancy for the first camera 201, and will also indicate if there are imperfections in the sleeve 21, by comparing the results from the first and second cameras 201, 220. Such imperfections may be a crack in the sleeve 21.

The load provided by the six rams can be calculated from a Young's modulus calculation, requiring the Young's modulus coefficient of the material used in the sleeve and the actual strain reading provided from the first and second cameras 201, 220. It is envisaged in most circumstances that the sleeve 21 will be a high strength steel. Alternatively, the required strain in the sleeve 21 can be calculated from the required force (such as 20,000 kN) in advance and compared with the actual strain reading obtained from the first camera 201 and compared with the reading from the second cameras 220.

Once the required strain has been achieved and once the hydraulic pressure reading achieved, as discussed above, the locking nut 50 is spun to lock the collar 20 in place. The six rams 107, 108, 109 and (not shown) are retracted. A final image (not shown) is obtained from the first and second cameras and sent to the computer 203. The final images are compared with the first image 211 to see if the strain and hence the residual force in the connection remains above the required force (such as 20,000 kN (2,000 Te)). If the answer is positive, the pipe line can be deployed through the hang-off 105' (or tensioner) and a fresh tubular and connection (not shown) added to tubular member 2.

Figure 12:
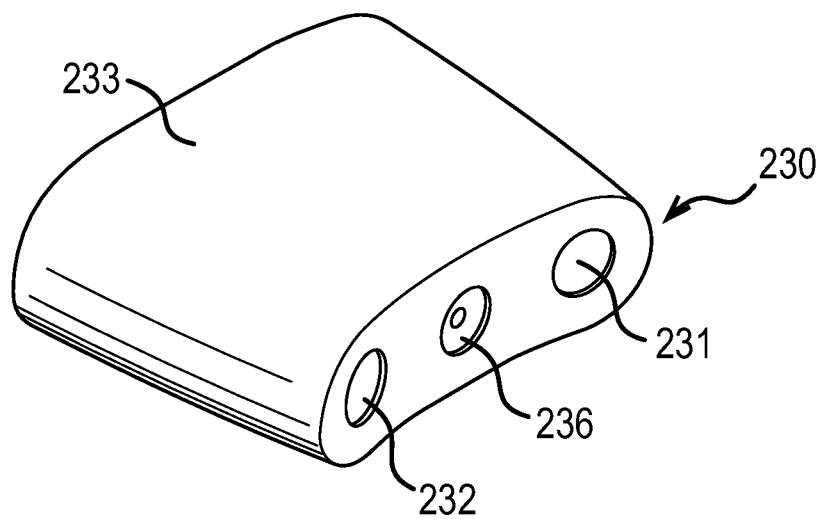
FIG. 12 is a perspective view of a camera unit for use in the system shown in FIG. 11.
Figure 12A:
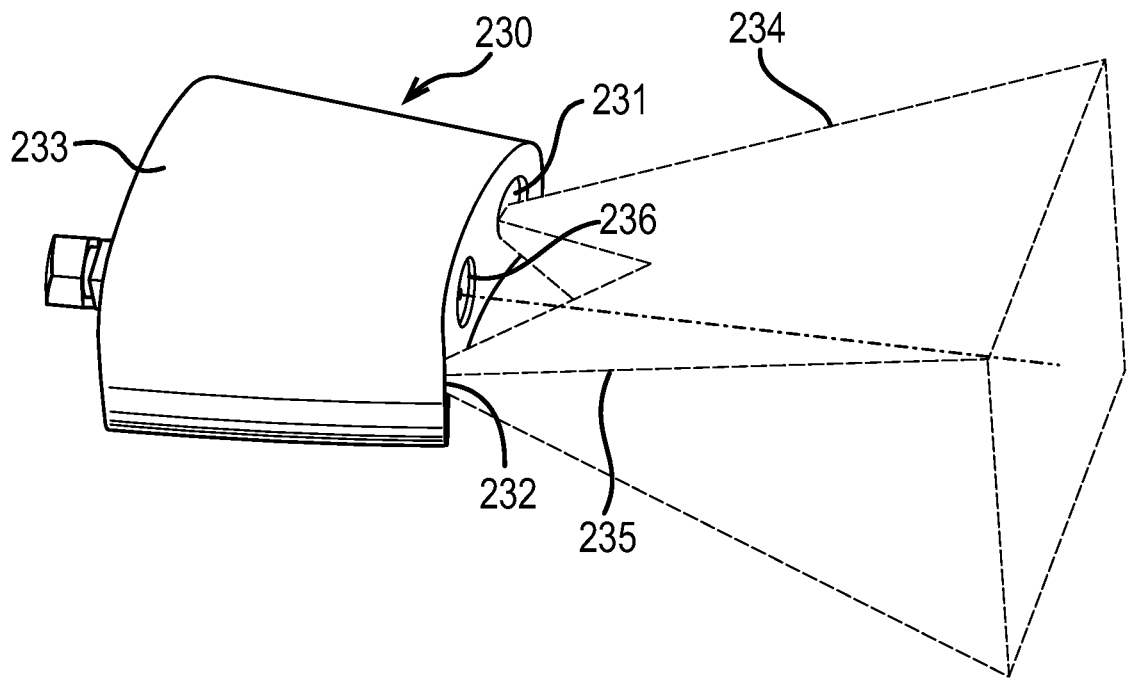
FIG. 12A is a schematic perspective view of the camera unit indicating a field of view of the camera unit.

A camera unit 230 for use in the system 200 is shown in FIG. 12. The camera unit 230 is a replacement for camera 201 or can be used in addition to the camera 201 within the system 200. Thus, it is preferable to mount the camera unit 230 on to the insert carrier 114 of the tensioning tool 100. The camera unit 230 comprises two cameras 231 and 232 arranged on either side of a body 233 and directed at an angle to each other, such that the field of view 234, 235 of each merge and meet at a distance in front of the body 233. Each camera 231, 232 may have the same or different focal lengths, but preferably use the same focal length of between 25 mm and 75 mm. A light source 236 is arranged between the cameras 231 and 232 and is directed to provide light in a region in which the field of view 234, 235 of both cameras meet.

The cameras 231 and 232 may be used in a stereo mode to produce two images which are used to create a 3-dimensional representation of the strain exhibited in the smooth surface portion 205 of the sleeve 21. Alternatively, each camera 231, 232 may be used in a mono mode to capture an image each and each image processed separately in order to obtain a 2D representation, which are individually analysed by computer 203 using DIC algorithms to obtain a strain in an axial X-X direction, thereby having redundancy in the system, as well as a cross-check for strain measurement. A second camera unit (not shown), of the same type as camera unit 230 may be arranged in the other half 97, 98 on its insert carrier and directed on to an opposing side of the sleeve 21 within the smooth surface portion 205.

At pipeline ends in deepwater applications, a Pipeline Termination (PLET) is required. For example, in the drilling of an oil or gas well in deep water, a well is drilled and prepared for production. A wellhead is located at the top of the well on the seabed on which valves are arranged for controlling the flow of fluids from the well. A flowline may be used to connect a wellhead to a manifold, which has further flowlines coming in from a plurality of other wells. A pipeline is attached to the manifold for conveying oil and gas from the manifold to an on-shore production facility. Alternatively, a pipeline could come directly from a single wellhead. Alternatively, a riser may convey production fluids upwardly directly from each well or the manifold to a floating storage facility.

An end termination is required at each end of the pipeline or flowline in deepwater, which are known as a Pipeline End Termination (PLET) and Flowline End Termination (FLET).

Figure 14:
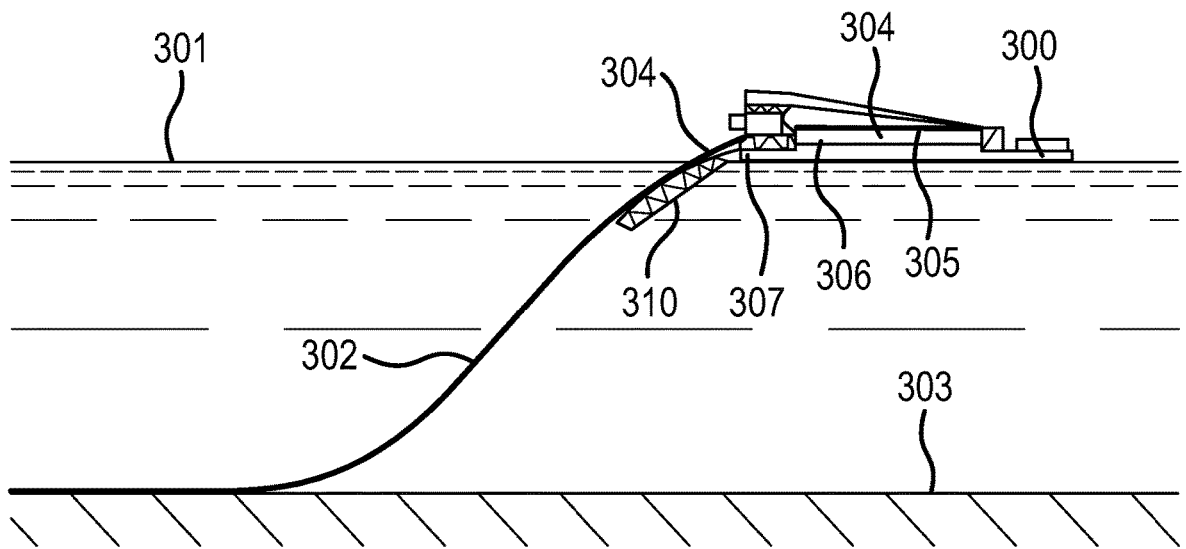
FIG. 14 is a schematic diagram showing a prior art S-lay system for laying a pipeline on to a seabed.

FIG. 14 shows a known S-lay system for laying a pipeline 302. A pipe laying vessel 300 floats on a surface 301 of the sea, laying the pipeline 302 on to seabed 303. A free end 304 of pipeline 302 is arranged generally horizontally on the vessel 300 on an elongate roller bed 306 with a new section of pipeline 305 also laying horizontally on the elongate bed 306 and in coaxial alignment with the free end 304 of the pipeline 302. The new section of pipeline 305 is welded to the free end 304. The pipeline is off-loaded from the aft 307 of the vessel 300 along a stinger 310 which projects rearwardly and downwardly into the sea from the aft 307 of the vessel 300. The pipeline 302 assumes a lazy S-shape between the seabed 303 and the vessel 300.

Figure 15:
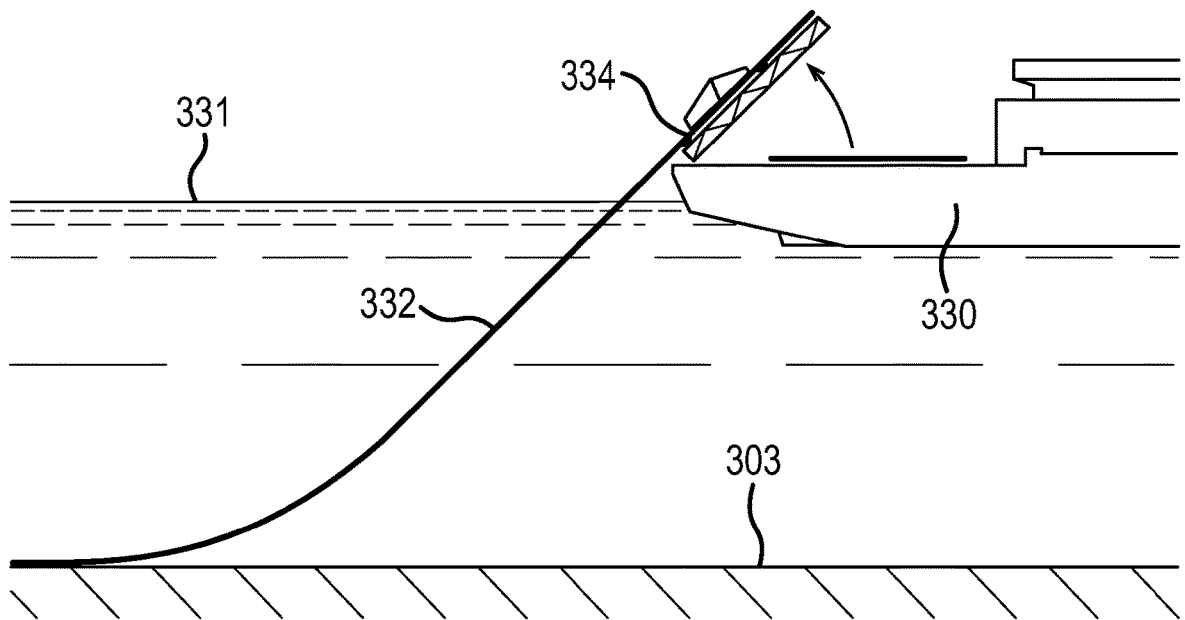
FIG. 15 is a schematic diagram showing a prior art J-lay system for laying a pipeline.

FIG. 15 shows a known J-lay system for laying a pipeline 332. A pipe laying vessel 330 floats on a surface 331 of the sea, laying a pipeline 332 on to seabed 333. A free end 334 of the pipeline is held at a pre-set angle at the aft of the vessel 330, with a new section of pipeline arranged on a bed at a similar pre-set angle. The pre-set angle is set to suit water depth (in deep water this will be near vertical). The new section of pipeline is welded to the free end of the pipeline. The pipeline is off-loaded at the pre-set angle from the aft of the vessel. The pipeline assumes a lazy J-shape between the seabed 333 and the vessel 330 if the pre-set angle is relatively steep.

Once the pipeline 302, 332 is in service, the pipeline 302, 332 is typically built to convey fluids with an internal pressure of up to 5,000 psi (350 bar). The pipelines 302, 332 may have a diameter of between 2" (50 mm) and 48" (1.2 m), but are generally in the order of 8" (200 mm) to 24" (600 mm) and often 12" (300 mm) or 16" (400 mm).

Figure 16:
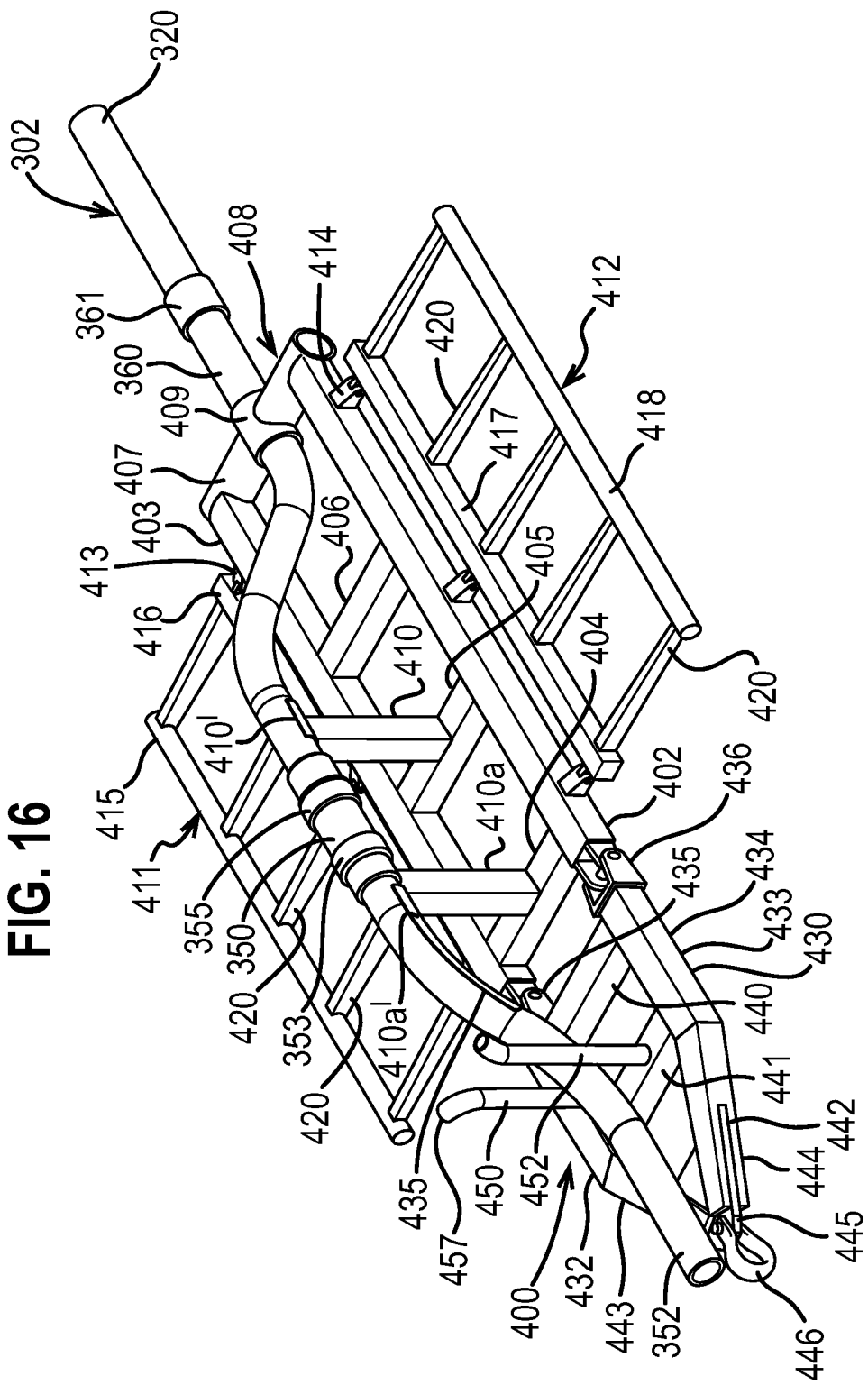
FIG. 16 is a perspective view of a pipeline end termination in accordance with the present invention, shown with a flexible pipe connected thereto.

FIG. 16 shows a Pipeline End Termination (PLET) in accordance with an aspect of the present invention for use in a method an aspect of the present invention. The PLET in accordance with the present invention is generally identified by reference numeral 400. The PLET is shown connected to a flexible pipe 352.

The PLET 400 comprises a base frame 401 made up of hollow section members, preferably of box section or circular section and optionally of a mild steel or high strength steel welded together. The hollow section members may be of any suitable material, such as aluminium, stainless steel, or carbon fibre. The base frame 401 comprises a pair of parallel longitudinal members 402 and 403 lying substantially parallel with the general direction of a pipeline 302. The pair of parallel longitudinal members 402,403 are linked by cross members 404-407 lying substantially transverse thereto. In this example, there are four such longitudinal members, although there may be any suitable number sufficient to form a rigid base frame 401. Cross member 407 extends across a first end 408 of the base frame 401 and has an opening formed therein for receiving a curved section of pipe 302. The opening is sized to fit a starting pipe section 360. An end termination 351 is provided on an end of the starting pipe section 360. The end termination 351 may be any disclosed herein, and is preferably of the type of the present invention, an embodiment of which is shown with reference to FIGS. 1 to 3. The cross member 407 may be of circular cross-section with a further circular section member 409 arranged substantially centrally between the longitudinal members 402, 403 and arranged to have an axis therethrough substantially parallel with the longitudinal members 402, 403. An upstand 410 extends upwardly from cross member 405. A seat 410' is arranged at a top end of the upstand 410 for supporting an end of the starting pipe section 360. The starting pipe section 360 may be welded, bolted strapped or otherwise secured to the seat 410'. The starting pipe section 360 is shaped in a lazy S-shape having one end supported on seat 410' and second end passing through the opening in the cross member 407 trailing from the frame 401 by approximately 5 to 25 m and preferably between 10 to 20 m and having a further end termination 361 for connection to a pipeline 302.

A further upstand 410a extends upwardly from cross member 404. A seat 410a' is arranged at a top end of the upstand 410 for supporting an end of the further pipe 352.

The connection 350 made between the PLET and the pipe 352 is preferably of the type shown herein with reference to FIGS. 1 to 3 and parts referred to by reference number are those appearing in the embodiment of FIGS. 1 to 3.

Left and right mud mats 411 and 412 are hinged to respective longitudinal members 402 and 403. With hinges 413 and 414, preferably three hinges 413,414 each side, but may be of any suitable number. Each mud mat comprises a frame made up of parallel sides and cross members 415, 416 and 417, 418 with cross-braces 420 extending therebetween.

A deployment frame 430 is hinged to a second end of the base frame 401 to form an articulation. The deployment frame 430 comprises parallel longitudinal members 432 and 433 each having a first end provided with a hinge 435 and 436 to hingedly connect to corresponding longitudinal members 402 and 403 of the base frame 401. The parallel longitudinal members 432 and 433 are linked by transverse members 440 and 441 and a yoke member 442 at a second end. The yoke member 442 comprises two box section members 443, 444 meeting at a plate 445 having a central hole for receiving a pin of a shackle 446. A pipe guide 450 extends upwardly from the transverse member 441 to guide pipe 352. The pipe guide 450 comprises two uprights 451 and 452 having flared tops to facilitate guiding the pipe 352 therebetween.

Figure 17A:
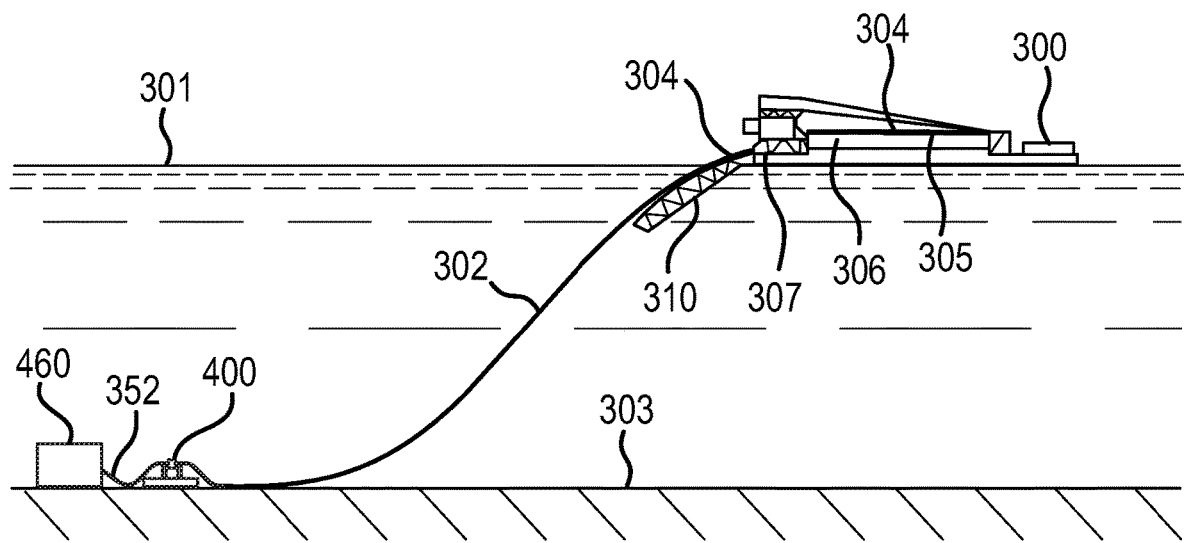
FIG. 17A is a diagram showing a final stage in a method of commencing laying a pipeline in accordance with the present invention.
Figure 17B:
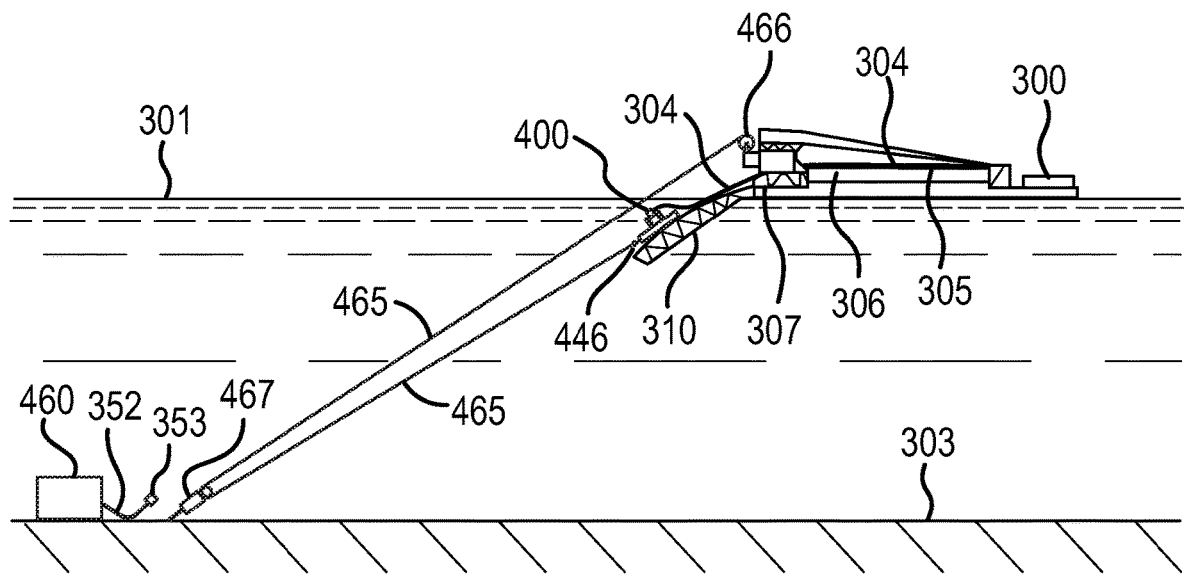
FIG. 17B is a diagram showing an early stage in a method of commencing laying a pipeline in accordance with the present invention.

At the start of a pipeline, a PLET may be required to connect the pipeline to a subsea apparatus. A method of laying a pipeline is shown in FIGS. 17A and 17B. FIG. 17A shows a manifold 460 connected to a pipeline 302 using a PLET 400 of the invention connected to the manifold with flexible pipe 352.

A starting pipe section 360 forms part of the PLET 400. The starting section 360 comprises a first end termination 351 (such as first pipe end 6) of a connector 350, a lazy S-shaped kinked tubular 355, a straight section of tubular 356 and a second end termination 361 (such as second pipe end 7) welded to a free end of the straight section of tubular 356. The straight section of tubular 356 trails approximately ten to twenty metres from the frame 401.

As shown in FIG. 17B, an elongate roller bed 306 is arranged along a deck of the vessel, with a tensioning tool 100, a tensioner (not show) and a hang-off arranged between an aft end of the elongate roller bed 306 and a stinger 310. In use, the hang-off prevents the pipeline being deployed from falling from the aft end of the vessel 300. The tensioner (not shown) maintains tension in the pipeline hanging in the water between the vessel and the seabed. The tensioner may comprise a plurality of endless belts arranged about the pipeline to be deployed. Hang-offs and tensioners are well known in the art.

The tensioning tool 100 is opened by moving the first and second parts 97 and 98. The tensioner (not show) and hang-off and are all opened or moved out of the firing line if not needed.

The mud mats 411 and 412 are folded upwardly about their respective hinges 413,414 to assume a substantially vertical position and each locked in place with a pin passing through aligned holes in lugs (not shown) between the mud mats 411 and 412 and the longitudinal members 402 and 403.

A deck crane (not shown) is used to lift the PLET 400 on to the stinger 310, such that the frame 401 is placed aft of the tensioner (not show), hang-off and tensioning tool 100. As the PLET 400 is lowered, the straight section of tubular 356 aligns, enters or is slotted into the open tensioner, hang-off and tensioning tool 100.

A double, triple or a quad joint in accordance with the present invention is moved from the storage stack (not shown) to the elongate roller bed 306 and inserted into the tensioning tool 100 to axially align with the straight section of tubular 356 of the PLET 400. An end termination of the section of pipeline is offered up to end termination 361 of the PLET 400. The tensioning tool 100 makes a connection therebetween. The hang-off and tensioner are closed about the straight section of pipe 356.

One end of a wire rope 465 is round around a driven reel 466 located on the vessel 300 and the opposing end passes around a sheave of a block 467 located on the seabed in close proximity to the manifold 460. The block may be fixed to a pile (not shown) driven into the seabed or an initiation block. The wire rope 465 loops around the sheave of the block 467 and back to the vessel 300 to be connected to the sheave 446 on the deployment frame 430. The driven reel 466 controls the rate of deployment of the pipeline 302, optionally with constant tension, with the PLET 400 leading. This preferably maintains correct tension in the pipeline as it is laid. The articulated PLET is pulled along the elongate bed 306 and along the stinger 310, as shown in FIG. 17B. Further sections 305 of pipeline are added one at a time as the PLET is deployed. It should be noted that the stinger 310 follows a curved path. The articulated PLET 400 more closely follows the curve in the curved stinger 310.

It is preferred that the sections of pipeline stored in the storage racks of the pipe laying vessel are each: approximately 49.5 m long, made up of four lengths of 12 m tubular welded together to form a 48 m long tubular with a male connector on one end and a female connector on the opposing end to form a quad joint approximately 49.5 m long; approximately 38 m long, made up of three lengths of 12 m tubular welded together to form a 36 m long tubular with a male connector on one end and a female connector on the opposing end to form a triple joint approximately 37.5 m long; or approximately 25.5 m long, made up of two lengths of 12 m tubular welded together to form a 24 m long tubular with a male connector on one end and a female connector on the opposing end to form a double joint approximately 25.5 m long.

The wireline 465 is drawn in until the PLET 400 lands on the seabed 303 near to the manifold 460. The mud mats 411 and 412 are unfolded about their respective hinges 413,414 to lie in a substantially horizontal plane on the seabed. This may be carried out a ROV removing the pins (not shown) arranged between the mud mats 411 and 412 and the longitudinal members 402 and 403.

The pipe laying vessel 300 continues laying the pipeline 302 using the S-lay method until a predefined destination is reached.

The predefined destination may be land. The tensioning tool 500 may be used to make connections on beaches and on land by depending the tensioning tool 500 from a crane.

Alternatively, the predefined destination may be underwater and provide the end of the pipeline with a further PLET 400. Thus, a further PLET 400 is required. The further PLET 400 will be arranged on the elongate bed 306 with the deployment end 430 facing towards the bow of the vessel 300 and a first pipe end 6 seated on to seat 410'. A wireline such as wireline 465 (sometimes referred to as an abandonment and recovery wireline) is connected to the shackle 446 to provide tension to the pipeline as the PLET 400 is deployed. The PLET 400 is deployed, sliding along elongate bed 306 and subsequently along curved bed of the stinger 310, with the articulated PLET 400 following the contour of the curved bed of the stinger 310. The PLET 400 sinks to the seabed whilst the vessel 300 continues ahead with wireline 465 maintaining correct tension in the pipeline as it falls towards the seabed 303. The wireline 465 is disconnected from the shackle 446.

A step of pigging the pipeline and testing the pipeline is then carried out. Pigging and testing apparatus (not shown) comprising a pig launcher and a pig catcher may be provided with an end termination in accordance with the present invention to facilitate attachment to either end of the pipeline via the PLET(S) 400. Once the pipeline has been pigged and tested, the underwater apparatus, such as manifolds or wellheads 460, may be connected to the PLET 400 and/or further PLET.

The manifold or wellhead 460 has a flexible pipe 352 or rigid pipe spool has an end termination 353 of connector 350 at a free end. A rigid pipe spool is generally pre-formed into a shape to facilitate alignment with the connector in the PLET. The rigid pipe spool may be preformed into an L or Z shape.

A ROV, picks up the free end of the flexible pipe 352 and lays it in pipe guide 450 and seats the free end on seat 410a'. A crane located on a surface vessel may be used to assist lifting the flexible pipe 352. The diver or ROV optionally slides the collar 20 of the first pipe end 6 of the flexible pipe 352 over end flange 43 of the second pipe end 7 and may spin the locking nut 50 into the collar 20 to provide a loose connection. In shallow water, such as under 150 m, a diver may be used to carry out the above steps in place of an ROV. If a rigid pipe spool (not shown) is used instead of the flexible pipe, the same procedure is followed.

An underwater tensioning tool 500 is then lowered from pipe laying vessel 300 or a support vessel (not shown). The tensioning tool optionally carries out the steps of sliding the collar 20 of the first pipe end 6 of the flexible pipe 352 over end flange 43 of the second pipe end 7.

Figures 19, 20:
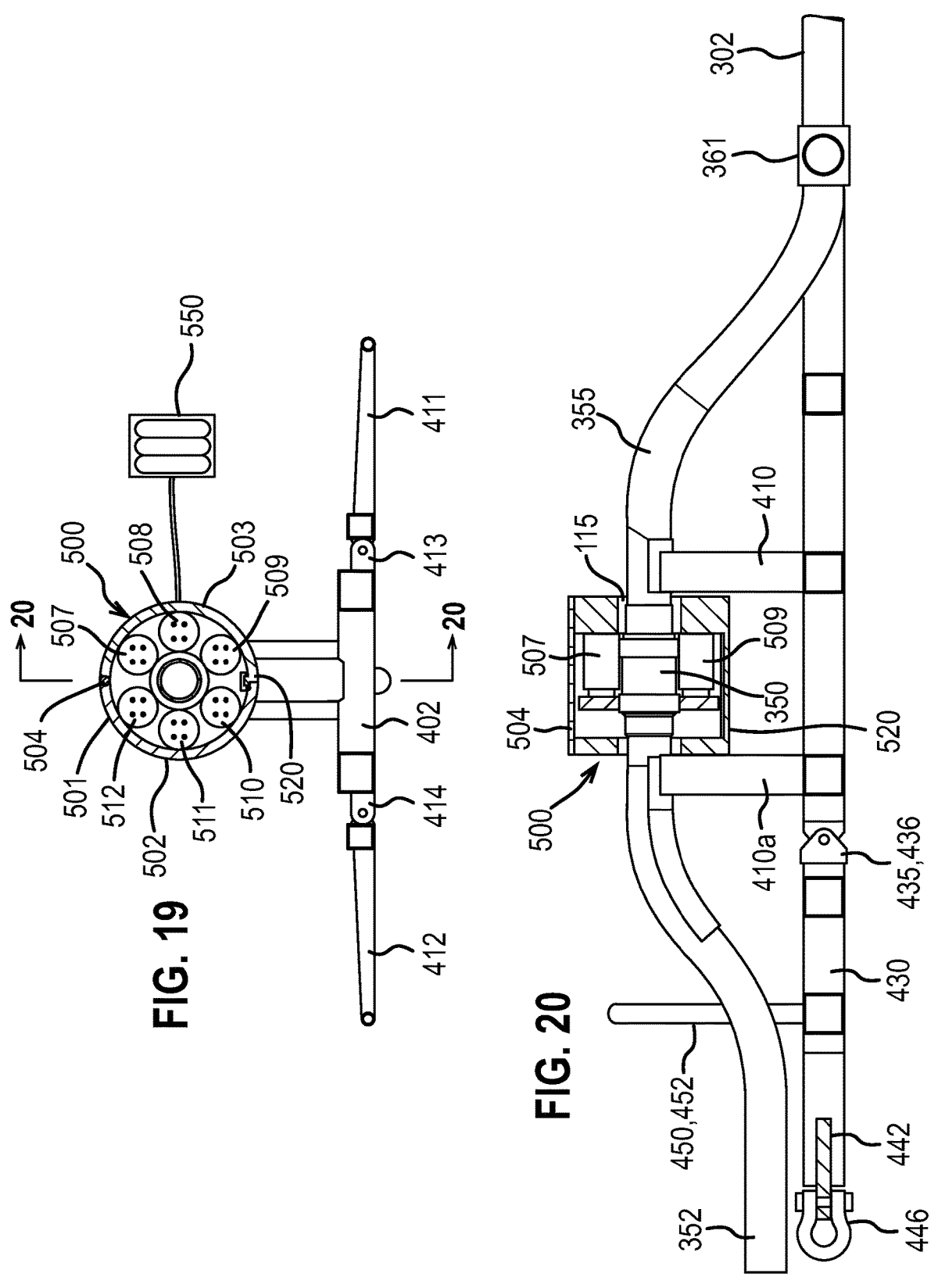

The underwater tensioning tool 500 is shown in FIGS. 18 to 19 about the connection 350 on the PLET 400. The underwater tensioning tool 500 is generally like the tensioning tool 100 shown in FIGS. 7 and 8 as described herein. The structural body 501 is generally like structural body 101 although it takes the form of a circular section cylinder. The structural body 501 has first and second halves 502 and 503 hinged about hinge 504.

The underwater tensioning tool 500 is lowered on a wireline 499 from a crane (not shown) of the pipe laying vessel 300 or support vessel (not shown). An optional accumulator power pack 550 is also lowered with the underwater tensioning tool 500 for proving hydraulic fluid under pressure to power the underwater tensioning tool 500. Alternatively, the underwater tensioning tool 500 is provided with hydraulic fluid under pressure by an umbilical cord (not shown) linking the underwater tensioning tool 500 o the support vessel.

The first and second halves 502 and 503 are moved about hinge 504 to provide a mouth therebetween which allows the two halves 502 and 503 to be lowered over the connection 350. The two halves are then moved about hinge 504 to close the mouth, with the connection within an opening 115 of the underwater tensioning tool 500. The first and second halves 502 and 503 are locked together with latch 520.

As can be seen from the cross-sectional view in FIGS. 19 and 20, the underwater tensioning tool 500 has six rams 507 to 512 to tension the connection 350 in the same way as described for connection 1 described hereinbefore. The rams 507 to 512 (like rams 107 to 109) are provided with power from the accumulator power pack 550. A further small power pack (not shown) may be provided for powering a spinner (like spinner 135) for rotating a locking nut 50 of the connector 350.

The underwater tensioning tool 500 may also include an underwater camera (like camera 201) and may have a camera unit (like camera unit 230) as well as a further camera (like further camera 220) for confirming that the correct tension has been applied to the collar 20 of the connection 350.

The spacing of the upstands 410, 410a provides a space for the underwater tensioning tool 500 to fit about the connection 350. This facilitates alignment of the set of slooves 28 of the sleeve 21 of the connection 350 with inserts (like inserts 135) of the underwater tensioning tool 500. This also facilitates alignment of the set of slooves 47 of the pipe end 7 of the connection 350 with inserts (like inserts 150) of the underwater tensioning tool 500. Once axially aligned, the inserts 135 and 150 are moved radially within respective insert carriers (like insert carriers 114 on the free end of piston 111 and inert carrier 153 within the structural body 101 respectively) into engagement with their respective set of slooves 28 and 47.

The rams 507 to 512 are activated to apply a large tensioning force to the collar 20. The spinner is then activated to spin the locking nut 50 into the end of the collar 20 to lock the first pipe end 6 to the second pie end 107 making the connection 1. Hydraulic fluid under pressure in the rams 507 to 512 and in rams providing radial force to the inserts is now relieved and the inserts retracted radially and rams retracted axially.

The cameras are used to ensure the correct tension was applied during tensioning and again to ensure there is sufficient tension in the collar 20 to ensure the ring seal gasket 19 between the pipe ends 6 and 7 remains activated to provide a seal therebetween.

Once the connection has been made with the correct tension applied to the collar 20, the latch 520 of the underwater tensioning tool 500 is unlatched and the tensioning tool 500 pulled away from the PLET 400 using the crane on the support vessel drawing in line 499.

Before the tensioning tool is pulled away, the cameras may be used to ensure there is a small amount of elastic extension in the sleeve 21 of the collar 20.

It is envisaged that the PLET 400 may be provided with skid plates or skis (not shown) which facilitate movement of the PLET on the seabed due to expansion and contraction in the length of the pipeline due to temperature variations.

Pipelines are often made of materials which are hard wearing and cost effective, such as mild steel or high strength steel. However, such materials may be attacked by corrosive fluids flowing through the pipelines. Use materials other than mild and high strength steel for the body and connections of pipelines may be considered, but are often cost prohibitive. For instance, the cost of a material such as high quality stainless steel is currently in the order of thirty times the price of high strength steel. Accordingly, it has become popular to use mild or high strength steels which are internally lined with a liner which is not susceptible to corrosion or with an increased resistance to corrosion, such as a corrosion resistant alloy (CRA).

FIG. 21 shows part of a lined pipeline 600 comprising a connection 601 and tubular member 602 extending therefrom. The connection 601 is generally similar to connection 1 shown in FIGS. 1 to 3, but with parts such as the collar 20 and locking nut 50 not shown for clarity.

Connection 601 has generally similar parts to those of connection 1 shown in FIGS. 1 to 3 and are referred to with the same reference numerals in the six hundred series.

Connection 601 comprises a first pipe end 606 and a second pipe end 607.

The first pipe end 606 has a hollow steel tubular body 612 of substantially constant internal and external diameters. The hollow steel tubular body 612 may be in the order of 12 m to 48 m long, although may be longer or shorter. The hollow steel tubular member 612 may be in the order of 2" (50 mm) to 48" (1200 mm) in diameter. The first pipe end 606 has a proximal end portion 614 having a larger external diameter and an end flange 616 of yet larger external diameter.

The second pipe end 607 similarly has hollow steel tubular body (not shown) of substantially constant internal and external diameters. The hollow steel tubular body may also be in the order of 12 m to 48 m long, although may be longer or shorter. The hollow steel tubular member 612 may be in the order of 2" (50 mm) to 48" (1200 mm) in diameter. The second pipe end 607 has a proximal end portion 641 having a larger external diameter and an end flange 643 of yet larger external diameter.

The tubular bodies 612 and (not shown) are lined with a liner 670. The liner 670 is made from High Density Polyethylene (HDPE), although may be PVDF, XPLE (PEX), Medium Density Polyethylene, fibre glass, carbon fibre, metallic, or other form of plastic. The liner 670 has a smooth inner wall defining a bore 604 for the passage of fluid to be conveyed through the pipeline 600 and connections 601. As shown in FIG. 21A, the liner 670 has a series of small parallel axial ribs 671 projecting from an exterior surface 672. The series of small parallel axial ribs 671 may be arranged in line with the general flow of fluid through the bore 610 or may follow a spiral or helical path. During manufacture, the liner 670 may be formed by extruding HDPE through a former. The series of small parallel axial ribs may be formed integrally by having notches in the former. The liner 670 is then slid or dragged into the bore of the hollow steel tubular body 612. The liner 670 may left in the bore 604 biased against an internal surface of the hollow steel tubular member 612 as an interference fit. Alternatively, an expandable bladder (not shown) or pig (not shown) may be used to expand the liner 670, pushing it against the inner surface of the hollow steel tubular 612, permanently deforming the liner 670 and fixing it in place. The series of small parallel axial ribs 671 define a small flow path 673 through which gas may flow. It should be noted that the ribs 671 may be continuous from one end of the liner to the other. The ribs 671 may form a spiral, helical, linear or take another form, as long as there is a continuous flow path 673 for gas to flow between the exterior surface 672 of the liner 670 and the interior surface of the hollow steel tubular member 612.

It has been found that gases, such as hydrogen sulphide may permeate through the liner or otherwise flow into the flow paths 673 formed between the liner 670 and the hollow steel tubular member 612.

At each end of the liner 670, an end portion 674 is expanded to permanently reside in a recess 675 formed in the pipe end 606. The recess 675 is preferably within the proximal end portion 614 and spaced from the end face 617 by proximal end region 676 and defined by a shoulder 677 having substantially the same inner diameter as that of the hollow steel tubular member 612. The shoulder 677 may be provided with a square outer corner or a curved edge, as shown. The recess 675 may alternatively be located anywhere in the pipe end portion 606. The recess has a final depth portion 681 having a depth approximately equal to the thickness of the liner 670 and has a smooth transition region 680 between the internal diameter of the hollow steel tubular member 612 and the final depth. A square end face 678 of the liner 670 sits within the final depth portion 681 of the recess 675 with annular gap 679 provided between the square edge face 678 of the liner 670 and the shoulder 677. An end liner compression ring 685 is inserted into the proximal end region with a friction fit. The end liner compression ring 685 may be slightly oversized and inserted under compression. The end liner compression ring 685 may be undersized, inserted and expanded against the inner wall 676 with a pigging tool or the like (not show). The end liner compression ring 685 has a tapered region 686 on an outer face which has a plurality of parallel circumferential groove which lie against the end portion 675 of the liner 670. A proximal end 688 of the end liner compression ring 685 has a square edge and is preferably set back slightly from end face 617. The end liner compression ring 685 may be between 50 mm and 200 mm long and preferably in the order of 135 mm long. A filet weld may be provided between the proximal end 688 of the end liner compression ring 685 and the inner wall 676 of the pipe end 606, 607. The liner 670, recess 675, compression ring 685 arrangement will be such that when the compression ring 685 is fully inserted that the small flow channels 673 in the liners 670 are not squashed too much so the gas can flow. Finished joints of pipeline will have a gas flow test through the small flow paths 673 from end to end prior to sending the joints offshore.

The pipe end 606 has an end face 617 which is generally planar with an annular recess 618 in a central portion thereof extending about the bore 610 for receiving part of a ring seal 619. The recess 618 has a back wall 683 substantially parallel with the end face 617 and a pair of side walls flared outwardly from the back wall 683 to the end face 617 forming a frusto-conical recess 618 for receiving the ring seal 619.

The ring seal 619 may be a square section ring (as shown in FIG. 21) or may be of the type shown in FIG. 5 having chamfered edges to form frusto-conical ends to sit in the recess 618. It should be noted that the seal ring 619 sits in the recess 618 to define an annular cavity 687. The annular cavity 687 remains present when the connection is fully made. A seal is made where the corners or chamfered corners 19' of the ring seal meet tapered surfaces 684 and 684' defining the annular recess 683. The ring seal 618 is provided with a plurality of holes 690 extending from a front face 691 to a rear face 692. Preferably, there are between four and six such holes spaced evenly about the circumference of the ring seal gasket 619, although any suitable number may be used, depending on pipe diameter and expected fluid flow rate therethrough.

A plurality of holes 682 are formed in the first pipe end 606 between the back wall 683 of the recess 618 and the shoulder 677 to provide a fluid flow path between the annular gap 679 and the annular cavity 687 in the recess 618 behind ring seal 619. Preferably, between four and six such holes 683 are arranged equally about the circumference of the first pipe end 606. The holes may be between 0.5 and 5 mm in diameter and may be 3 mm in diameter.

In use, the connection 601 is made as described with reference to FIGS. 1 to 3, applying significant force to activate sea ring 619. Corrosive fluid may flow through the lined pipeline 600. Some fluid, such as hydrogen sulphide, may migrate between the liner 670 and the hollow steel tubular members 612 in axial flow path 673, which may move very slowly within the flow path. If there is a pressure differential across the liner 670 between the flow channels 673 and the bore 610, the liner 670 may collapse. It may be advantageous to remove any gas which has built up in the flow channels 673.

In accordance with this aspect of the present invention, fluid is allowed to flow in small axial flow path 673 into annular gap 679, through holes 682 into annular cavity 683, through the holes 690 in the seal ring 619 and into a corresponding annular cavity 687' in second pipe end 607, through correspond holes 682' to corresponding annular gap 670' and into corresponding flow path 673' between the proximal portion 641 of the steel body of the pipe end 607 and the liner 670'. This may equalise pressure across the connection 601 and provide axial flow paths between the flow path 673 in connected tubular members.

Figure 22:
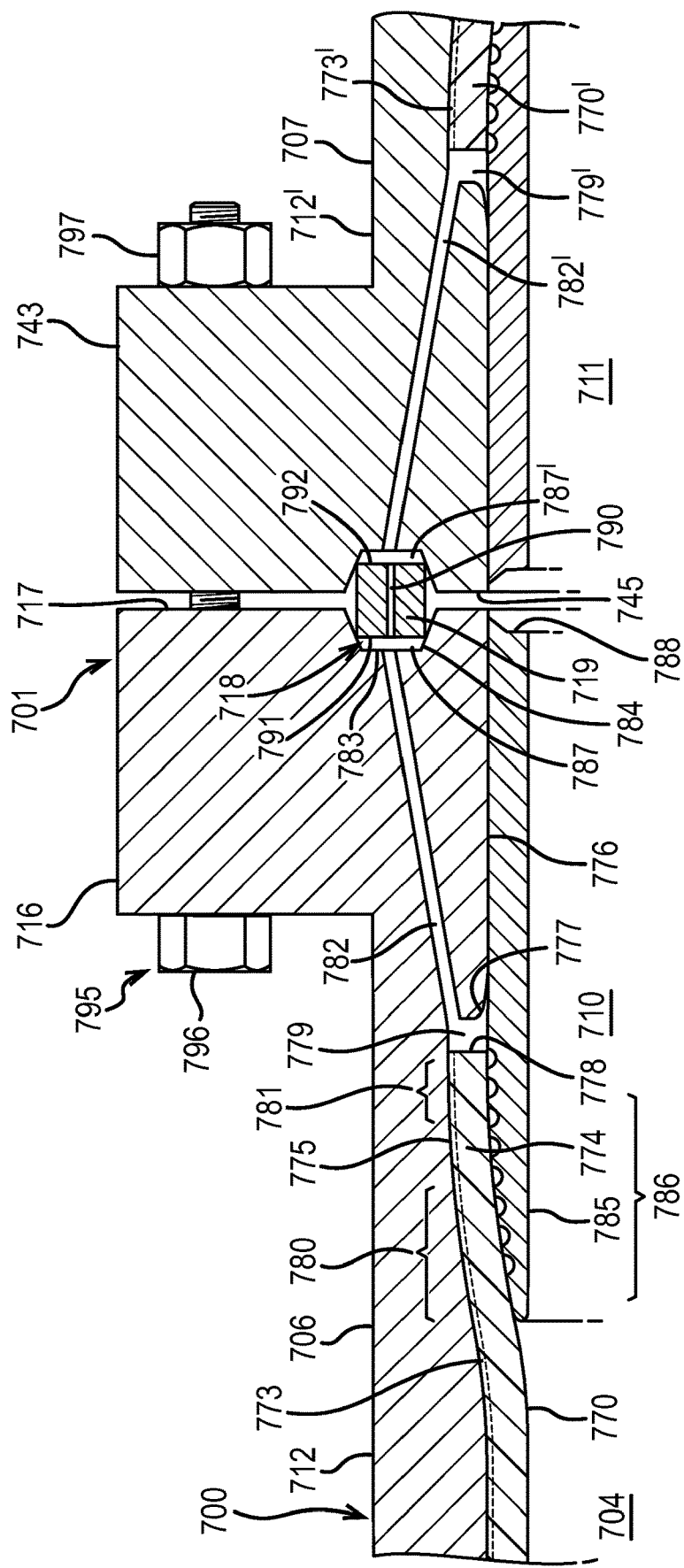
FIG. 22 is a schematic side cross-sectional view of part of a lined pipeline and connection between sections of pipeline in accordance with the further aspect of the invention.

A lined pipeline 700 shown in FIG. 22 is generally similar to the lined pipeline, save for the type of connection, which is a standard flange connection, rather than the type of connection shown in FIGS. 1 to 3.

The first pipe end 706 has a hollow steel tubular body 712 of substantially constant internal and external diameters. The hollow steel tubular body 712 may be in the order of 12 m to 48 m long, although may be longer or shorter. The hollow steel tubular member 712 may be in the order of 2" (50 mm) to 48" (1200 mm) in diameter. An end flange 616 is of much larger external diameter with a plurality of holes therein each for receiving a threaded bolt 795, which has a head 796 at one end and receives a threaded nut 797 at the other.

The second pipe end 707 similarly has hollow steel tubular body 712' of substantially constant internal and external diameters. The hollow steel tubular body 712' may also be in the order of 12 m to 48 m long, although may be longer or shorter. The hollow steel tubular member 612 may be in the order of 2" (50 mm) to 48" (1200 mm) in diameter. The second pipe end 707 has an end flange 643 of much larger external diameter with a plurality of holes therein equally spaced about the circumference of the tubular 712'.

The tubular bodies 712 and 712' are each lined with a liner 770 and (not shown). The liner 770 is made from High Density Polyethylene (HDPE), although may be Medium Density Polyethylene, fibre glass, metallic, or other form of plastic. The liner 770 has a smooth inner wall defining a bore 704 for the passage of fluid to be conveyed through the pipeline 700. The liner 770 has a series of small parallel axial ribs projecting from an exterior surface in as for liner 670 and shown in FIG. 2. The liner 770 may left in the bore biased against an internal surface of the hollow steel tubular member 712 as an interference fit. Alternatively, an expandable bladder (not shown) or pig (not shown) may be pulled through the pipeline 700 to expand the liner 770, pushing it against the inner surface of the hollow steel tubular 712, permanently deforming the liner 770 and fixing it in place. The series of small parallel axial ribs define a small flow path through which gas may flow. It should be noted that the ribs may be continuous from one end of the liner to the other. The ribs may form a spiral or take another form, as long as there is a continuous flow path for gas to flow between the exterior surface of the liner 770 and the interior surface of the hollow steel tubular member 712.

At each end of the liner 770, an end portion 774 is expanded to permanently reside in a recess 775 formed in the pipe end 706. The recess 775 is spaced from the end face 717 by proximal end region 776 and defined by a shoulder 777 having substantially the same inner diameter as that of the hollow steel tubular member 712. The shoulder 777 may be provided with a square outer corner or a curved edge, as shown. The recess 775 has a final depth portion 781 having a depth approximately equal to the thickness of the liner 670 and has a smooth transition region 780 between the internal diameter of the hollow steel tubular member 712 and the final depth. A square end face 778 of the liner 770 sits within the final depth portion 781 of the recess 775 with annular gap 779 provided between the square edge face 778 of the liner 770 and the shoulder 777. An end liner compression ring 785 is inserted into the proximal end region 776 with a friction fit and may be slightly oversized and inserted under compression. The end liner compression ring 785 has a tapered region 786 on an outer face which has a plurality of parallel circumferential grooves which lie against the end portion 775 of the liner 770. A proximal end 788 of the end liner compression ring 785 has a square edge and is preferably set back slightly from end face 718. A filet weld may be provided between the proximal end 788 of the end liner compression ring 785 and the inner wall 776 of the pipe end 706, 707. The end liner compression ring may be between 50 mm and 200 mm long and preferably in the order of 135 mm long. The liner 770, recess 775, compression ring 785 arrangement will be such that when the compression ring 785 is fully inserted that the small flow channels 773 in the liners 770 are not squashed too much so the gas can flow. Finished joints of pipeline will have a gas flow test through the small flow paths 773 from end to end prior to sending the joints offshore.

The pipe end 706 has an end face 717 which is generally planar with an annular recess 718 in a central portion thereof extending about the bore 710 for receiving part of a ring seal 719. The recess 718 has a back wall 783 substantially parallel with the end face 717 and a pair of side walls flared outwardly from the back wall 783 to the end face 717 forming a frusto-conical recess 718 for receiving the ring seal 719.

The ring seal 718 may be a square section ring (as shown in FIG. 21) or may be of the type shown in FIG. 5 having chamfered edges to form frusto-conical ends to sit in the recess 718. It should be noted that the seal ring 719 sits in the recess 718 to define a cavity 787. A annular cavity 787 remains when the connection is fully made. The ring seal 718 is provided with a plurality of holes 690 extending from a front face 791 to a rear face 792. Preferably, there are between four and six such holes spaced evenly about the circumference of the ring seal gasket 719, although any suitable number may be used, depending on pipe diameter and expected fluid flow rate therethrough.

A plurality of holes or ports 782 are formed in the first pipe end 706 between the back wall 783 of the recess 718 and the shoulder 777 to provide a fluid flow path between the annular gap 779 and the annular cavity 787 in the recess 718 behind ring seal 719. Preferably, between four and six such holes 783 are arranged equally about the circumference of the first pipe end 706. The holes may be between 0.5 and 5 mm in diameter and may be 3 mm in diameter.

In use, the connection 701 is made by torqueing nuts 797 and bolts 795, applying significant force to activate sea ring 719. Corrosive fluid may flow through the lined pipeline 700. Some fluid, such as hydrogen sulphide may migrate between the liner 770 and the hollow steel tubular members 712 in axial flow path, which may move very slowly within the flow path. If there is a pressure differential across the liner 770, the liner 770 may collapse.

In accordance with this aspect of the present invention, fluid is allowed to flow in small axial flow path into annular gap 779, through holes 782 into annular cavity 783, through the holes 790 in the seal ring 719 and into a corresponding annular cavity 787' in second pipe end 707, through correspond holes 782' to corresponding annular gap 770' and into corresponding flow path 773' between the proximal portion 741 of the steel body of the pipe end 707 and the liner 770'. This may equalise pressure across the connection 671 and the axial flow paths between the liners 770,770' and the steel tubulars 712, 712'.

FIG. 22A shows the pipeline 600 in accordance with the present invention, although this aspect of the invention is also applicable for pipeline 700 in accordance with the present invention.

The pipeline 600 extends from a first pipeline end 690*a* located on the seabed 689*a* adjacent a wellhead 691*a* terminating in a subsea manifold 692a to a second pipeline end 693a on shore 688a terminating at an onshore manifold 694a. A further short section of pipeline 699a extends from the subsea manifold 692a to the wellhead 691a. A further short section of pipeline 688a extends from the onshore manifold 694a to a storage facility or a refinery (not shown).

The onshore manifold 694a comprises a housing 694b with a flow bore 694c therethrough for conveying fluids, such as oil from the pipeline 600 through the manifold and into short section of pipeline 688a leading to a refinery or on-shore storage facility (not shown). A pump 695a is fluidicly coupled with a tube 697a coupled to a hole 682b in a wall 694b of the onshore manifold 694a which leads to an annular recess 646a. A ring seal 619a, like the ring seal 619 is arranged partly in the annular recess 646a and partly in an annular recess 683 in an end flange 716 forming part of a pipe end 606. The pipe end 606 is welded or otherwise attached to a lined tubular 612 of the lined pipeline 600. The flange is provided with a number of bolts about the pipe end 606 which extend into the housing 694b of the onshore manifold 694a to fix the lined pipeline 600 to the onshore manifold 694a. The bolts are tightened about the ring seal 619a to close a gap between the flange 716 and the wall 694b of the manifold to force the ring seal 619a against a wall of the recess 646a and wall of recess 683 to form a seal between the lined pipeline 600 and the onshore manifold 694a. A multiplicity of axial holes 690a are arranged about the ring seal 619a. Preferably between one and twelve axial holes 619a are provided about the ring seal to provide a flow path between an annular flow path 687 formed between the seal ring 619a and the wall of the recess 683 and into a multiplicity of holes in the flange 716 into flow path 673 between the liner 670 and the steel tubular 612 through which fluid, such as gas may flow.

In use, the pump 695a is activated and controlled by a computer 699. The pump is preferably a variable speed pump which can provide a negative pressure in tube 697a to pull fluid through the flow path 673 into holes 682a, across the ring seal 619 through axial holes 690a into the onshore manifold 694a and into a holding tank 696b and vent gases to atmosphere or to be trapped in a gas storage vessel (not shown). The pump 695a preferably draws the fluid from the flow path 673 between the steel tubular 612 and liner 670, at a slow rate to inhibit the build up of gases in the pipeline 600 between the liner 670 and the steel tubular 612.

The subsea manifold 692a may comprise a further pump and a supply of fluid to replace the fluid, which would generally be a gas, such as hydrogen sulphide which has seeped across the liner into the flow path 673.

Figure 23:
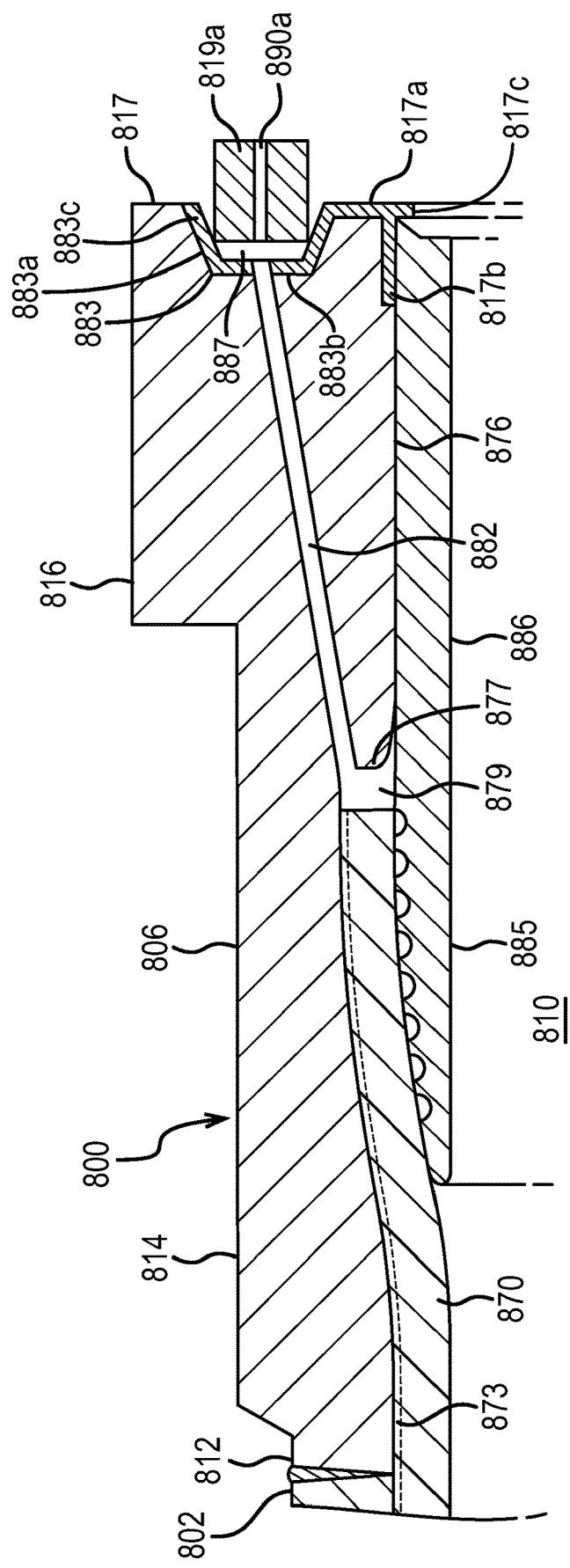
FIG. 23 is a schematic view in cross-section of part of a pipeline comprising a pipe end in accordance with the further aspect of the invention.

Referring to FIG. 23, there is shown a pipe end 800 generally like the pipe end 600 shown in FIG. 21 for use in a connection, such as connection 1, optionally for use with lined pipe. As with the pipe end 606, pipe end 806 is shown without certain parts, such as collar 20. Like parts are identified by like reference numerals in the eight hundred series.

The pipe end 800 comprises a tubular member 802 which may be in the order of 12 m to 48 m long welded or otherwise attached to a hollow steel tubular member 812 having coincident bores 804, 810 and similar wall thicknesses. The pipe end 806 also has a proximal end portion 814 of larger wall thickness and a flange 816 of yet larger wall thickness. The tubular member 802 and pipe end 806 are lined with a continuous liner 870 having ribs on an outer surface to define an axial flowpath 873. A recessed portion 876 of the pipe end 806 has an enlarged internal diameter. A stainless steel compression end ring 887 is provided in an end portion of the pipe end 806 to protect the end portion from corrosive fluids flowing through the bore 810. The compression ring 887 has a distal tapering portion 885 provided with external circumferential rings to trap the end of the liner in the recessed portion 876. An annular flow channel 879 is bounded by the enlarged internal diameter recessed portion 876, the end of the liner 870, the compression end ring 887 and an end wall 877 of the recess portion 876. A multiplicity of holes 882 are drilled or otherwise formed in the end flange 816 fluidly connecting the annular flow channel 879 to an annular flow channel 887 in annular groove 883.

The annular groove 883 has a substantially perpendicular annular end wall 883b and inner and outer annular tapered walls 883a. The annular groove 883 is lined with an inlay 883c. The ring seal 819a sits in the annular groove with edges of the seal contacting the inlay 883c on inner and outer annular tapered wall 883a defining annular flow channel 887. The inly 883c is provided with holes to line up with holes 882 to provide a flow path from the hole 882 to the annular flow channel 887 and onwards through axial holes 890a in the ring seal 819a. Optionally, the inlay and seal ring are stainless steel. Optionally the grade of the inlay is Inconel 625 and may be 3 mm thick.

Optionally or alternatively, the inlay 883a has a face portion 817a which extends from the recess 883 along a recessed inner portion of the face 817 of the flange 816 towards the bore 810, preferably recessed by the same thickness as the inlay, so that the inlay lies in the same plane as the outer portion of the face 817. Optionally, a further portion 817b extends into the bore 810 flush with the inner surface of the steel pipe end 806 so that it sits under the compression ring 885. Optionally with, the end compression ring 885 overlaps portion 817b of the inlay 883a and optionally, a fillet weld is applied between the portion 817b of the inlay 883c and an end 888 of the end compression ring 885.

In use, a further pipe end (not shown) which is like the pipe end 806 is offered up to pipe end 806 and an annular groove in the pipe end is lined up with the ring seal 819a which sits in annular 883 or is temporarily held in the annular groove 883 with individual spots of glue about the ring seal 819a, being careful not to block holes 882 with the glue. The tensioning collar (not shown) is tensioned with a tensioning tool, such as the tensioning tool 100 shown in FIGS. 7 to 10 and the nut (not shown) is screwed into the collar (not shown) to make the connection, as described with reference to FIGS. 1 to 6.

Figure 24:
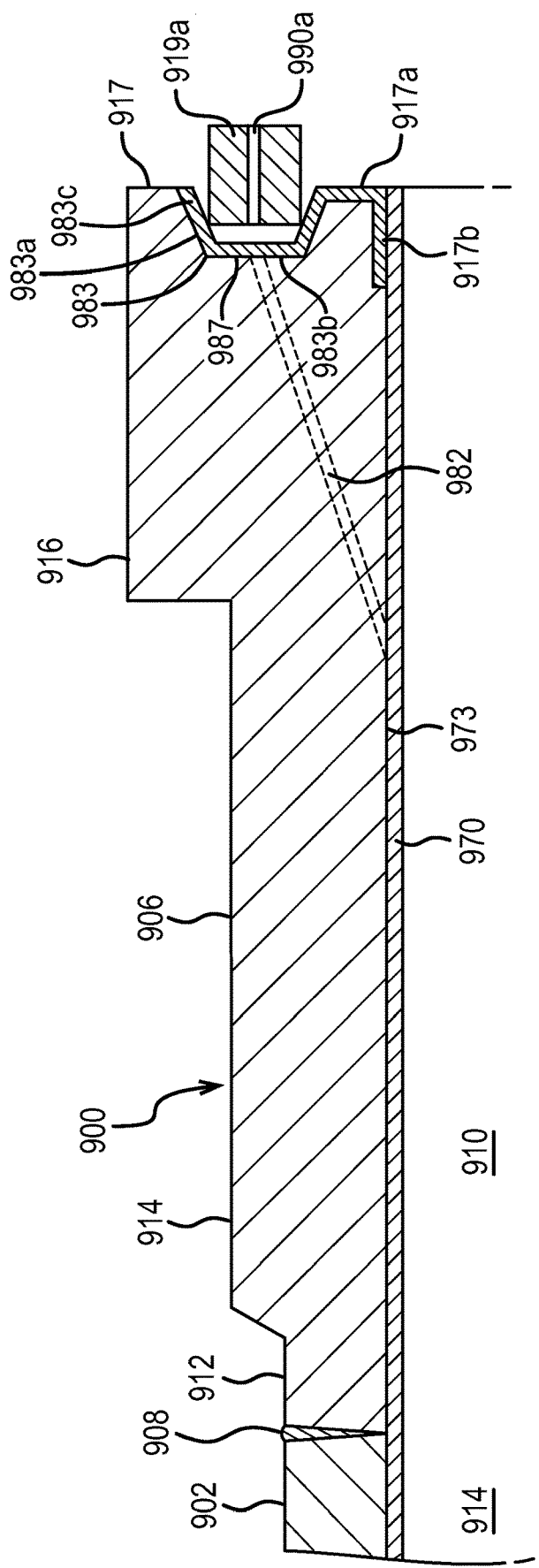
FIG. 24 is a schematic view in cross-section of part of a pipeline comprising a pipe end in accordance with a yet further aspect of the invention.

FIG. 24 shows a further embodiment of a pipe end 906 in accordance with the present invention in a lined pipeline, generally referred to using reference numeral 900. The pipe end 906 is generally like the pipe end 6 shown in FIG. 1 for use in a connection, such as connection 1, save for use with a lined pipeline 900. Pipe end 906 is shown without certain parts, such as collar 20 or nut 50. Like parts are identified by like reference numerals in the nine hundred series.

The pipe end 900 comprises a tubular member 902 which may be in the order of 12 m to 48 m long welded or otherwise attached to a hollow steel tubular member 912 having coincident bores 904, 910 and similar wall thicknesses. The pipe end 906 also has a proximal end portion 914 of larger wall thickness and a flange 916 of yet larger wall thickness. The tubular member 902 and pipe end 906 are lined with a continuous liner 970 which may or may not have ribs on an outer surface to define an axial flowpath 973. The liner 970 may not have axial ribs nor axial flowpaths if they are not needed, such as in water reinjection applications in the drilling or tertiary extraction of oil and gas wells. If a liner with ribs and flowpaths 973 is used, a hole 982 (shown in dashed line), like 682,782, 882, will be provided between the flowpath 973 and the annular recess 987. Alternatively, if a flowpath is not required across connection 1 between joints of pipeline 900, then no hole 982 will be required and does not have to be drilled or otherwise formed in the flange 916.

The annular groove 983 has a substantially perpendicular annular end wall 983b and inner and outer annular tapered walls 983a. The annular groove 883 is lined with an inlay 983c. The ring seal 919a sits in the annular groove with edges of the seal contacting the inlay 983c on inner and outer annular tapered walls 983a defining annular flow channel 987. The inly 983c is provided with holes, if required, to line up with holes 982 to provide a flow path from the hole 982 to the annular flow channel 987 and onwards through axial holes 990a in the ring seal 919a, if required. Optionally, the inlay and seal ring are stainless steel. Optionally the grade of the inlay 983c is Inconel 625 and may be 3 mm thick.

Optionally or alternatively, the inlay 983a has a face portion 917a which extends from the recess 983 along a recessed inner portion of the face 917 of the flange 816 towards the bore 810, preferably recessed by the same thickness as the inlay, so that the inlay lies in the same plane as the outer portion of the face 917. Optionally, a further portion 917b extends into the bore 910 flush with the inner surface of the steel pipe end 906 so that it sits under the liner 970, with an overlap of optionally 50 to 75 mm. The liner 970 terminates in the same plane as the face 917 or recessed slightly therefrom.

It should be noted that the lined pipeline may comprise a coating of corrosion resistant material in place of a separate insertable liner. The coating may be in a paint form, enamel, gel coat or the like and applied to overlap the further portion 917b of inlay 983.

FIG. 25A shows a connection 1001 in accordance with the present invention. The connection 1001 connects a first joint of insulated pipe 1002 with a second joint of insulated pipe 1003. The insulated pipe 1002 and 1003 may be referred to as "pipe-in-pipe". The insulated pipe 1002 comprises a steel inner tubular 1002c, which may be identical to the tubular member 2 shown in the connection 1. The inner tubular 1002c may be of carbon steel, CRA lined, internally coated or HDPE lined. An outer concentric pipe 1002b, which may be referred to as carrier pipe, has a larger internal diameter than the outer diameter of the steel inner tubular 1002c providing an annulus therebetween, which may be of any suitable size to receive thermal insulation material 1002a, such as Aerogel. Typically, the annulus is between 10 mm and 50 mm wide.

A first tubular portion 1012 of first pipe end 1006 is welded to the steel inner tubular 1002c. A hub 1014 of larger diameter, a flange 1016 of yet larger diameter and a collar 1020 having a sleeve 1021 slideably arranged about the flange 1016 and an end stop 1030 arranged about the proximal end portion 1014 is also shown.

The outer concentric pipe 1002b has an end which fits over hub 1014 and an end of the carrier pipe 1002b is welded to the hub 1014.

Similarly, the inner tubular 1003c may be of carbon steel, CRA lined, internally coated or HDPE lined. An outer concentric pipe 1003b, which may be referred to as carrier pipe, has a larger internal diameter than the outer diameter of the steel inner tubular 1003c providing an annulus therebetween, which may be of any suitable size to receive thermal insulation material 1003a, such as Aerogel. Typically, the annulus is between 10 mm and 50 mm wide.

A hub 1041 of larger diameter, a flange 1043 of yet larger diameter and a nut 1050 is slideably arranged about the hub 1014.

The outer concentric pipe 1003b has an end which fits over hub 1041 and an end of the carrier pipe 1003b is welded to the hub 1041.

An insulating jacket 1001a is provided about the connection 1. Ends 1001b and 1001c of the insulating jacket overlap the insulation 1002a to inhibit cold bridging. Optionally, the overlap is between 25 mm and 200 mm and may be between 50 mm and 75 mm. The ends 1001b and 1001c may be provided with chamfers. The insulating jacket 1001a optionally comprises a rigid foam, preferably with a large number of pores therein trapping air or water to enhance thermal insulation. Optionally, the thermal insulation provided by the insulating jacket 1001a has a p value of between 0.3 and 3 and preferably of between 0.5 and 2.5 and currently of approximately 2.0.

The rigid foam insulating jacket 1001a is preferably formed in two identical shells 1001aa (only part of one shell shown in FIGS. 25A and 25B), which are offered up to the connection 1 radially once the connection 1 has been made-up. Radial ends 10011 meet to provide a continuous layer of insulation about the connection. A seal 1001d and 1001e, such as an elastomeric O-ring is provided between the insulating jacket 1001a and the outer pipe 1002b and 1003b in a small annular recess in each end of the insulating jacket 1001a. Alternatively, the seal 1001d and 1001e is not a continuous seal extending 360 degrees about the perimeter of the carrier pipe 1002b, but may extend 180 degrees and may comprise an elastomeric seal embedded and adhered within the small recess in each shell, such that when the two shells are offered up to the connection 1, a complete 360 degree seal is made to inhibit ingress of ambient seawater and movement of water between the connection 1 and the insulating jacket 1001a. A band 1001f and 1001g, such as a steel or plastics band, are arranged at each end of the insulating jacket 1001a and fastened to radially retain the clam shells on the connection 1001a. The external surface 1001h of the insulating jacket 1001a takes the form of a smooth walled cylinder. The internal surface 10011 has end portions which are substantially smooth walled cylinders in which the seals are located. The internal surface 10011 also has a middle portion which substantially follows the contours of the connection 1. The contours may inhibit axial movement of the insulating jacket 1001a relative to the connection 1. The contours and seals 1001d and 1001e may also improve insulation by inhibiting ambient sea water from moving between the insulation material and the connection 1.

Alternatively, the external surface 1001h may follow contours of the parts of the connection 1, providing a more consistent depth of insulation.

In use, the connection is made up as described hereinbefore with reference to FIGS. 1 to 13B on a vessel, such as the vessel shown in FIG. 14. The vessel comprises an elongate roller bed on which a free end of the pipeline lies and new joints, such as quad joints are connected to the free end. This may be referred to as a "firing line". The pair of half shells 1001aa and (not shown) of the insulating jacket 1001a are offered up to the connection 1 radially from either side of the connection 1. The bands 1001f and 1001g are installed about opposing ends of the insulating jacket 1, which may be located over or in close proximity to the seals 1001d and 1001e. The bands 1001f and 1001g may be tensioned with a tensioning device and fixed together to retain the shells 1001*aa* and (not shown) on the connection 1. Such a tensioning and fixing device may be similar to that used in a jubilee clip. The bands 1001*f* and 1001*g* retain the insulating jacket 1001*a* on the connection during installation of the pipeline 900 and during service of the pipeline 900. The bands 1001*f* and 1001*g* are preferably made from a stainless steel. The bands 1001*f* and 1001*g* may be arranged on the surface of the insulating jacket or within a shallow circumferential recess (not shown) in the external surface of the insulating jacket, so that the bands 1001*f* and 1001*g* lie flush with the external surface 1001*h* of the insulating jacket.

It should be noted that the tubular members are described herein as conveying a fluid. The definition of "fluid" is intended to include any flowable material, such as oil and gas, but for the avoidance of doubt is also intended to include non-viscous and viscous fluids, multi-phase fluids, fluids with solids therein and flowable material, fluids which display both Newtonian characteristics and non-Newtonian characteristics and plasma.

The invention claimed is:

1. A system for making a connection between a first tubular member and a second tubular member having coincident bores for conveying a fluid, the connection having an axis in the general direction of flow of said fluid therethrough, the system comprising
   a connection (1) having
      a first tubular end (6) comprising a first end flange (16) having an end face (17) and a collar (20) comprising a sleeve (21) and an end stop (30) fixed to the sleeve (21), said sleeve (21) arranged about said flange (18) and said end stop (30) arranged about said tubular end (6), said collar (20) slideable along said tubular end (6), and
      a second tubular end (7) comprising a second end flange (43) having an end face (45) and a locking nut (50) about and slideable along said first tubular end (7); and
   a tensioning tool (100), for applying axial tension to said collar (30) relative to said second tubular end (7) characterised in that at least one of said sleeve (20) and said second tubular end (7) has a set of parallel circumferential grooves (23,47) therein and said tensioning tool (100) has a set of ridges (142),
   the system comprising the steps of moving said set of ridges (142) into said set of grooves (23,47) and applying an axial tension to said collar (20) relative to said second tubular end (7).

2. The system of claim 1, wherein the collar comprises an internally threaded portion and the locking nut comprises a corresponding external threaded portion.

3. The system of claim 1, wherein the end stop is located at a distal end of the sleeve and the set of grooves are located at a proximal end of the sleeve with a body portion provided between the end stop and the set of grooves.

4. The system of claim 1, wherein the collar is slideable along the first tubular end until the end stop abuts the first end flange.

5. The system of claim 1, wherein the locking nut is slideable along the second tubular end until the locking nut abuts the second end flange.

6. The system of claim 1, wherein each groove of the set of parallel circumferential grooves is a sloove having a recess with rounded inner corners and a flat bottom portion.

7. The system of claim 6, wherein said sloove further comprises rounded top corners.

8. The system of claim 1, wherein the first tubular member has a wall thickness, said first tubular end comprises a proximal portion of larger wall thickness than the tubular and less than the wall thickness of the first end flange.

9. The system of claim 1, wherein the second tubular end comprises a bearing portion of larger wall thickness than the second tubular and less than the wall thickness of the second end flange.

10. The system of claim 8, wherein the end stop of the collar is slideable along the bearing portion of the first tubular end.

11. The system of claim 9, wherein the locking nut is rotatable about the bearing portion of the second tubular end.

12. The system of claim 1, wherein a seal is arranged between the first and second tubular ends and is activated by tension applied by the tensioning tool and maintained by making the connection.

13. The system of claim 12, wherein the seal is a ring seal arranged in a groove in one end face of one of the flanges and projects therefrom.

14. The system of claim 13, wherein a ring seal is pre-installed in a groove in one of the flanges, with a metal-to-metal glue.

15. The system of claim 1, wherein the first and second tubular ends are welded to said first and second tubular members respectively.

* * * * *